US012227273B2

United States Patent
Farrell, III et al.

(10) Patent No.: US 12,227,273 B2
(45) Date of Patent: Feb. 18, 2025

(54) MARINE SALVAGE DRILL ASSEMBLIES AND SYSTEMS

(71) Applicant: Resolve Marine Group, Inc., Fort Lauderdale, FL (US)

(72) Inventors: Joseph E. Farrell, III, Fort Lauderdale, FL (US); Thomas Adriaan Bambach, Gouda (NL); Patrick Louis Tielman, Gouda (NL); Cornelis Hendrikus Geurtsen, Groenekan (NL); Alexander van der Speld, Gouda (NL); Todd Jeffrey Schauer, Fort Lauderdale, FL (US); Matthew Ken Bierwagen, London (GB); Nolan Blake Conway, Fort Lauderdale, FL (US)

(73) Assignee: Resolve Marine Group, Inc., Fort Lauderdale, FL (US)

( * ) Notice: Subject to any disclaimer, the term of this patent is extended or adjusted under 35 U.S.C. 154(b) by 0 days.

(21) Appl. No.: 18/206,479

(22) Filed: Jun. 6, 2023

(65) Prior Publication Data
US 2024/0076020 A1 Mar. 7, 2024

Related U.S. Application Data

(60) Continuation of application No. 17/844,594, filed on Jun. 20, 2022, now Pat. No. 11,708,139, which is a
(Continued)

(51) Int. Cl.
*B63C 11/52* (2006.01)
*B23B 41/00* (2006.01)
(Continued)

(52) U.S. Cl.
CPC .............. *B63C 11/52* (2013.01); *B23B 41/00* (2013.01); *B25H 1/0071* (2013.01); *B63B 73/00* (2020.01); *B63C 7/006* (2013.01)

(58) Field of Classification Search
CPC ......... B63C 11/52; B63C 7/006; B63B 73/00; B23B 41/00; B25H 1/0071
See application file for complete search history.

(56) References Cited

U.S. PATENT DOCUMENTS

| 1,393,894 A | 10/1921 | McGill |
| 1,396,885 A | 11/1921 | Sanchez |
| (Continued) | | |

FOREIGN PATENT DOCUMENTS

| CN | 2018-96102 U | 7/2011 |
| CN | 103920905 A | 7/2014 |
| (Continued) | | |

OTHER PUBLICATIONS

Zhang et al CN 104018780 (English Translation Provided May 16, 2024) Original Published Sep. 3, 2019.*
(Continued)

*Primary Examiner* — Aaron L Lembo
(74) *Attorney, Agent, or Firm* — K&L Gates LLP

(57) ABSTRACT

A drilling system configured to install a tap assembly into a ship skin is disclosed. The drilling system comprises a remotely-operated underwater vehicle and a drilling assembly configured to be operated by the remotely-operated underwater vehicle. The drilling assembly comprises a frame comprising an attachment element configured to hold the drilling assembly to a surface of the ship skin. The drilling assembly further comprises a drill actuation system comprising a linear actuator attached to the frame and a rotary actuator, wherein an actuation of the linear actuator is configured to move the rotary actuator relative to the frame to install the tap assembly into the ship skin by driving the tap assembly with the rotary actuator and the linear actuator.

20 Claims, 61 Drawing Sheets

Related U.S. Application Data continuation of application No. 17/231,380, filed on Apr. 15, 2021, now Pat. No. 11,364,982, which is a division of application No. 16/356,398, filed on Mar. 18, 2019, now Pat. No. 11,014,639.

(60) Provisional application No. 62/644,676, filed on Mar. 19, 2018.

(51) Int. Cl.
  *B25H 1/00* (2006.01)
  *B63B 73/00* (2020.01)
  *B63C 7/00* (2006.01)

(56) References Cited

U.S. PATENT DOCUMENTS

| | | |
|---|---|---|
| 1,672,596 A | 6/1928 | Zerk |
| 2,172,311 A | 9/1939 | Thomas |
| 2,622,457 A | 12/1952 | Buck |
| 2,963,927 A | 12/1960 | Hanger |
| 3,385,250 A | 5/1968 | Raule |
| 3,533,478 A | 10/1970 | Tissier |
| 3,822,660 A | 7/1974 | Throner |
| 3,831,387 A | 8/1974 | Rolleman |
| 3,890,796 A | 6/1975 | Kruger et al. |
| 4,284,110 A | 8/1981 | Divelbiss et al. |
| 4,690,087 A | 9/1987 | Hadjis |
| 5,890,511 A | 4/1999 | Ellis |
| 6,394,192 B1 | 5/2002 | Frazer |
| 7,377,226 B2 | 5/2008 | Choi |
| 7,819,613 B2 | 10/2010 | Strom |
| 8,186,294 B2 * | 5/2012 | Baylot .................. E21B 41/08 114/221 A |
| 8,528,186 B2 * | 9/2013 | Crawford ............. F16L 41/082 29/523 |
| 8,647,030 B2 | 2/2014 | Duncan et al. |
| 8,997,874 B2 | 4/2015 | Mire et al. |
| 9,217,297 B2 | 12/2015 | Burns |
| 9,322,220 B2 | 4/2016 | Innes et al. |
| 10,589,394 B2 * | 3/2020 | Wanner ................ B25J 15/0019 |
| 11,014,639 B2 | 5/2021 | Farrell et al. |
| 11,364,982 B2 | 6/2022 | Farrell et al. |
| 11,428,048 B2 | 8/2022 | Xiao et al. |
| 11,708,139 B2 | 7/2023 | Farrell et al. |
| 2008/0099077 A1 | 5/2008 | Knaus |
| 2009/0178848 A1 | 7/2009 | Nellessen, Jr. et al. |

FOREIGN PATENT DOCUMENTS

| | | |
|---|---|---|
| CN | 203817467 U | 9/2014 |
| CN | 104354843 B | 2/2016 |
| CN | 104018780 B | 1/2017 |
| WO | WO 2005/080191 A1 | 9/2005 |

OTHER PUBLICATIONS

International Search Report and Written Opinion of the International Searching Authority for International Application No. PCT/US2019/022714 mailed Jun. 17, 2019.

ATM-MPLS Networking Version 2.0, af-aic-0178.001 ATM Standard, The ATM Forum Technical Committee, published Aug. 2003.

IEEE Std 802.Mar. 2012 (Revision of IEEE Std 802.3-2008, published Dec. 28, 2012.

* cited by examiner

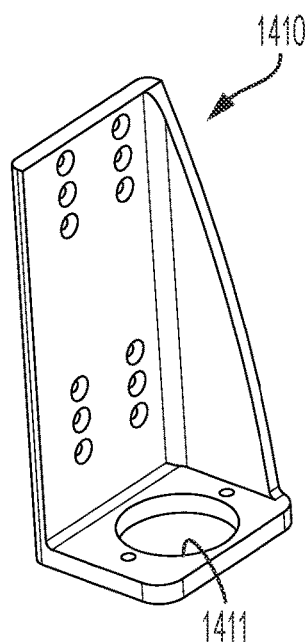 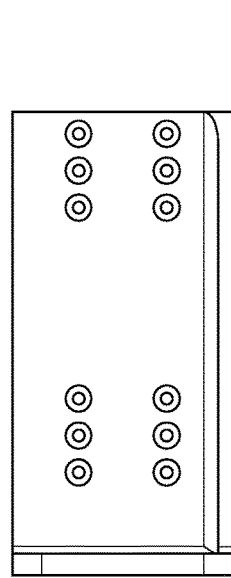 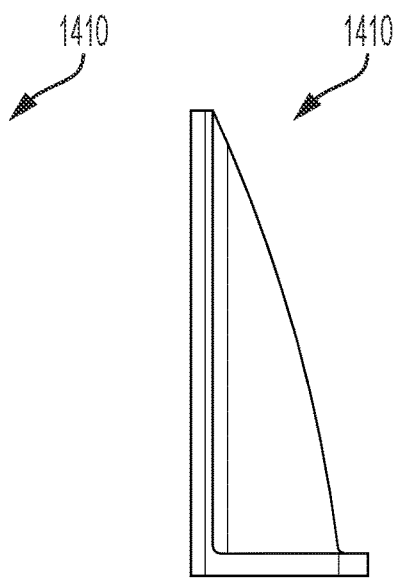
FIG. 21A     FIG. 21B     FIG. 21C
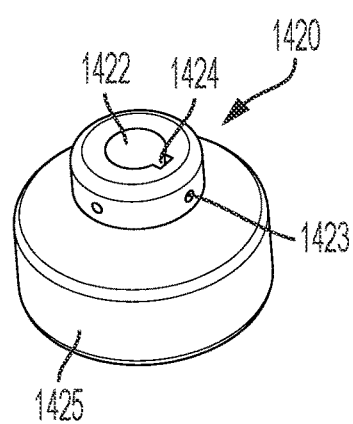 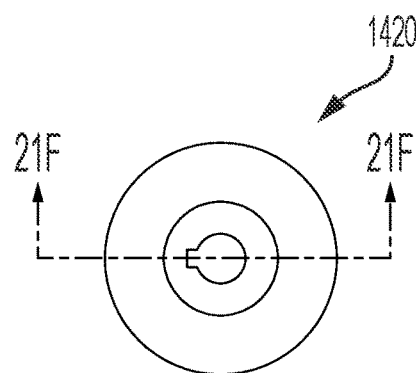 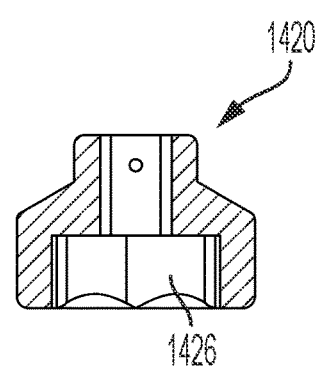
FIG. 21D     FIG. 21E     FIG. 21F

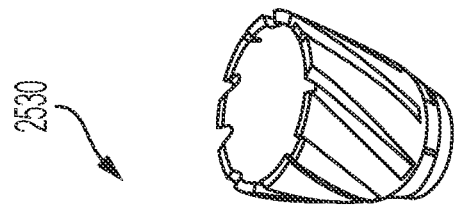
FIG. 35C
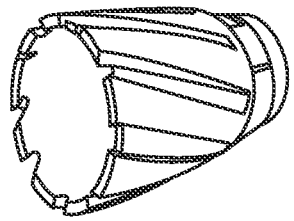
FIG. 35B
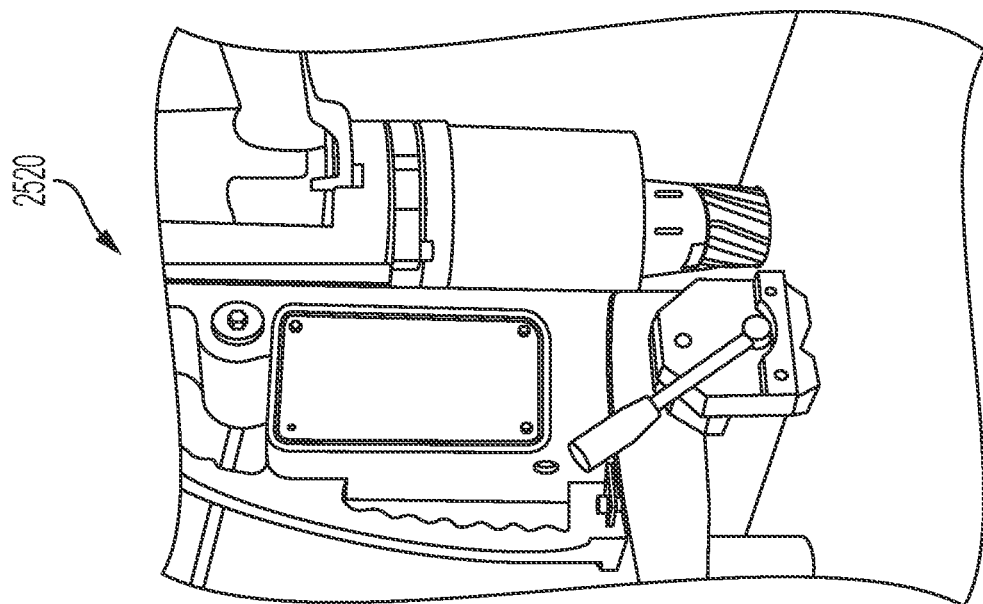
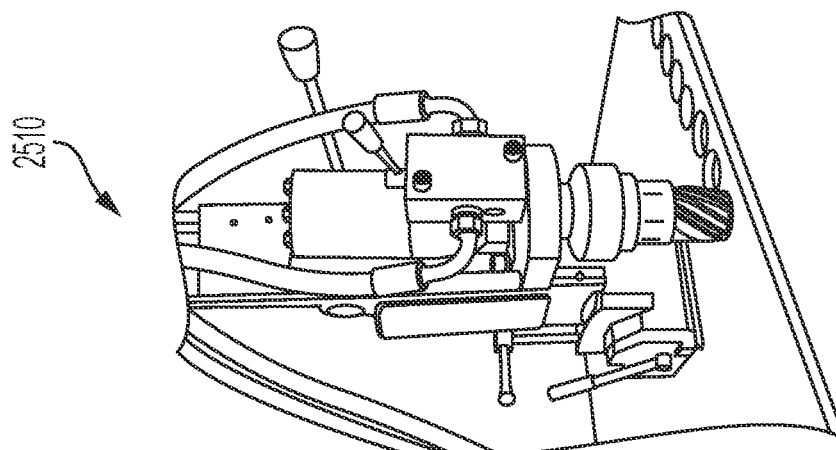
FIG. 35A

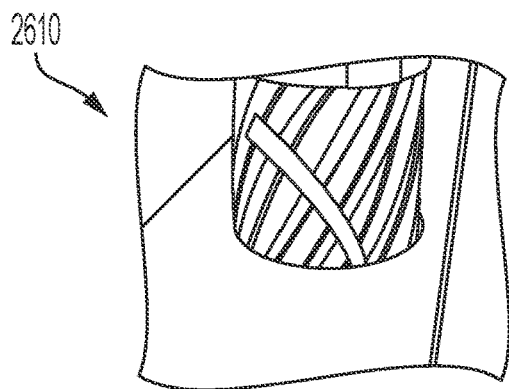
FIG. 36A
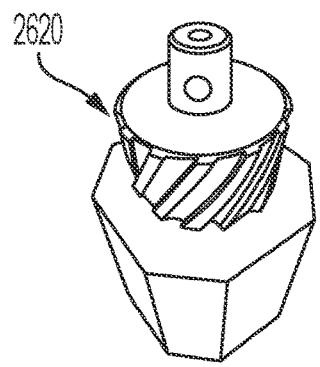
FIG. 36B
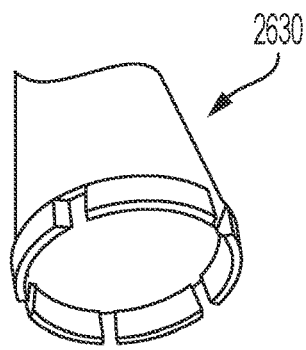
FIG. 36C
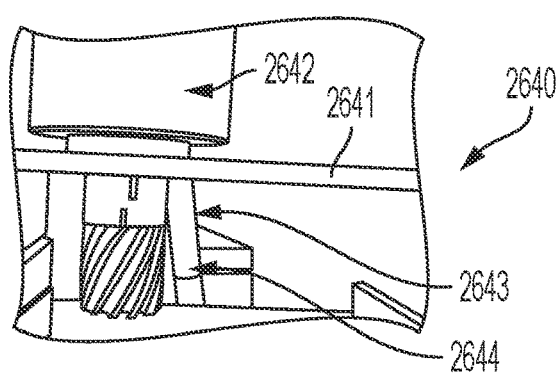
FIG. 36D
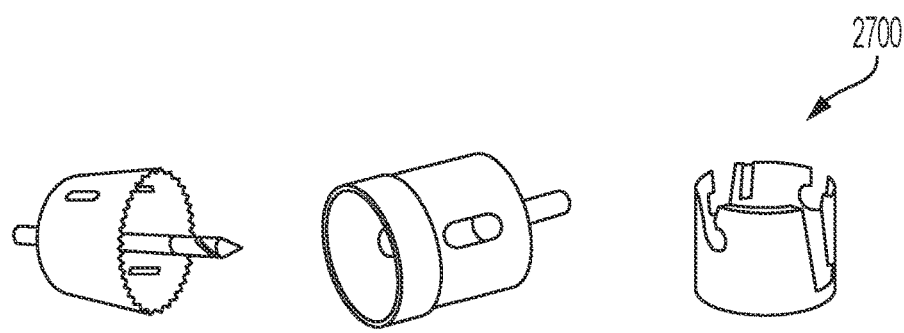
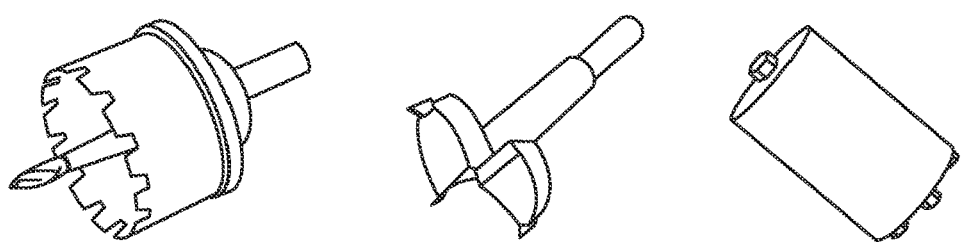
FIG. 37

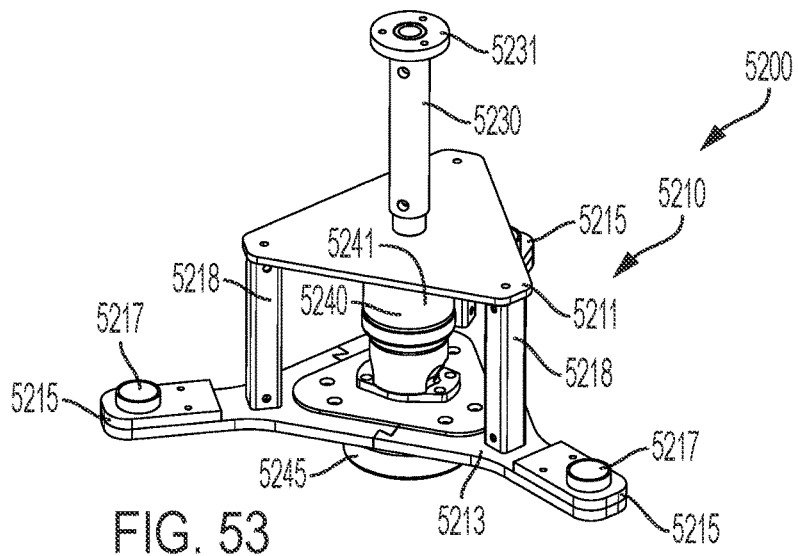
FIG. 53
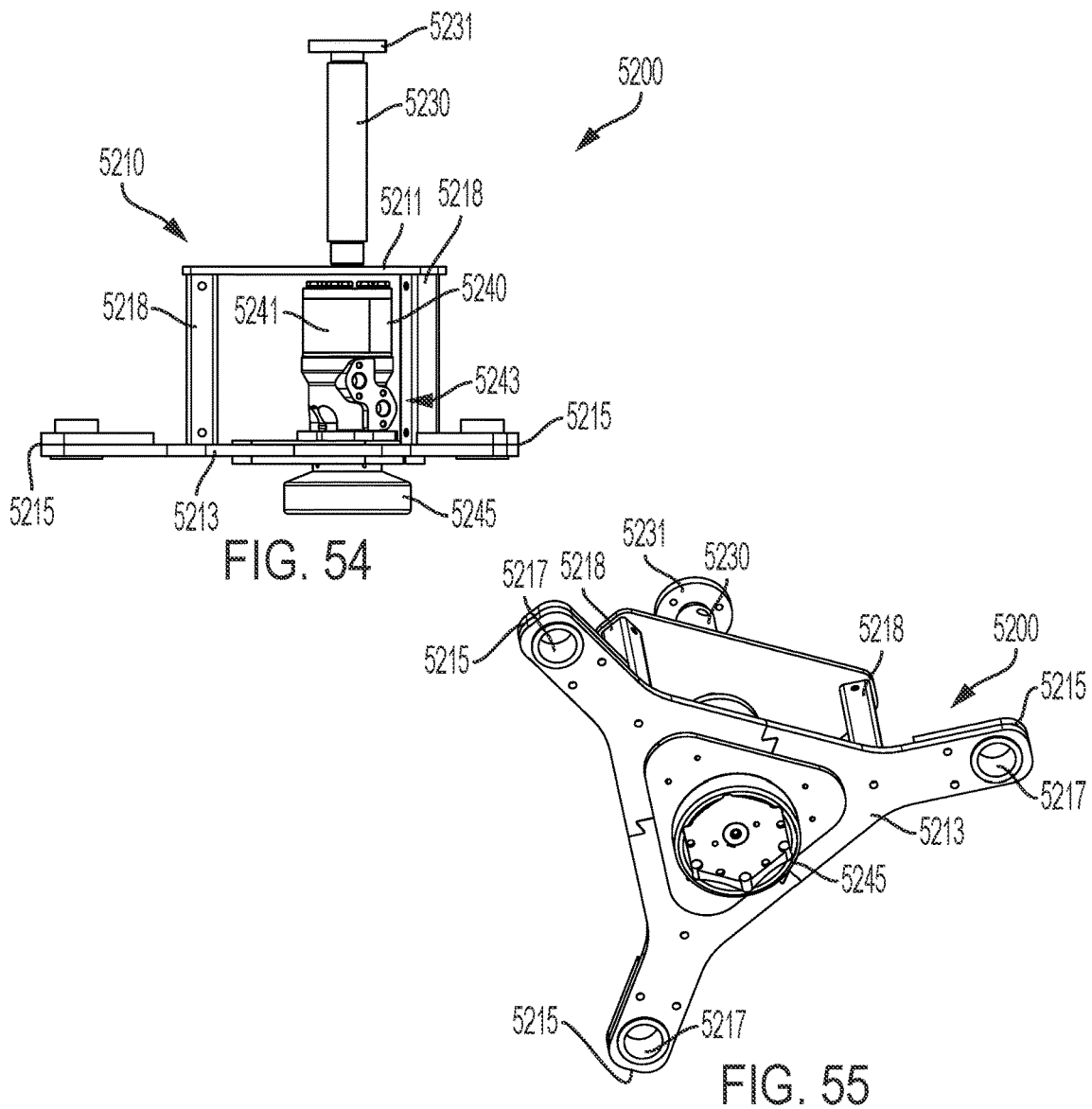
FIG. 54
FIG. 55

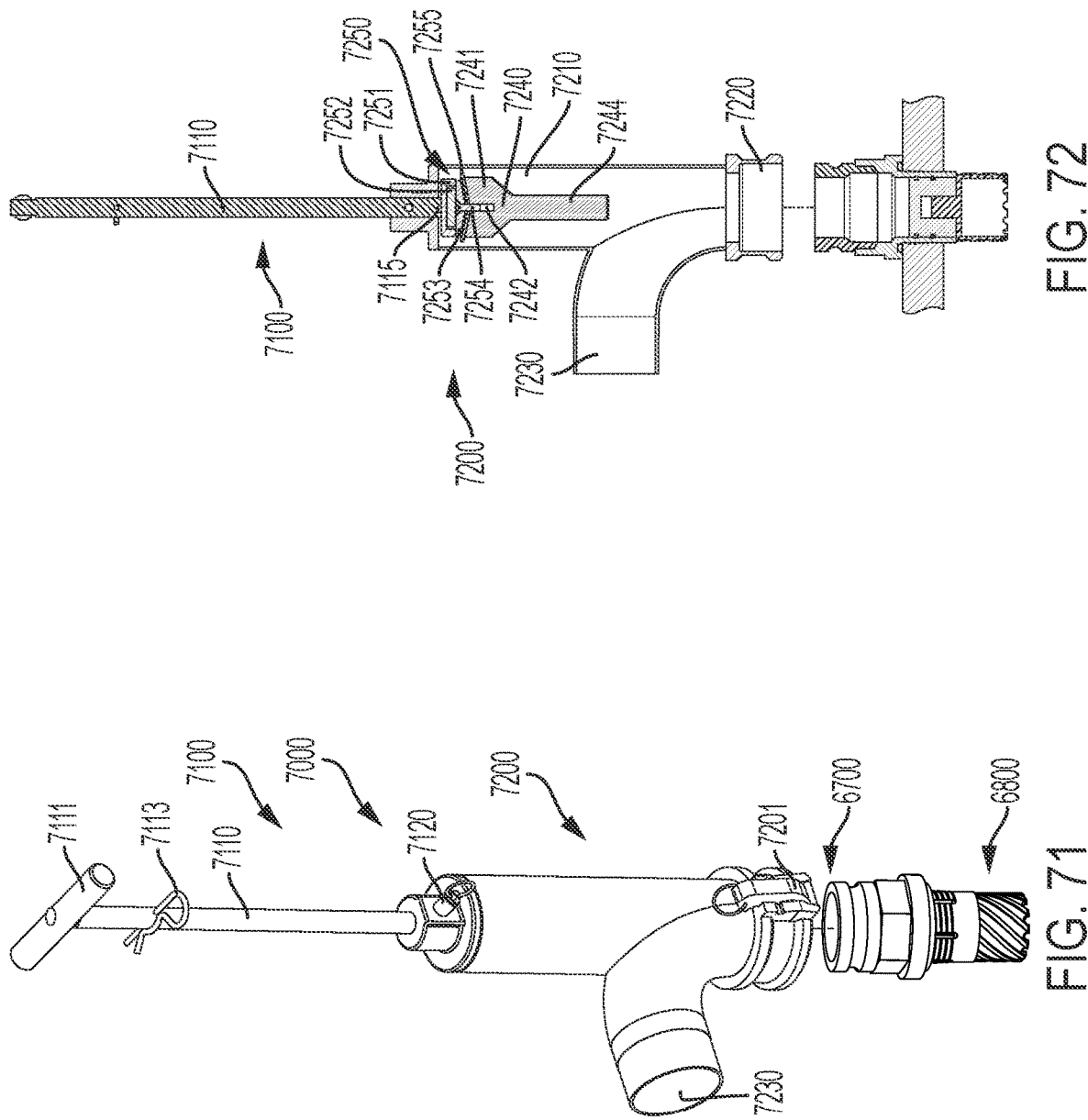

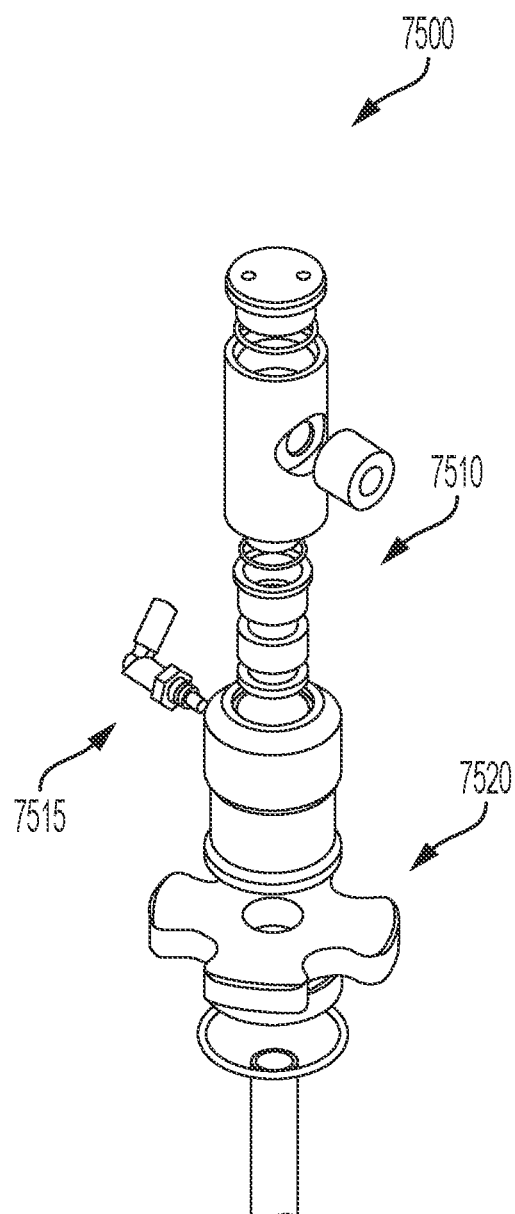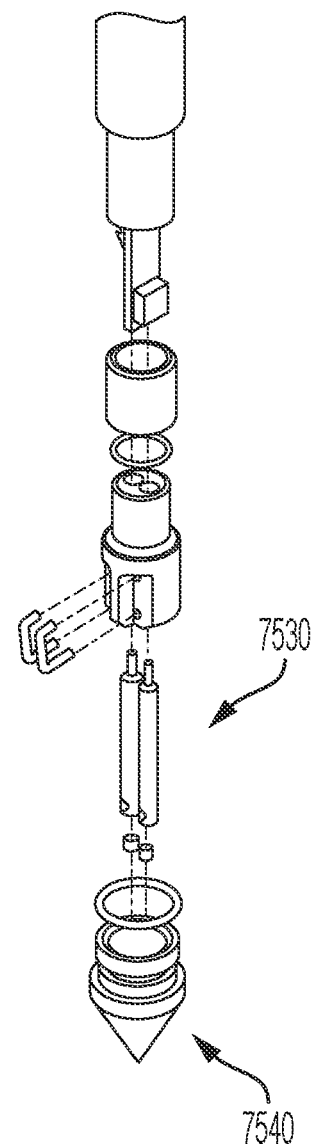
FIG. 79A
FIG. 79B

MARINE SALVAGE DRILL ASSEMBLIES AND SYSTEMS

CROSS-REFERENCE TO RELATED APPLICATIONS

This application is a continuation application claiming priority under 35 U.S.C. § 120 to U.S. patent application Ser. No. 17/844,594, entitled MARINE SALVAGE DRILL ASSEMBLIES AND SYSTEMS, filed Jun. 20, 2022, now U.S. Patent Application Publication No. 2022/0388616, which is a continuation application claiming priority under 35 U.S.C. § 120 to U.S. patent application Ser. No. 17/231,380, entitled MARINE SALVAGE DRILL ASSEMBLIES AND SYSTEMS, filed Apr. 15, 2021, which issued on Jun. 21, 2022 as U.S. Pat. No. 11,364,982, which is a divisional application claiming priority under 35 U.S.C. § 121 to U.S. patent application Ser. No. 16/356,398, entitled MARINE SALVAGE DRILL ASSEMBLIES AND SYSTEMS, filed Mar. 18, 2019, which issued on May 25, 2021 as U.S. Pat. No. 11,014,639, which claims the benefit under 35 U.S.C. § 119(e) of the earlier filing date of U.S. Provisional Patent Application No. 62/644,676, entitled MARINE SALVAGE DRILL ASSEMBLIES AND SYSTEMS, filed Mar. 19, 2018, the entire disclosures of which are hereby incorporated by reference herein.

BACKGROUND

The present disclosure relates to drilling systems that may be employed for marine salvage.

SUMMARY

In various aspects of the present disclosure, a drilling system configured to install a tap assembly into a ship skin is disclosed. The drilling system comprises a remotely-operated underwater vehicle and a drilling assembly configured to be operated by the remotely-operated underwater vehicle. The drilling assembly comprises a frame comprising an attachment element configured to hold the drilling assembly to a surface of the ship skin. The drilling assembly further comprises a drill actuation system comprising a linear actuator attached to the frame and a rotary actuator, wherein an actuation of the linear actuator is configured to move the rotary actuator relative to the frame to install the tap assembly into the ship skin by driving the tap assembly with the rotary actuator and the linear actuator.

BRIEF DESCRIPTION OF THE DRAWINGS

Various aspects described herein, together with advantages thereof, may be understood in accordance with the following description taken in conjunction with the accompanying drawings as follows.

FIG. 21A is a perspective view of a drill-motor mount for use with a drill assembly, according to at least one aspect of the present disclosure.

FIG. 21B is a front view of the drill-motor mount of FIG. 21A, according to at least one aspect of the present disclosure.

FIG. 21C is a side view of the drill-motor mount of FIG. 21A, according to at least one aspect of the present disclosure.

FIG. 21D is a perspective view of a drill chuck member for use with a drill assembly, according to at least one aspect of the present disclosure.

FIG. 21E is a top view of the drill chuck member of FIG. 21D, according to at least one aspect of the present disclosure.

FIG. 21F is a cross-sectional view of the drill chuck member of FIG. 21D taken along line 21F-21F in FIG. 21E, according to at least one aspect of the present disclosure.

FIG. 35A is a perspective view of a drill assembly, according to at least one aspect of the present disclosure.

FIG. 35B is a perspective view of the drill assembly of FIG. 35A, according to at least one aspect of the present disclosure.

FIG. 35C is a perspective view of drill bits of the drill assembly of FIG. 35A, according to at least one aspect of the present disclosure.

FIG. 36A is a perspective view of a drill bit arrangement for use with a drill assembly, according to at least one aspect of the present disclosure.

FIG. 36B is a perspective view of a drill bit arrangement for use with a drill assembly, according to at least one aspect of the present disclosure.

FIG. 36C is a perspective view of a drill bit arrangement for use with a drill assembly, according to at least one aspect of the present disclosure.

FIG. 36D is a perspective view of a drill bit arrangement for use with a drill assembly, according to at least one aspect of the present disclosure.

FIG. 37 is several views of various types of drill bits for use with a drill assembly, according to at least one aspect of the present disclosure.

FIG. 53 is a perspective view of the drilling system of FIG. 49, wherein the drilling system comprises a drill frame, a linear actuator, and a drill, according to at least one aspect of the present disclosure.

FIG. 54 is an elevational view of the drilling system of FIG. 53, according to at least one aspect of the present disclosure.

FIG. 55 is a bottom perspective view of the drilling system of FIG. 53, according to at least one aspect of the present disclosure.

FIG. 71 is a partially exploded view of a hose connection assembly and a tap assembly to which the hose connection assembly is configured to be attached, according to at least one aspect of the present disclosure.

FIG. 72 is a cross-sectional elevation view of the hose connection assembly of FIG. 71 illustrated in an unactuated configuration, according to at least one aspect of the present disclosure.

FIG. 78 is a cross-sectional elevation view of the hose connection assembly and the tap assembly of FIG. 73, wherein the hose connection assembly is illustrated in an uninstalled position, according to at least one aspect of the present disclosure.

FIGS. 79A and 79B are exploded views of a fluid-interface detection device configured to detect the interface of different fluids by detecting the different electrical conductivities of each fluid, wherein FIG. 79A depicts an upper portion of the fluid-interface detection device and FIG. 79B depicts a lower portion of the fluid-interface detection device, according to at least one aspect of the present disclosure.

Figure 80:
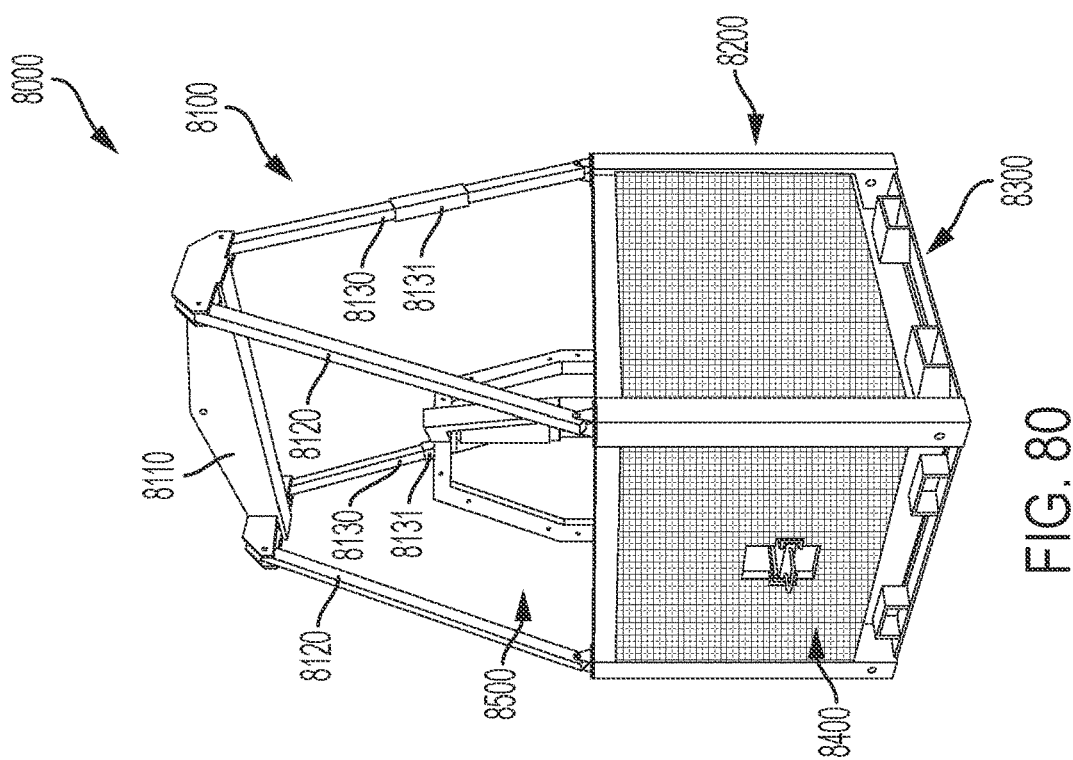

FIG. 80 is a perspective view of a transport hub in accordance with at least one aspect of the present disclosure and a drill assembly, wherein the transport hub is configured to transport the drill assembly to a target drilling site, and wherein the transport hub is illustrated in a fully erect configuration, according to at least one aspect of the present disclosure.

Figure 81:
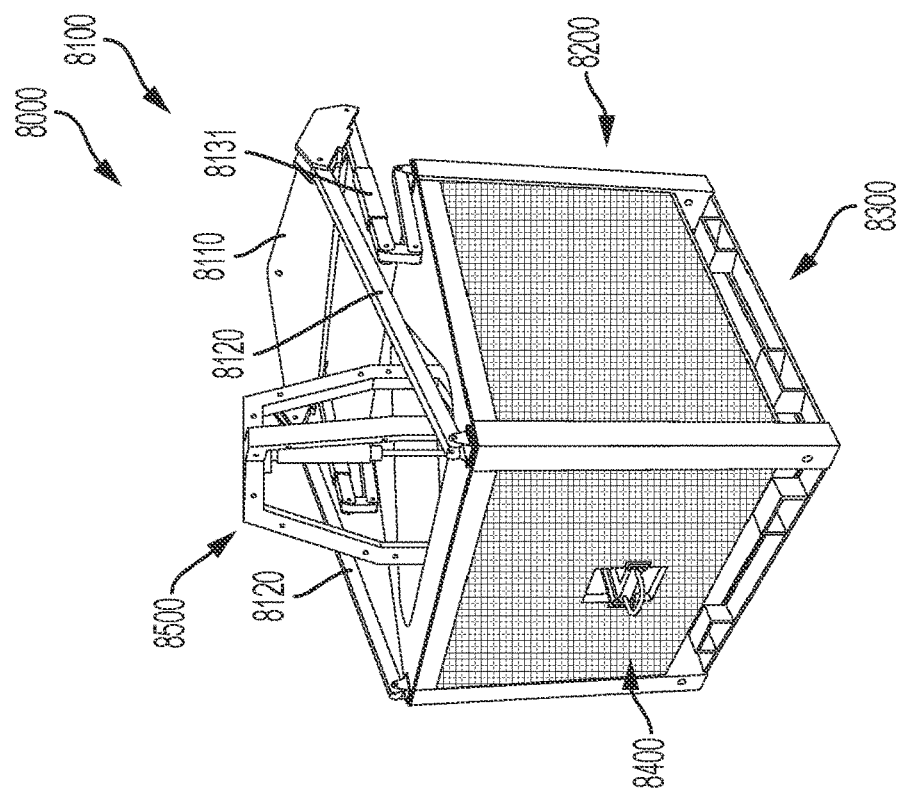

FIG. 81 is a perspective view of the transport hub of FIG. 80, wherein the transport hub is illustrated in a collapsed configuration such that the drill assembly may be removed from the transport hub, according to at least one aspect of the present disclosure.

Figure 82:
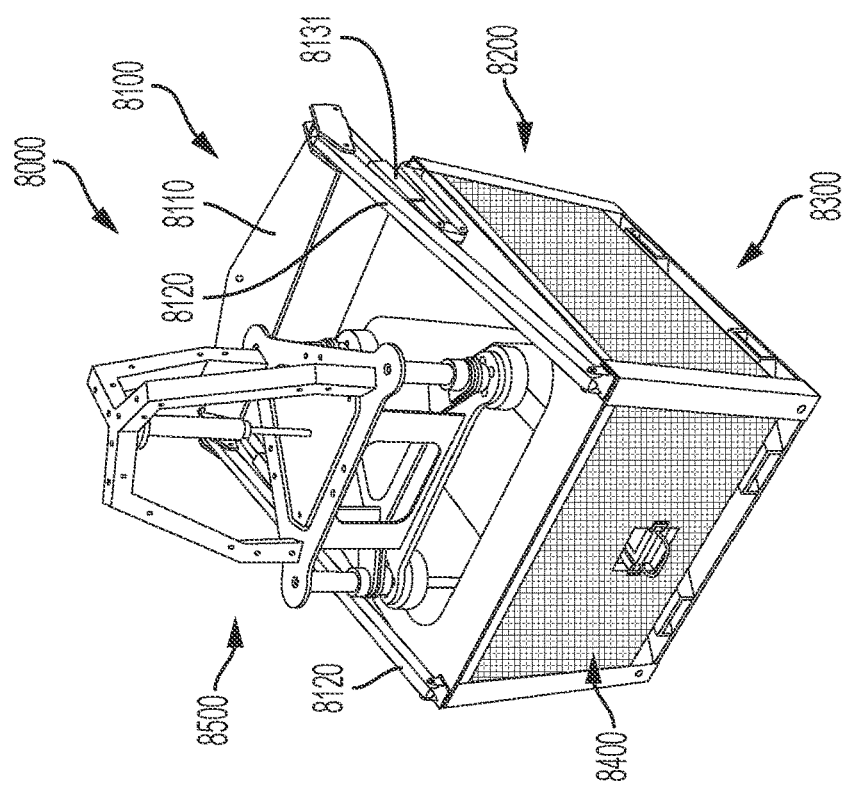

FIG. 82 is a perspective view of the transport hub of FIG. 80 illustrating the drill assembly in a removed position relative to the transport hub, according to at least one aspect of the present disclosure.

Figure 83:
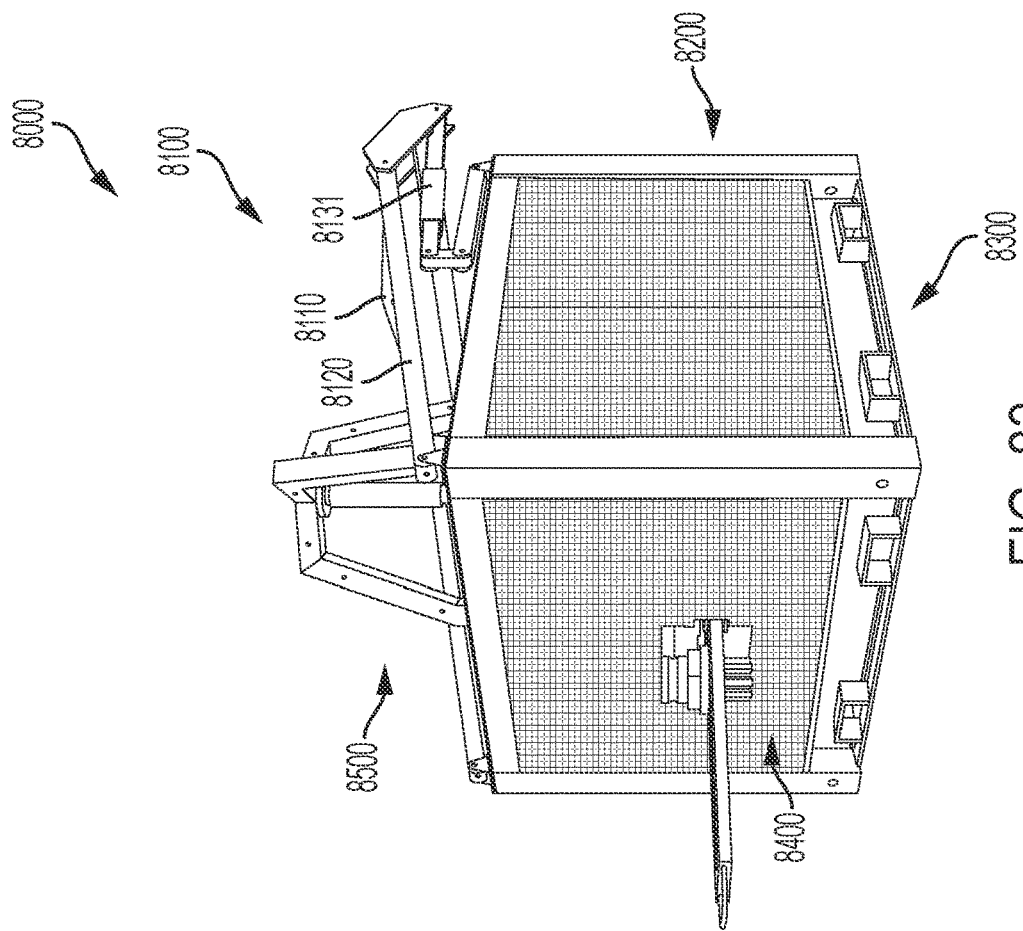

FIG. 83 is a perspective view of a transport hub of FIG. 80, wherein the transport hub further comprises reloading mechanism configured to reload a drill assembly when a new bit assembly is needed, and wherein the transport hub is illustrated in a reload-ready configuration, according to at least one aspect of the present disclosure.

Corresponding reference characters indicate corresponding parts throughout the several views. The exemplifications set out herein illustrate various aspects of the present disclosure, in one form, and such exemplifications are not to be construed as limiting the scope of the invention in any manner.

DETAILED DESCRIPTION

Before explaining various aspects of drilling assemblies and systems, it should be noted that the illustrative examples are not limited in application or use to the details of construction and arrangement of parts illustrated in the accompanying drawings and description. The illustrative examples may be implemented or incorporated in other aspects, variations and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects and/or examples.

One function of marine salvaging can include the removal, or extraction, of fluid contained within a disabled vessel or marine vehicle. Leaving fluids within a disabled vessel can pose a potential environmental hazard. A vessel may be classified as disabled if the vessel has sunken to an ocean floor, for example, or is otherwise unable to return to a condition where the vessel can independently discard of its fluids. The fluid to be extracted can comprise fuel, for example. In one instance, the fuel is contained within a fuel tank of the vessel. In another instance, the fuel is contained within the vessel's cargo area. At any rate, the extraction of fluid from a disabled vessel can mitigate the risk of a potential environmental hazard.

In one instance, methods for extracting fluid from a disabled vessel involve a human diver manually drilling a hole in a vessel. Manual drilling requires numerous steps and devices. A diver must locate the fluid to be extracted and assess where to drill a hole in the vessel to extract the fluid. In many instances, the frame of a vessel runs behind, or adjacent to, the outer shell, or skin, of the vessel. This poses a risk of drilling into the frame which can cause a drill bit to fail and/or leaking of the fluid from the vessel. Current methods for deciding where to drill a hole involve tapping on the vessel's outer shell and listening to the tone of the taps until a hollow-sounding tap is found—similar to locating studs in a wall.

In one instance, once the diver finds a spot to drill, the diver then installs a flange piece on the outer shell. The flange piece can be attached to the outer shell of the vessel by inserting self-tapping stud bolts and using the stud bolts to bolt the flange to the outer shell, for example. Once the flange is attached to the outer shell of the vessel, a valve is attached to the flange by way of bolts, for example. Once the valve is installed, the diver installs a drill assembly by bolting the drill assembly to the valve. Once the drill assembly is installed, the valve is opened. The diver can now actuate the drill and, thus, the drill bit which is configured to pass through the valve and the flange to drill a hole in the outer shell of the vessel. The drill bit can act as a temporary fluid stop to prevent fluid spilling out during the drilling process. Once the hole is drilled, the drill bit is raised above the valve, the valve is closed, and the drill is removed. Once the drill is removed, the fluid can be extracted by way of a port in the valve. A drilling and extraction process, as described herein, can be expensive, tedious, and may pose certain dangers. Additionally, such a process may only be performed in generally shallow water that is accessible to divers.

In certain instances, several taps can be installed on a vessel to extract the fluid. To replace the extracted fluid, water can be injected into the vessel via the taps. In other instances, water can flow into the vessel via a first tap when fluid is pumped out of the vessel from another tap. For example, several taps can form a circulation system, which can be coupled to a heating system and/or storage tank. Hot water or steam can warm the water and/or fuel mixture within the vessel to lower the viscosity such that fuel can be skimmed from the tank and replaced with water. When the appropriate fluid has been extracted and/or injected into the vessel, the tap can be capped, for example. In such instances, the tap can be permanent.

The taps installed in a vessel can be referred to as "hot taps", for example.

In various instances, a drill bit and a tap can define an integral assembly. The drill bit and the tap can define a single-piece component. In one instance, the drill bit and the tap can be welded together. In other instances, the drill bit and the tap can be connected via a plug assembly. For example, the drill bit can be welded to the plug assembly, which can be drivingly engaged with and removably seated within the tap. As described herein, the drill bit and the tap can become separated during the tap installation process.

An overview of a fluid extraction system will now be described. Several components discussed below are described in greater detail throughout the present disclosure. First, a vessel containing all of the necessary equipment to extract fluid from a sunken ship is positioned near the sunken ship. Once the vessel takes its position, a crane positioned on the vessel is used to lower a transport hub containing a drilling assembly next to the sunken ship on the ocean floor. The transport hub is tethered to a control interface on the vessel to transmit hydraulic fluid between a hydraulic power pack and the transport hub and to transmit electrical signals and data signals between the control interface and the transport hub. The transport hub is also tethered to the drill assembly to transmit hydraulic fluid, electrical signals, and data signals between the transport hub and the drill assembly.

Once the transport hub is positioned next to the ocean floor, a remotely-operated underwater vehicle (ROV) and/or a diver removes the drill assembly from the transport hub and takes the drill assembly to a drilling location. Once the drilling assembly is positioned at the drilling location, the drilling assembly is positioned against a surface of the sunken ship. At this point, electromagnets on the drilling assembly may be activated via the control interface on the vessel to attach the drill assembly to the surface of the sunken ship. Once the drilling assembly is attached to the surface, a hydraulic drill of the drilling assembly may be actuated to install a tap element into the skin of the sunken ship. After the tap element is installed, the magnets of the drilling assembly may be deactivated so that the drilling assembly can be positioned back in the transport hub. Once positioned in the transport hub, the drilling assembly may be reloaded with another tap element.

Upon removal of the drilling assembly from the installed tap element, the tap element remains sealed with a plug and an annular cutter. To extract fluid from the tap element, a hose connection assembly is attached to the tap element, the plug and cutter are punched out of the tap element and into the ship haul, and fluid is vacuumed out of the hose connection assembly. The hose connection assembly can then seal the tap element after fluid extraction such that an element of the hose connection assembly remains in the tap element after fluid extraction. The tap element may be re-accessed by using another hose connection assembly that punches out the element remaining in the tap element from the previous hose connection assembly.

All of the steps described herein may either be performed by an ROV exclusively, an ROV with the assistance of a diver, and/or with a diver exclusively.

The hoses and/or transmission lines can be stored on reels on the vessel and/or in the transport hub. For example, the hoses and/or transmission lines transmitting fluid and/or electrical signals between the vessel and the transport hub may be stored on one or more reels positioned on the vessel. Also, the hoses and/or transmission lines transmitting fluid and/or electrical signals between the transport hub and the drill assembly may be stored on one or more reels on the transport hub.

FIGS. 1A-1D depict a drill assembly 100 according to one aspect of the present disclosure. The drill assembly 100 comprises a base 109, a linear actuator system 130, a bit drive 140 configured to be raised and lowered by the linear actuator system 130, and a bit assembly 150 configured to be driven by the bit drive 140. Various bit drives are further described herein. For example, the bit drive 140 can be a continuous-style, rotary motor. The drill assembly 100 is configured to drill a hole in the side of a vessel hull, for example, and install a tap in the vessel hull. This tap can then be used as a passage for fluid extraction from the vessel.

The base 109 comprises a first base element 110 and a second base element 120 attached to the first base element 110. The first base element 110 comprises an attachment portion 112 configured to be received within a slot 121 defined in the second base element 120. The base 109 further comprises attachment elements 106 attached to the first base element 110 and the second base element 120 that are configured to attach and/or hold the drill assembly 100 to the vessel hull. The base 109 further comprises a release mechanism 101 comprising a drive screw, for example. The release mechanism 101 comprises a base 102 configured to push against the vessel hull and a lever 104 configured to rotate the release mechanism 101. The release mechanism 101 is threadably received within a threaded aperture 123 defined in the second base element 120. The lever 104 is rotated to lift the second base element 120 and, thus, the attachment elements 106 away from the vessel hull. In various instances, the release mechanism 101 can be used to pry the drill assembly 100 away from the vessel hull.

The linear actuator system 130 comprises a frame 132 and a manual actuator 133 rotatably supported within the frame 132. The manual actuator 133 is configured to rotate a pinion gear, which linearly actuates a rack gear 135 attached to a slide 136 slidably supported against the frame 132 via rails 137. The rails 137 are fixedly attached to the frame 132 and the rack gear 135 is fixedly attached to the slide 136. These attachment points can include bolts and/or screws, for example. Thus, the slide 136 is configured to slide relative to the frame 132 as the manual actuator 133 is rotated to move the bit drive 140 up and down relative to the frame 132.

The linear actuator system 130 comprises a mounting bracket 141 to which the bit drive 140 is mounted. The mounting bracket 141 is attached to the slide 136 by way of bolts, for example. The bit assembly 150 is attached to a chuck 146 of the bit drive 140. The bit assembly 150 includes a tap 152 received within the chuck 146 such that the chuck 146 drives the tap 152. The bit assembly 150 also includes a drill bit 154 removably positioned within and drivingly engaged with the tap 152 such that the tap 152 drives the drill bit 154 but can be removed from the bit assembly 150 for fluid extraction, as discussed in greater detail herein.

Figure 1A:
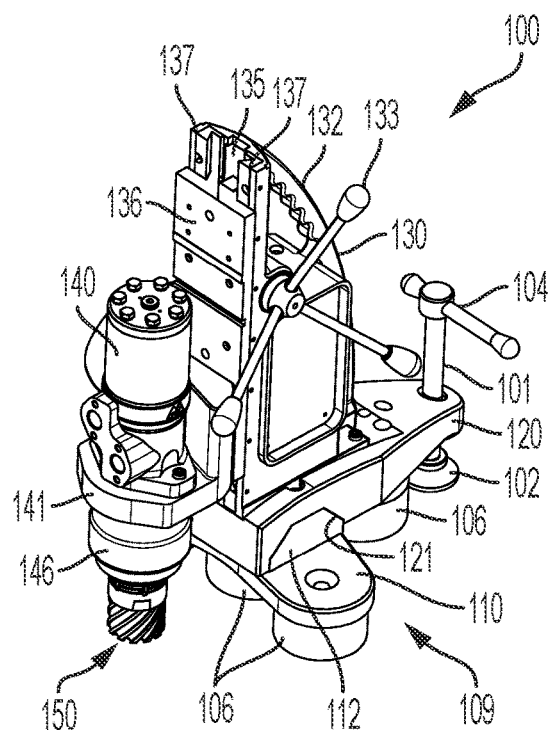
FIG. 1A a perspective view of a drill assembly comprising a base, a drill-actuator frame, and a drill, according to at least one aspect of the present disclosure.
Figure 1B:
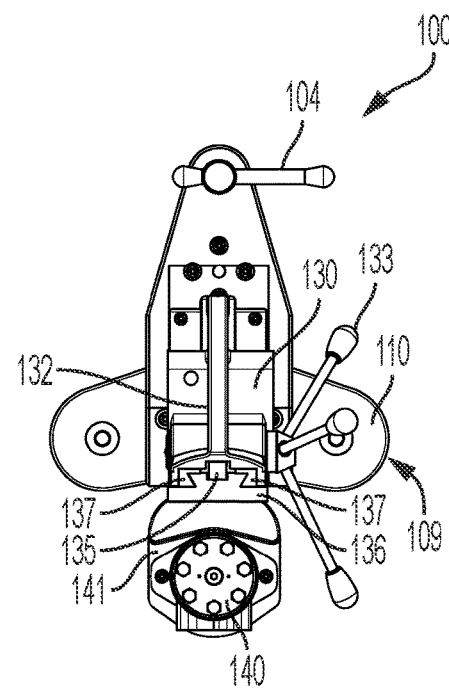
FIG. 1B is a top view of the drill assembly of FIG. 1A, according to at least one aspect of the present disclosure.
Figure 1C:
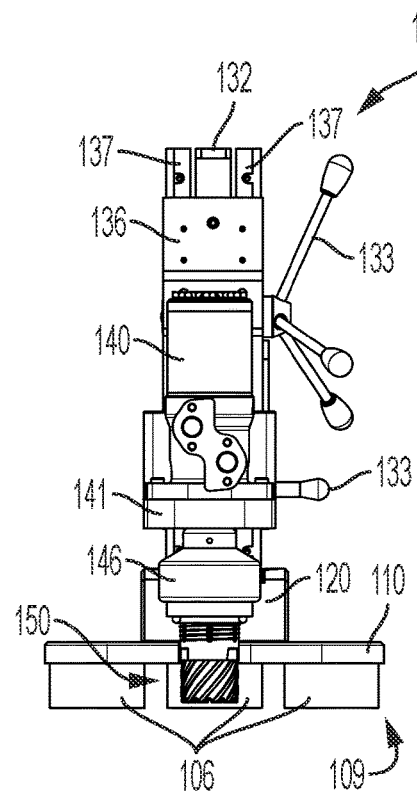
FIG. 1C is a front view of the drill assembly of FIG. 1A, according to at least one aspect of the present disclosure.
Figure 1D:
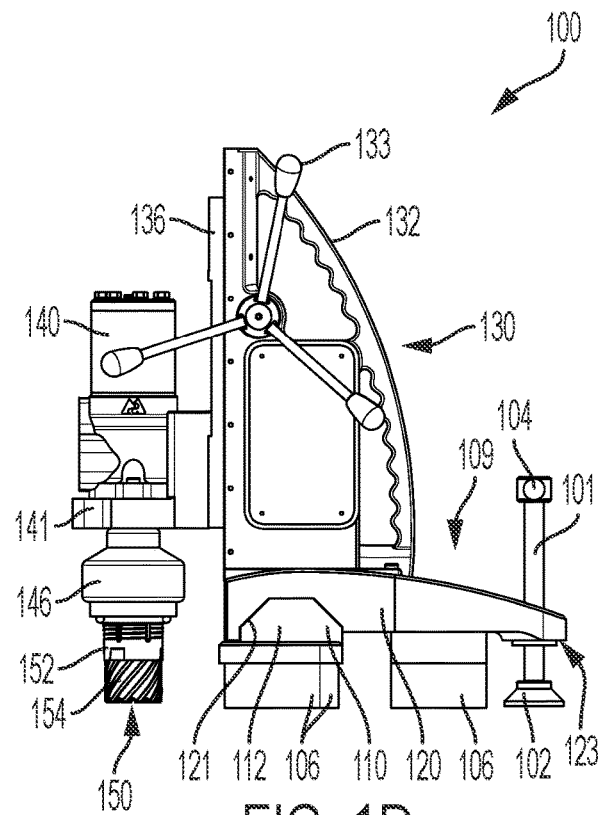
FIG. 1D is a side view of the drill assembly of FIG. 1A, according to at least one aspect of the present disclosure.
Figure 1E:
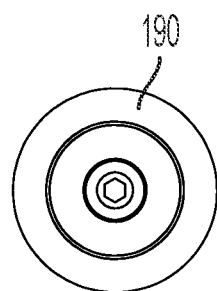
FIG. 1E is a top view of a cap configured to cover a tap, according to at least one aspect of the present disclosure.
Figure 1F:
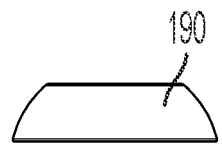
FIG. 1F is a side view of the cap of FIG. 1E, according to at least one aspect of the present disclosure.
Figures 2A, 2B, 2C, 2D:
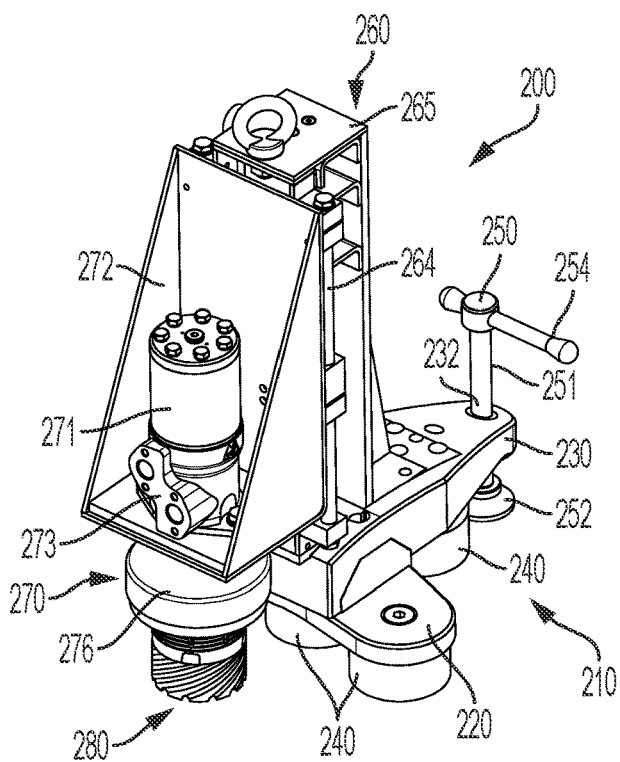
FIG. 2A a perspective view of a drill assembly comprising a base, a drill-actuator frame, and a drill, according to at least one aspect of the present disclosure.
FIG. 2B is a top view of the drill assembly of FIG. 2A, according to at least one aspect of the present disclosure.
FIG. 2C is a front view of the drill assembly of FIG. 2A, according to at least one aspect of the present disclosure.
FIG. 2D is a side view of the drill assembly of FIG. 2A, according to at least one aspect of the present disclosure.
Figure 3A:
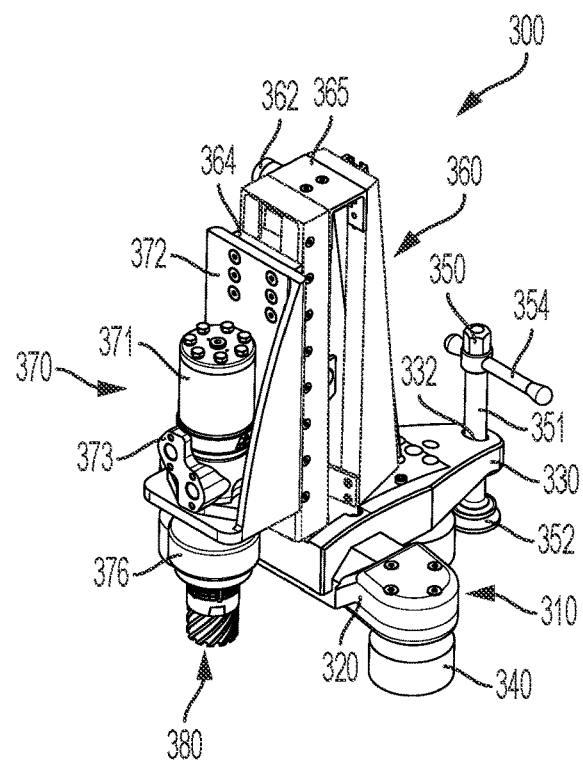
FIG. 3A a perspective view of a drill assembly comprising a base, a drill-actuator frame, and a drill, according to at least one aspect of the present disclosure.
Figure 3B:
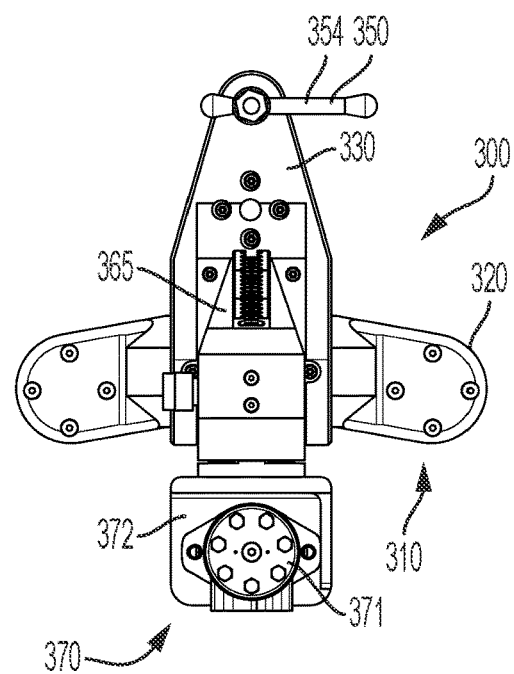
FIG. 3B is a top view of the drill assembly of FIG. 3A, according to at least one aspect of the present disclosure.
Figure 3C:
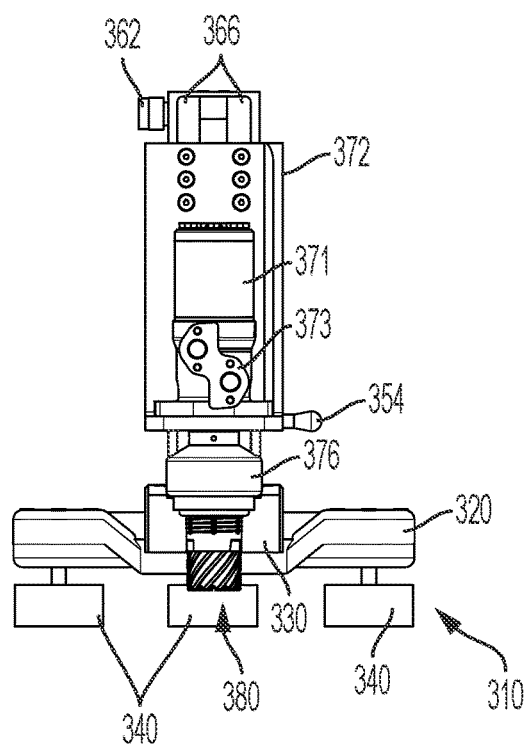
FIG. 3C is a front view of the drill assembly of FIG. 3A, according to at least one aspect of the present disclosure.
Figure 3D:
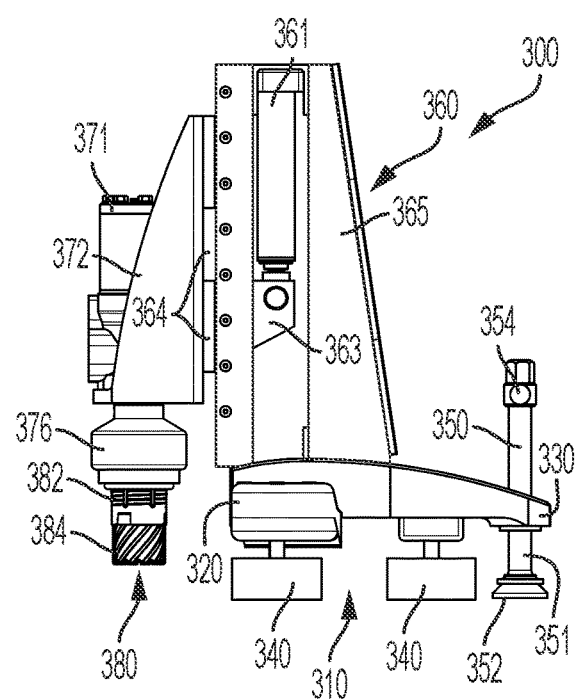
FIG. 3D is a side view of the drill assembly of FIG. 3A, according to at least one aspect of the present disclosure.

FIGS. 1E and 1F depict a cap 190 configured to be installed on a tap assembly after the fluid extraction process is complete. The cap 190 may be removable or permanent. In at least one instance, the cap 190 comprises a key-lock configured to prevent someone without the key from removing the cap 190 from the installed tap assembly.

FIGS. 2A-2D depict a drill assembly 200 according to one aspect of the present disclosure. The drill assembly 200 comprises a base 210, a linear actuator system 260, a bit drive system 270 configured to be raised and lowered by the linear actuator system 260, and a bit assembly 280 configured to be driven by the bit drive system 270. The drill assembly 200 is configured to drill a hole in the side of a vessel hull, for example, and install a tap in the vessel hull. This tap can then be used as a passage for fluid extraction.

The base 210 comprises a first base element 220 and a second base element 230 attached to the first base element 220. The first base element 220 comprises an attachment portion 222 configured to be received within a slot 234 defined in the second base element 230. The base 210 further comprises attachment elements 240 attached to the first base element 220 and the second base element 230 that are configured to attach and/or hold the drill assembly 200 to the vessel hull. The base 210 further comprises a release mechanism 250 comprising a drive screw, for example. The release mechanism 250 comprises a base 252 configured to push against the vessel hull and a lever 254 configured to rotate the release mechanism 250. The release mechanism 250 comprises a threaded shaft 251 threadably received within a threaded aperture 232 defined in the second base element 230. The lever 254 is rotated to lift the second base element 230 and, thus, the attachment elements 240 away from the vessel hull.

The linear actuator system 260 comprises a frame 265 and a fluidic actuator 261 fixedly attached to the frame 265. The fluidic actuator 261 may comprise a hydraulic or pneumatic actuator. The fluidic actuator 261 comprises a fluid coupling port 262 configured to provide the necessary actuation fluid to the fluidic actuator 261. The fluidic actuator 261 is configured to linearly actuate a link 263 attached to a drive rod of the fluidic actuator 261. The link 263 is pivotably coupled to the drive rod of the fluidic actuator 261. These attachment points can utilize bolts and/or screws, for example. Thus, the link 263 is configured to be actuated by the fluidic actuator 261 to move the bit drive system 270 up and down relative to the frame 265.

The bit drive system 270 comprises a mounting bracket 272 to which the bit drive 271 of the bit drive system 270 is mounted. The bit drive 271 can comprise any suitable bit drive. For example, the bit drive 271 can comprise a fluidic bit drive or an electric bit drive. The bit drive 271 may also comprise a torque relief system to help prevent breaking of the drill bits. In instances where the bit drive 271 comprises a fluidic bit drive, the bit drive 271 can be fitted with a pressure release valve 273 configured to transfer the reaction torque caused by the drilling of a hole to a spring in a valve coupled with the fluidic drive lines, for example, such that, upon exceeding a threshold torque, the valve can open and release driving pressure within the fluidic bit drive. In instances where the bit drive 271 comprises an electric bit drive, the bit drive 271 can be fitted with a torque limiter sensor. In other instances, the bit drive 271 can be fitted with a torque limiting clutch mechanism.

The mounting bracket 272 is attached to the link 263 such that the mounting bracket 272 can be moved relative to the frame 265 by the fluidic actuator 261. The mounting bracket 272 comprises guide elements 274 slidably supported by guide rails 264 of the linear actuator system 260. The guide rails 264 are fixedly attached to the linear actuator system 260. The guide rails 264 also comprise upper and lower stops 275 configured to prevent the bit drive system 270 from falling off of the guide rails 264. The bit assembly 280 is attached to a chuck 276 of the bit drive system 270. The chuck 276 is fixedly attached to a spindle of the bit drive 271. The bit assembly 280 comprises a tap 282 received within the chuck 276 such that the chuck 276 drives the tap 282. The bit assembly 280 also includes a drill bit 284 removably positioned within and drivingly engaged with the tap 282 such that the tap 282 drives the drill bit 284 but can be removed from the bit assembly 280 for fluid extraction, as discussed in greater detail herein.

FIGS. 3A-3D depict a drill assembly 300 according to one aspect of the present disclosure. The drill assembly 300 comprises a base 310, a linear actuator system 360, a bit drive system 370 configured to be raised and lowered by the linear actuator system 360, and a bit assembly 380 configured to be driven by the bit drive system 370. The drill assembly 300 is configured to drill a hole in the side of a vessel hull, for example, and install a tap in the vessel hull. This tap can then be used as a passage for fluid extraction.

The base 310 comprises a first base element 320 and a second base element 330 attached to the first base element 320. The base 310 further comprises attachment elements 340 attached to the first base element 320 and the second base element 330 that are configured to attach and/or hold the drill assembly 300 to the vessel hull. The base 310 further comprises a release mechanism 350 comprising a drive screw, for example. The release mechanism 350 comprises a base 352 configured to push against the vessel hull and a lever 354 configured to rotate the release mechanism 350. The release mechanism 350 comprises a threaded shaft 351 threadably received within a threaded aperture 332 defined in the second base element 330. The lever 354 is rotated to lift the second base element 330 and, thus, the attachment elements 340 away from the vessel hull.

The linear actuator system 360 comprises a frame 365 and a fluidic actuator 361 fixedly attached to the frame 365. The fluidic actuator 361 may comprise a hydraulic or pneumatic actuator. The fluidic actuator 361 comprises a fluid coupling port 362 configured to provide the necessary actuation fluid to the fluidic actuator 361. The fluidic actuator 361 is configured to linearly actuate a link 363 attached to a drive rod of the fluidic actuator 361. The link 363 is pivotably coupled to the drive rod of the fluidic actuator 361. These attachment points can utilize bolts and/or screws, for example. Thus, the link 363 is configured to be actuated by the fluidic actuator 361 to move the hydraulic or electric bit drive system 370 up and down relative to the frame 365.

Referring again to FIGS. 1A-1D, a manual actuator 133 is employed to actuate the linear actuation system 130. A diver can rotate the manual actuator 133 to lift and/or lower the linear actuation system 130. In other instances, the actuation systems for a drilling assembly can be actuated remotely. For example, the linear actuation systems 260 (FIGS. 2A-2D) and 360 (FIGS. 3A-3D) can be remotely-actuated. In such instances, a diver may not be required at the tapping site. For example, the drill assembly can employ a diver-less operation.

Referring again to FIGS. 3A-3D, the bit drive system 370 comprises a mounting bracket 372 to which a bit drive 371 of the bit drive system 370 is mounted. The bit drive 371 can comprise any suitable bit drive such as the bit drives discussed herein. The bit drive 371 comprises a pressure release valve 373 configured to transfer the reaction torque caused by the drilling of a hole to a spring in a valve coupled with the fluidic drive lines, for example, such that, upon exceeding a threshold torque, the valve can open and release driving pressure within the fluidic bit drive.

The mounting bracket 372 is attached to the link 363 by way of slider plates 364 of the linear actuator system 360 such that the mounting bracket 372 can be moved relative to the frame 365 by the fluidic actuator 361. The frame 365 comprises guide elements 366 configured to slidably support the slider plates 364 thereagainst. The link 363 may only be physically attached to one of the slider plates 364 such as, for example, the bottom slider plate 364. In other instances, both slider plates 364 are fixedly attached to a link mechanism that links the drive rod of the fluidic actuator 361 with the mounting bracket 372. The bit assembly 380 is attached to a chuck 376 of the bit drive system 370. The chuck 376 is fixedly attached to a spindle of the bit drive 371. The bit assembly 380 comprises a tap 382 received within the chuck 376 such that the chuck 376 drives the tap 382. The bit assembly 380 also includes a drill bit 384 removably positioned within and drivingly engaged with the tap 382 such that the tap 382 drives the drill bit 384 but can be removed from the bit assembly 380 for fluid extraction, as discussed in greater detail herein.

In various instances, the bit drive system for a drill assembly can be actuated remotely. For example, the bit drive systems 140 (FIGS. 1A-1D), 270 (FIGS. 2A-2D) and 370 (FIGS. 3A-3D) can be remotely actuated. In such instances, a driver may not be required at the tapping site. For example, the drill assembly can employ a diver-less operation.

Figure 18A:
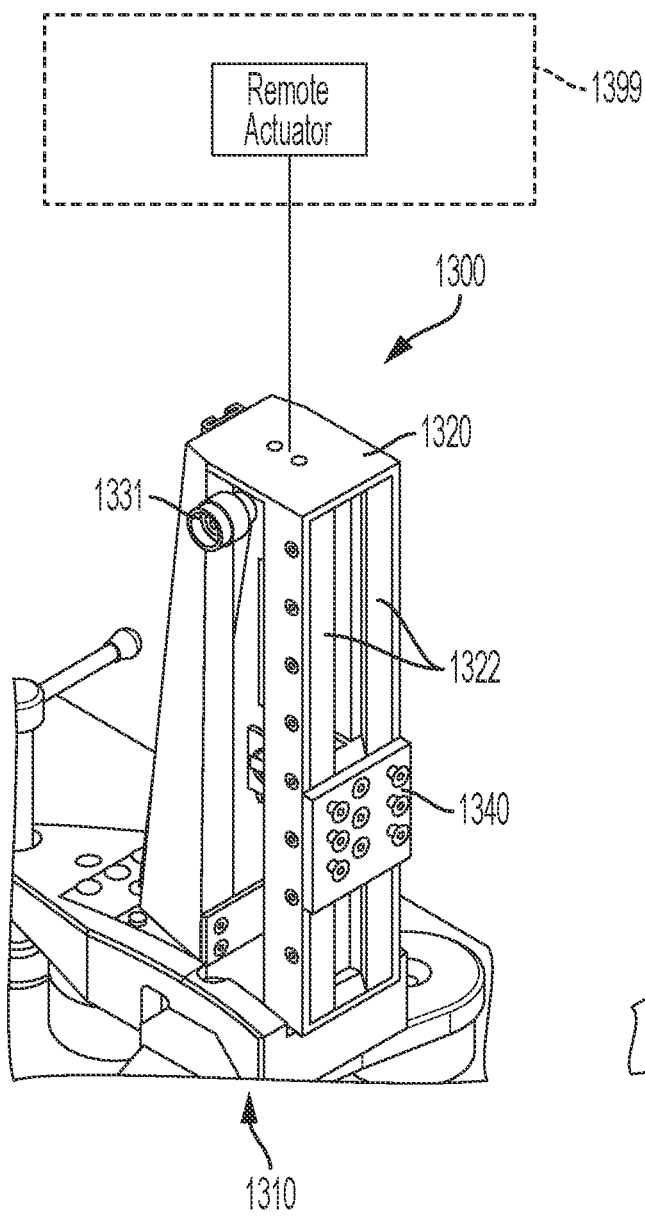
FIG. 18A is a perspective view of a linear actuator system mounted to the top of a drill assembly base, wherein the linear actuator system comprises a frame, a fluidic actuator, and a slider link configured to drive a bit assembly into a vessel hull, according to at least one aspect of the present disclosure.

In certain instances, drill assemblies for hot taps can be operated remotely. For example, control motions for the linear actuations and drilling motions of the drill assembly can be provided from a location that is remote from the tapping site. As an example, the remote location can be a temporary control station. In various instances, the remote location can be moveable. For example, a control station can be positioned on a barge or vessel that can be moved around and/or in the vicinity of the disabled vessel. The control station is remote from the tapping site but can control electrical and hydraulic actuations of the drill assembly at the tapping site. A remote control actuator can be configured to deliver the control motions to the drill assembly. An exemplary remote actuator is depicted in FIG. 18A. The reader will readily appreciate that the remote actuator depicted in FIG. 18A can be employed with various drill assemblies disclosed herein, including the drill assemblies 200 and 300, for example. The remote actuator can be positioned on a vessel 1399. In one example, the vessel 1399 can be barge, for example.

Additionally or alternatively, in certain instances, an ROV can be employed. For example, the vessel 1399 can be an ROV. The ROV can be tethered near the disabled vessel and can provide the hydraulic and/or electrical operating systems for the drill assembly. The ROV can communicate with a control station and can send control signals to the drill assembly, for example. In various instances, the ROV can deliver the drill assembly to the tapping site. For example, in water that is too deep for a diver, the ROV can deliver the drill assembly and provide commands thereto. The ROV can be in signal communication with the remote location. In such instances, the system can be diver-less.

Figure 4:
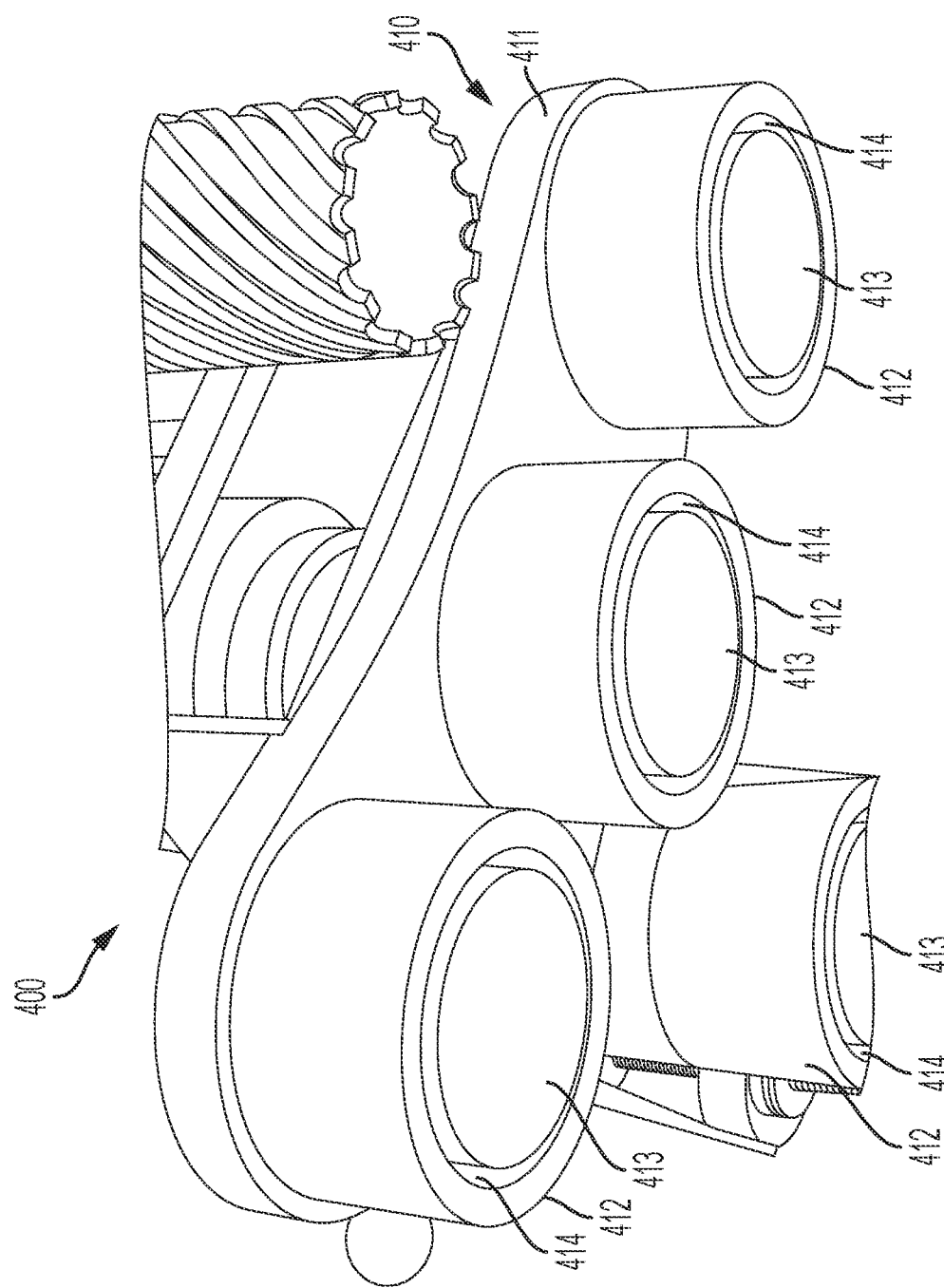
FIG. 4 is a bottom perspective view of a base of a drill assembly, according to at least one aspect of the present disclosure, wherein the base comprises a plurality of magnets.

FIG. 4 depicts a base 410 of a drill assembly 400 according to one aspect of this disclosure. The base 410 comprises a frame 411 and a plurality of magnets 413 mounted thereto. The magnets 413 may be electromagnets or rare earth magnets, for example. The magnets 413 are fixedly attached to the base 410 and each comprise an outer housing 412. The outer housings 412 may serve to isolate the attraction direction of the magnets 413. A space 414 is also provided between the magnet 413 and the outer housing 412. In other instances, there may be no space 414. In still other instances, there is no space 414 or outer housing 412.

Figure 5:
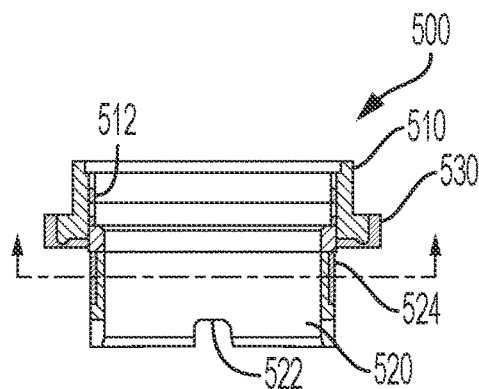
FIG. 5 is a cross-sectional view of a tap, according to at least one aspect of the present disclosure.

FIG. 5 depicts a tap 500 configured to be used with a drill assembly of the present disclosure. The tap 500 comprises an outer section 510, an inner section 520, and flange 530 configured to abut a surface of vessel hull, for example. The outer section 510 comprises threads 512 configured to receive a pipe fitting, for example, such that a pipe can be threadably coupled with the tap 500. The inner section 520 is configured to be positioned in the drilled hole and the vessel hull itself, for example, and comprises driving slots 522 configured to receive driving teeth of a bit assembly to be attached thereto. The inner section 520 further comprises self-tapping threads 524 configured to permit the tap 500 to be threadably engaged with a vessel hull, for example.

Figure 6:
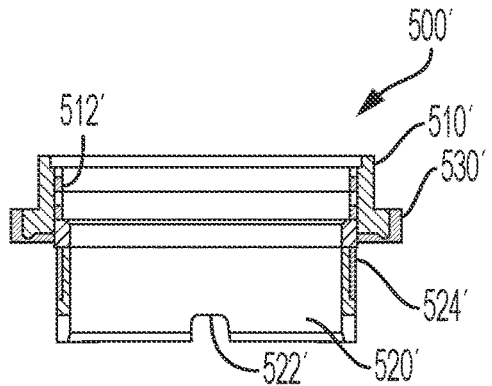
FIG. 6 is a cross-sectional view of a tap, according to at least one aspect of the present disclosure.

FIG. 6 depicts a tap 500' configured to be used with a drill assembly of the present disclosure. The tap 500' comprises an outer section 510', an inner section 520', and flange 530' configured to abut a surface of vessel hull, for example. The outer section 510' comprises threads 512' configured to receive a pipe fitting, for example, such that a pipe can be threadably coupled with the tap 500'. The inner section 520' is configured to be positioned in the drilled hole and the vessel hull itself, for example, and comprises driving slots 522' configured to receive driving teeth of a bit assembly to be attached thereto.

Figure 7:
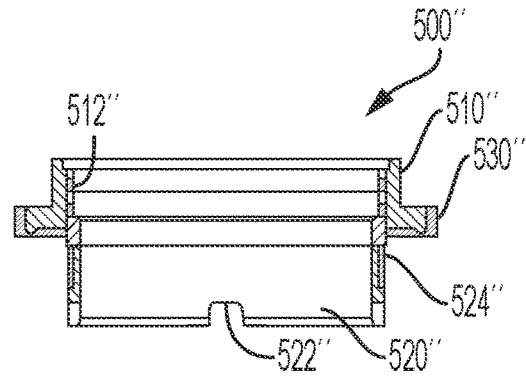
FIG. 7 is a cross-sectional view of a tap, according to at least one aspect of the present disclosure.

FIG. 7 depicts a tap 500" configured to be used with a drill assembly of the present disclosure. The tap 500" comprises an outer section 510", an inner section 520", and flange 530" configured to abut a surface of vessel hull, for example. The outer section 510" comprises threads 512" configured to receive a pipe fitting, for example, such that a pipe can be threadably coupled with the tap 500". The inner section 520" is configured to be positioned in the drilled hole and the vessel hull itself, for example, and comprises driving slots 522" configured to receive driving teeth of a bit assembly to be attached thereto. Taps, or tap elements, for marine salvage applications, such as the taps 500, 500', and 500", are discussed in greater detail herein.

Figure 8:
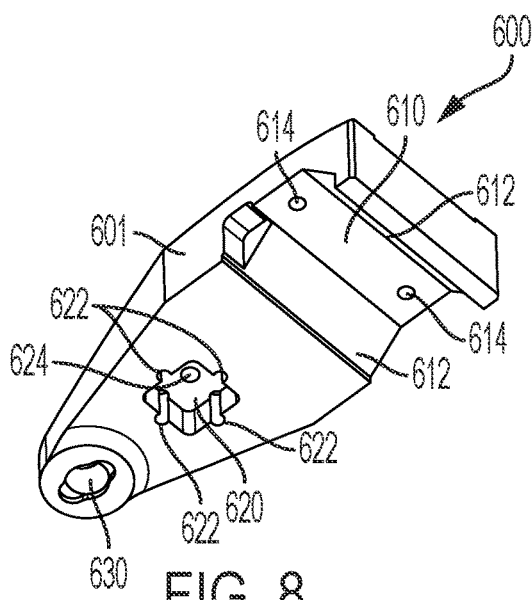
FIG. 8 is a bottom perspective view of a base member of a drill assembly base, according to at least one aspect of the present disclosure.
Figure 9:
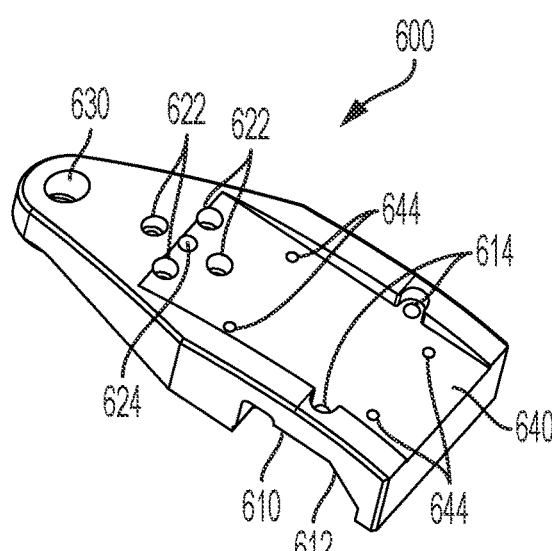
FIG. 9 is a top perspective view of the base member of FIG. 8, according to at least one aspect of the present disclosure.
Figure 10:
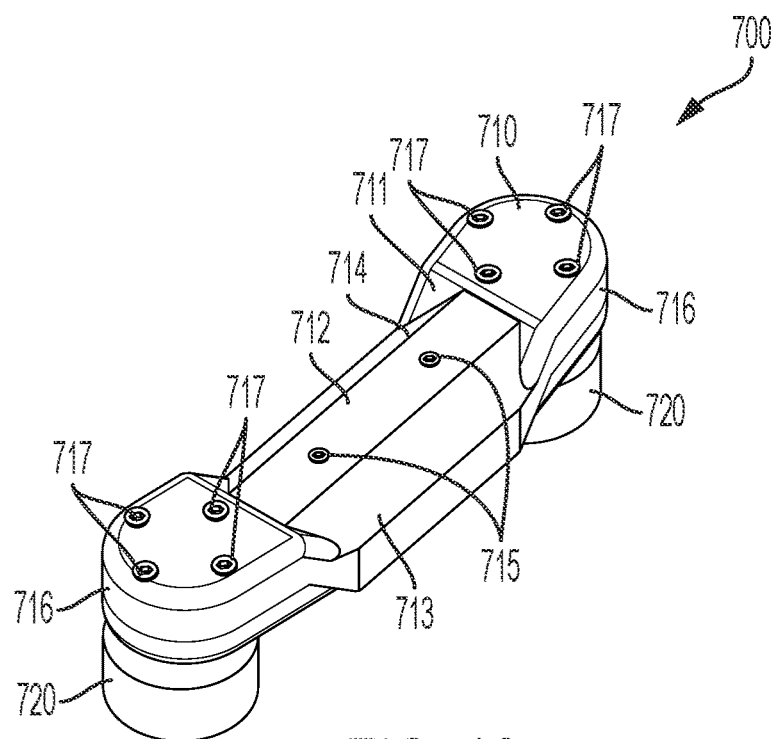
FIG. 10 is a perspective view of a base member of a drill assembly base, according to at least one aspect of the present disclosure.
Figure 11A:
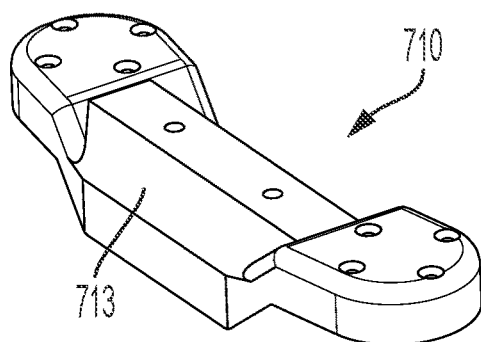
FIG. 11A is a perspective view of a portion of the base member of FIG. 10, according to at least one aspect of the present disclosure.
Figure 11B:
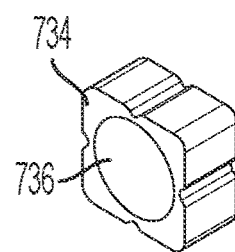
FIG. 11B is a perspective view of a portion of the base member of FIG. 10, according to at least one aspect of the present disclosure.
Figure 11C:
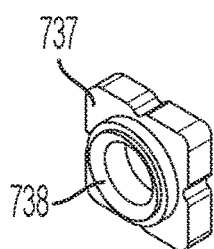
FIG. 11C is a perspective view of a portion of the base member of FIG. 10, according to at least one aspect of the present disclosure.
Figure 11D:
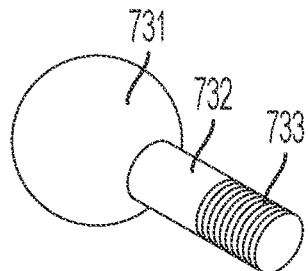
FIG. 11D is a perspective view of a portion of the base member of FIG. 10, according to at least one aspect of the present disclosure.

FIGS. 8 and 9 depict a base member 600 of a drill assembly base according to one aspect of the present disclosure. The base member 600 comprises a body 601 comprising a first channel 610 configured to receive another base member therein. The first channel 610 comprises angular walls 612 and fastening slots 614 configured to receive bolts, for example, therethrough to attach the other base member to the base member 600. The body 601 further comprises a cavity 620 configured to receive an attachment portion of an attachment element therein. The cavity 620 comprises fastener slots 622 configured to permit the bolting, for example, of the attachment element to the base member 600. The cavity 620 further comprises a port hole 624 defined therein. The port hole 624 may be used for an attachment member actuator. For example, where the attachment member comprises a suction cup, such a port hole can permit the sucking and blowing of air therethrough to actuate or release, respectively, the suction cup. Another example where such a port hole can be useful is when an electrical connection for an electromagnet may be needed. The port hole 624 may permit electrical cabling to be fed therethrough to an electromagnet. The body 601 further comprises a threaded slot 630 configured to threadably receive a release mechanism, such as the release mechanism 350, for example, therein. The body 601 further comprises a second channel 640 defined in the top of the base member 600. The second channel 640 is configured to receive a frame of a linear actuator system of the present disclosure such as, for example, the frame 365. A frame is configured to be bolted to the base member 600 with fastener apertures 644.

FIGS. 10 and 11A-11D depict a base member 700 of a drill assembly base according to one aspect of the present disclosure. The base member 700 comprises a frame portion 710 comprising a body 711. The body 711 comprises a center portion 712 comprising a planar surface 714 and angled surfaces 713. The planar surface 714 comprises fastener holes 715 defined therein configured to permit the attachment of another base member, such as base member 600, thereto. The body 711 further comprises outer portions 716 comprising fastener apertures, or fastener holes, 717 defined therein. The fastener apertures 717 are configured to attach an upper socket frame 734 and lower socket frame 737 to the body 711. The base member 700 further comprises a ball joint 731 comprising a threaded shaft 732 extending therefrom comprising threads 733. The ball joint 731 is configured to be supported within socket joint surfaces 736 and 738. Attachment elements, such as magnets 720 illustrated in FIG. 10, for example, are threadably coupled with the threaded shaft 732. The threads 733 permit the attachment elements 720 to be interchangeable with other attachment elements comprising a threaded aperture arrangement which corresponds to the threaded shaft 732.

Figure 12:
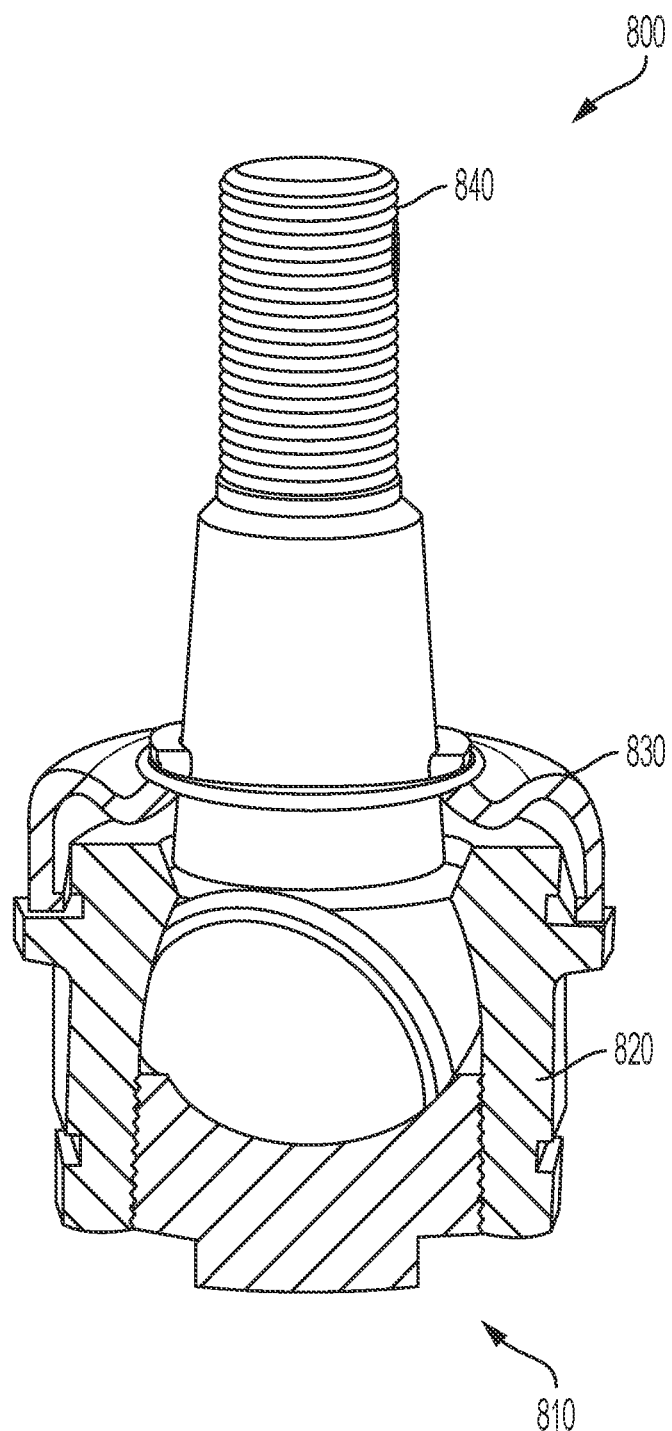
FIG. 12 is a partial cross-sectional view of an attachment element for a drill assembly base, according to at least one aspect of the present disclosure.

FIG. 12 depicts one example of a ball and socket attachment element 800 comprising a threaded shaft 840. In at least one instance, the threaded shaft 840 is configured to be threaded directly into a mounting hole drilled by an ROV and/or a diver in a vessel hull, for example. The ball and socket attachment element 800 further comprises a driving element 820 supporting the ball therein. The driving element 820 is configured to drive the ball and socket attachment element 800 into and/or out of the mounting hole in the vessel hull. The ball and socket attachment element 800 further comprises an attachment element 810 configured to be attached to a device external to the vessel hull. The ball and socket arrangement can permit a device, such as a drill frame, to be mounted to an uneven surface such as, for example, a rounded vessel hull. The ball and socket attachment element 800 further comprises a seal 830 configured to keep debris from getting into the ball and socket joint.

Figure 13:
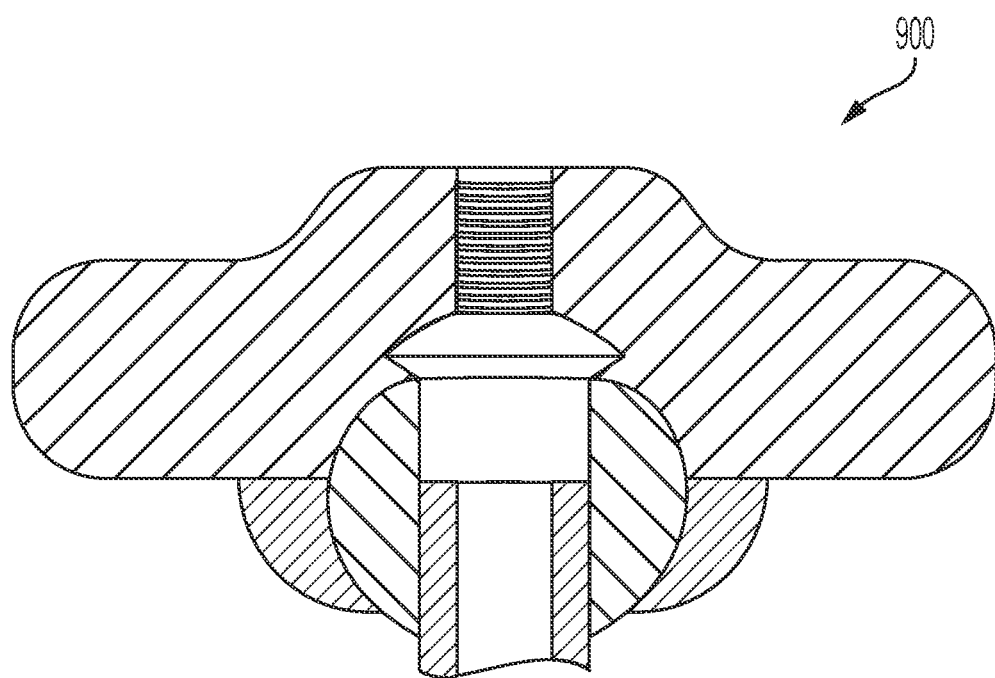
FIG. 13 is a cross-sectional view of an attachment joint for a drill assembly base, according to at least one aspect of the present disclosure.
Figure 14A:
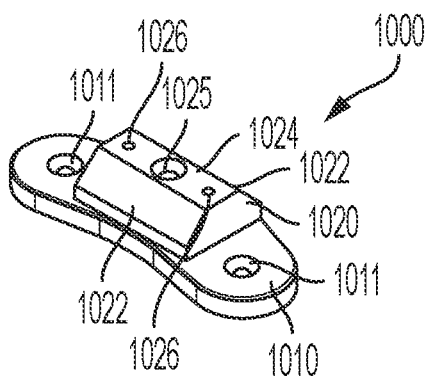
FIG. 14A is perspective view of a base member for a base for use with a drill assembly, according to at least one aspect of the present disclosure.
Figure 14B:
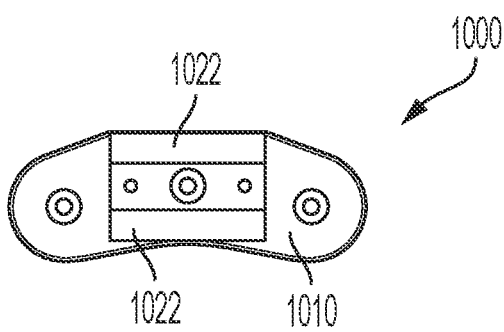
FIG. 14B is a top view of the base member of FIG. 14A, according to at least one aspect of the present disclosure.
Figure 14C:
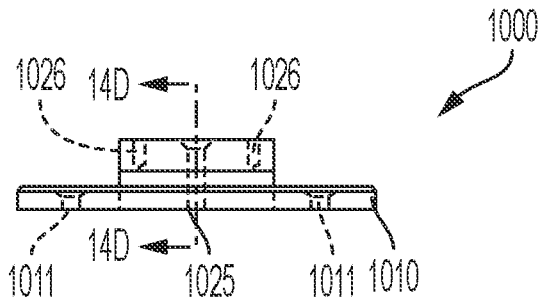
FIG. 14C is a side view of the base member of FIG. 14A, according to at least one aspect of the present disclosure.
Figure 14D:
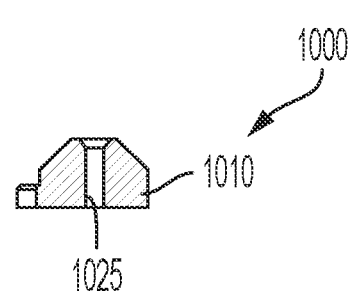
FIG. 14D is a cross-sectional view of the base member of FIG. 14A taken along line 14D-14D in FIG. 14A, according to at least one aspect of the present disclosure.
Figure 15:
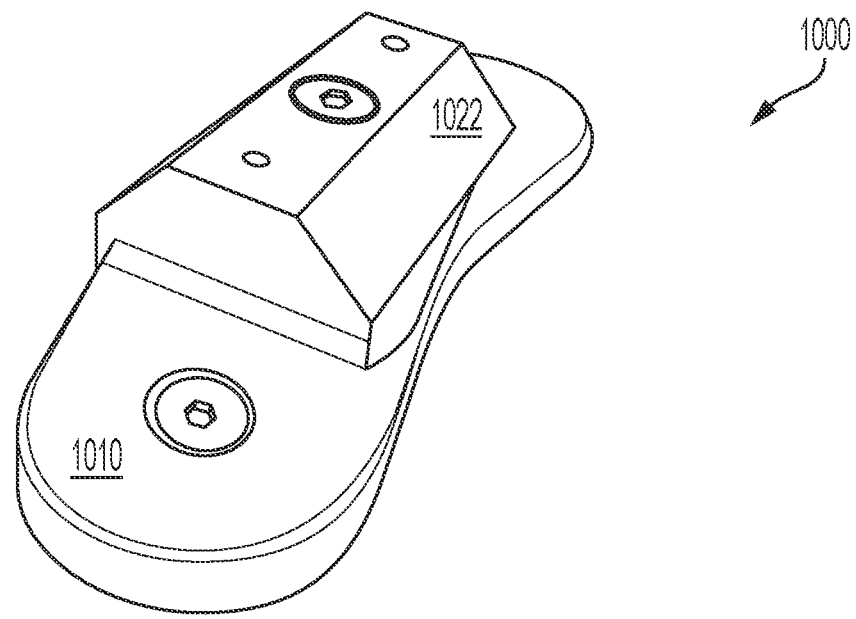
FIG. 15 is a perspective view of the base member of FIG. 14, according to at least one aspect of the present disclosure.

FIG. 13 depicts a hollow ball and socket joint 900 for a suction cup attachment element arrangement where a ball and socket joint can be combined with an active suction cup attachment element. In such instances, a hose can be attached the ball and socket joint 900 to vacuum the air out of the suction cup and blow air into the suction cup.

FIGS. 14A-14D and 15 depict a base member 1000 of a drill assembly base according to one aspect of the disclosure. The base member 1000 includes a boomerang-shaped body portion 1010 comprising outer ends having countersunk fastener apertures 1011. The apertures 1011 permit the attachment of attachment elements such as the attachment elements discussed herein. The base member 1000 further comprises a central brace portion 1020 comprising angled surfaces 1022, a planar top surface 1024, and fastener apertures 1026. The fastener apertures 1026 are configured to permit the attachment of another base member on top of the central brace portion 1020. A countersunk fastener aperture 1025 is defined in the top surface 1024 and permits the attachment of a central attachment element underneath the central brace portion 1020.

Figure 16C:
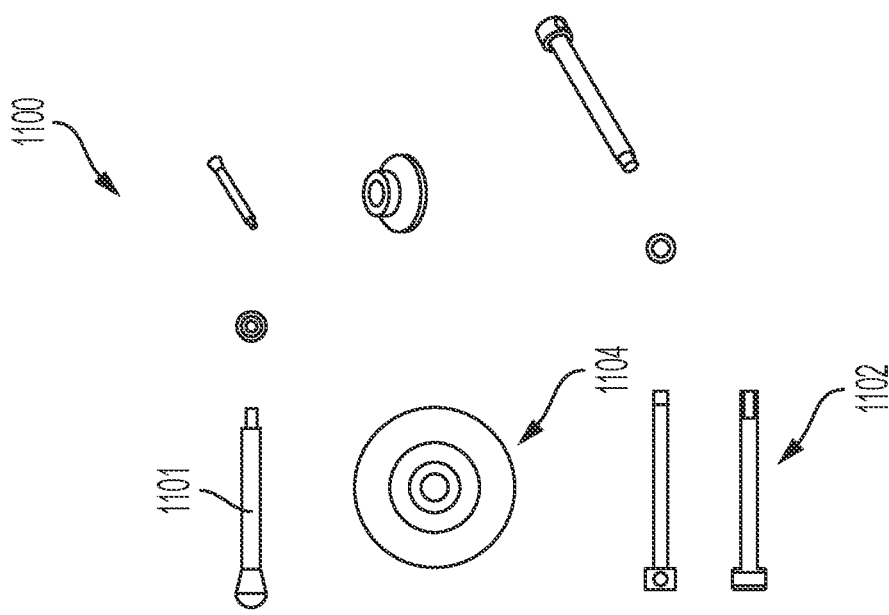
FIG. 16C illustrates multiple components of the drive screw of FIG. 16A, according to at least one aspect of the present disclosure.
Figure 16B:
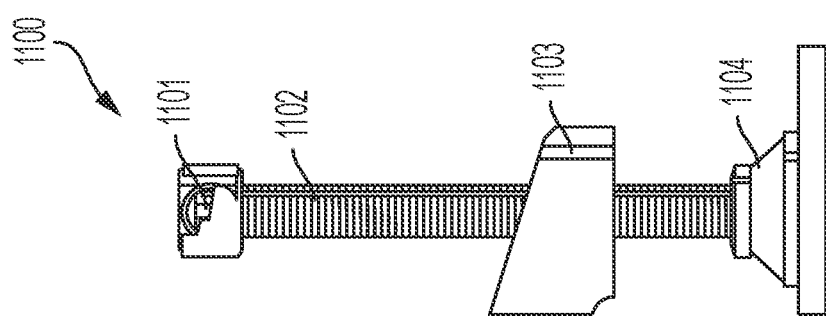
FIG. 16B is a side view of the drive screw of FIG. 16A, according to at least one aspect of the present disclosure.
Figure 16A:
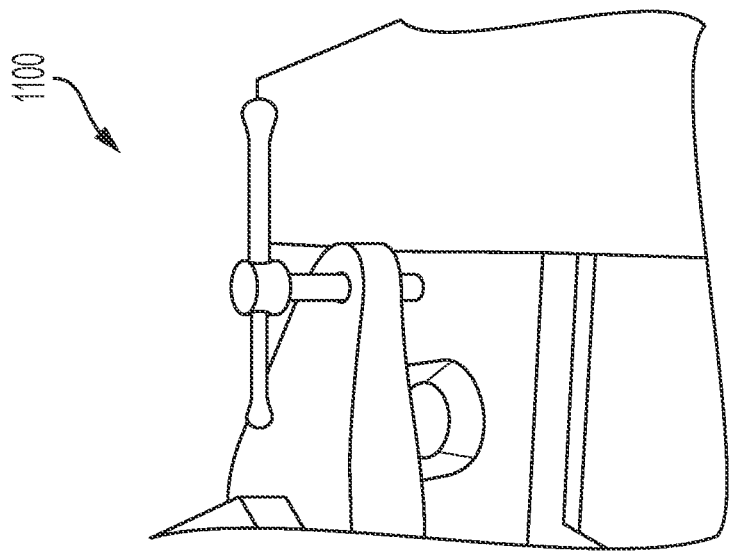
FIG. 16A is a partial perspective view of a drive screw configured to pry a drill assembly of the present disclosure away from a surface to which the drill assembly is attached, according to at least one aspect of the present disclosure.

FIGS. 16A-16C depict a release mechanism 1100 for use with a drill assembly base of the present disclosure. The release mechanism 1100 comprises a lever 1101 fixedly attached to a threaded shaft 1102. The threaded shaft 1102 is threadably received by a lifter element 1103 configured to lift a base member of a drill assembly base of the present disclosure. The release mechanism 1100 further comprises a support member 1104 attached to the threaded shaft 1102 such that the threaded shaft 1102 can rotate relative to the support member 1104 but does not move vertically relative to the support member 1104. The release mechanism 1100 can lift attachment elements, such as magnets, for example, away from a vessel hull, for example. In other instances, the threaded shaft 1102 can be driven into engagement with the vessel hull to lift the base member and/or attachment elements thereof away from the vessel hull.

Figure 17A:
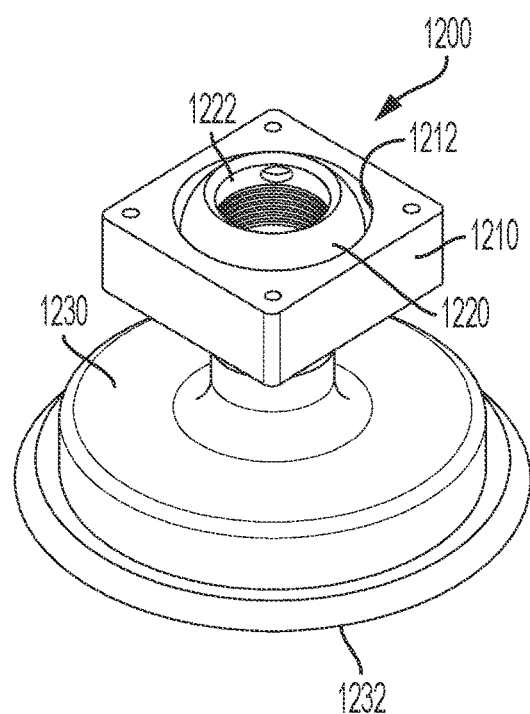
FIG. 17A is a top perspective view of an attachment element for attaching a drill assembly to a surface, the attachment element including a suction cup arrangement mounted to a base by way of a ball and socket joint, according to at least one aspect of the present disclosure.
Figure 17B:
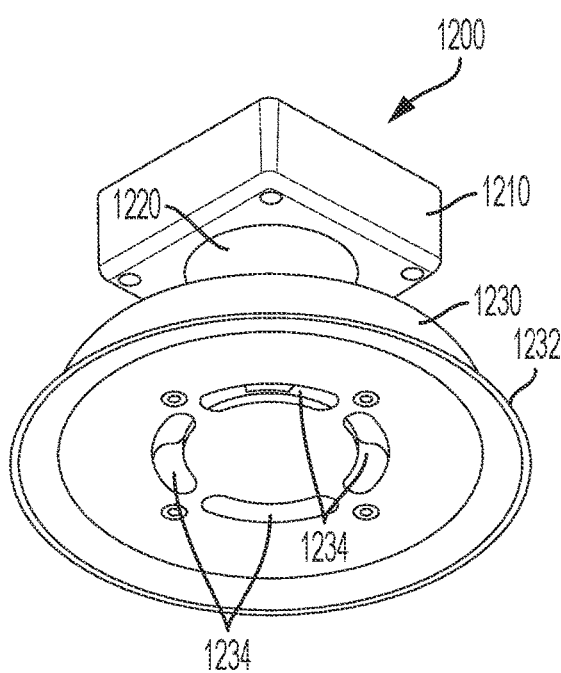
FIG. 17B is a bottom perspective view of the attachment element of FIG. 17A, according to at least one aspect of the present disclosure.

FIGS. 17A and 17B depict one example of an attachment element 1200 configured to attach a drill assembly of the present disclosure to a hull of a vessel, for example. The attachment element 1200 comprises a suction cup 1230 attached to a ball and socket shaft 1220 jointably received within a socket cavity 1212 of a frame attachment member 1210. The ball and socket shaft 1220 comprises a through-hole 1222 in fluid communication with vacuum apertures 1234 defined in the suction cup 1230. Such an arrangement permits air flow to and from a suction cup attached to a base member of a drill assembly base of the present disclosure by way of a ball and socket joint. Such air flow can be used to activate the suction cup 1230 to hold a drill assembly base to a vessel hull by sucking air out of the suction cup 1230 when a suction cup seal 1232 of the suction cup 1230 is pressed against the vessel hull and to deactivate the suction cup 1230 by blowing air into the apertures 1234 and, thus, the suction cup 1230 to permit the detachment of the suction cup 1230 from the vessel hull.

Figure 18B:
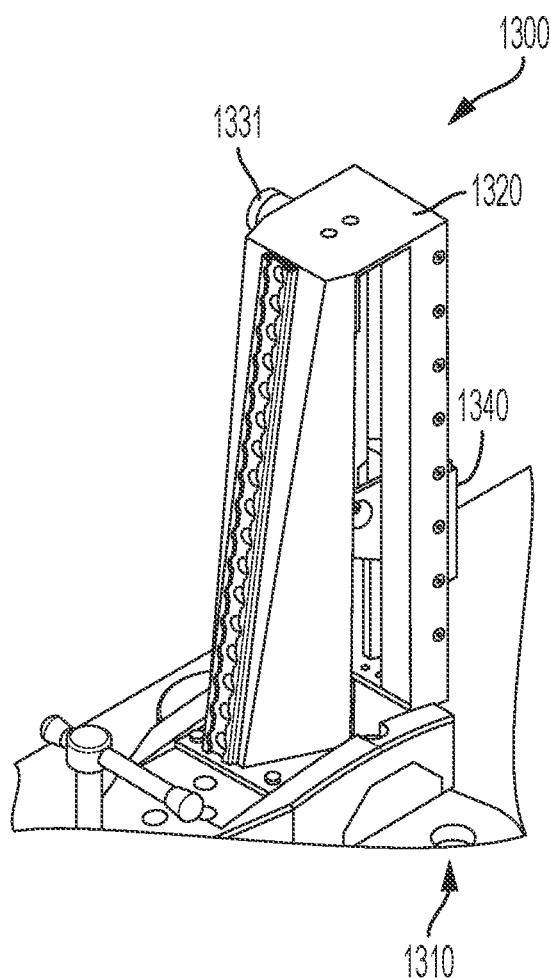
FIG. 18B is a perspective view of the linear actuator system and drill assembly base of FIG. 18A, according to at least one aspect of the present disclosure.
Figure 19C:
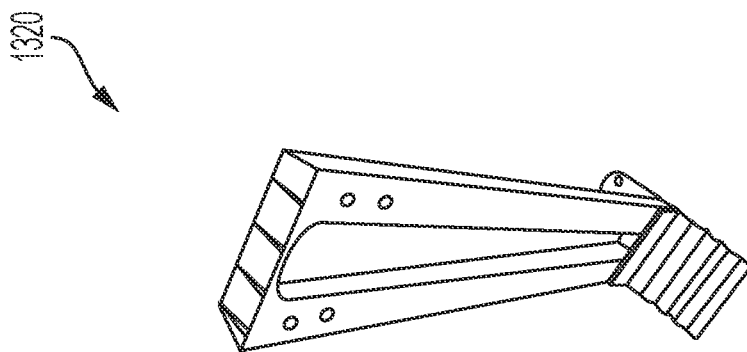
FIG. 19C is a perspective view of a portion of the frame of FIG. 18A, according to at least one aspect of the present disclosure.
Figure 19B:
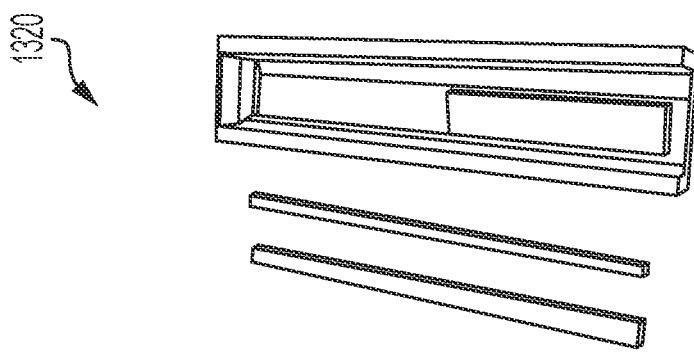
FIG. 19B is a perspective view of a portion of the frame of FIG. 18A, according to at least one aspect of the present disclosure.
Figure 19A:
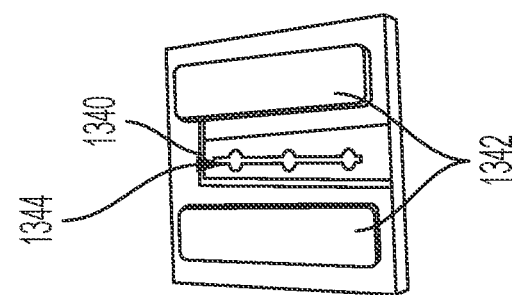
FIG. 19A is a perspective view of the slider link of FIG. 18A, according to at least one aspect of the present disclosure.
Figure 20:
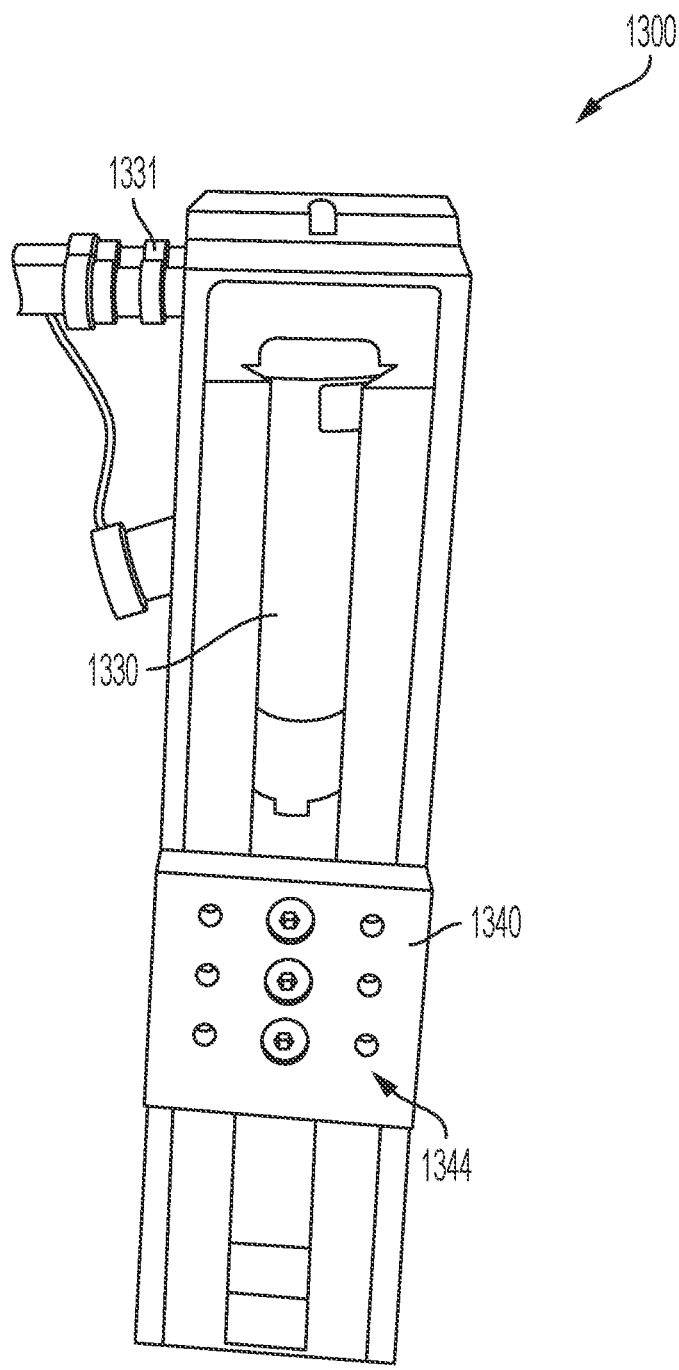
FIG. 20 is a perspective view of a linear actuator including a frame, a fluidic actuator, and a slider link, according to at least one aspect of the present disclosure.

FIGS. 18-20 depict a linear actuator system 1300 attached to a drill assembly base 1310. The linear actuator system 1300 comprises a frame 1320, a fluidic actuator 1330 fixedly attached to and supported within the frame 1320, and a slider plate 1340 attached to a drive rod of the fluidic actuator 1330. The fluidic actuator 1330 also comprises a fluid coupling port 1331 configured to be attached a fluidic drive system to transmit the necessary fluid to actuate the fluidic actuator. As discussed herein, the slider plate 1340 is attached to the bit drive frame to move the bit drive up and down. The slider plate 1340 comprises Polytetrafluoroethylene (PTFE) plates 1342 (FIG. 19A) configured to slide against corresponding PTFE plates 1322 to limit friction between the slider plate 1340 and the frame 1320. The slider plate 1340 also comprises fastener apertures 1344 configured to receive bolts, for example, therethrough to attach the slider plate 1340 to a bit drive frame.

The linear actuation system 1300 can automatically advance the drill assembly. In certain instances, the linear actuation system 1300 and actuator 1330 thereof can be operated remotely, as further described herein.

FIGS. 21A-21F depict a bit drive frame 1410 and a bit drive chuck 1420 for use with a drill assembly of the present disclosure. The bit drive frame 1410 is configured to be attached to a fluidic actuator, as discussed herein, by way of a slider plate, for example. The bit drive frame 1410 comprises an aperture 1411 through which a bit drive system can be passed. For example, the chuck 1420 is positioned underneath the bit drive frame 1410. The chuck 1420 comprises an upper section 1422 and a key slot 1424 configured to receive a bit drive spindle such that the bit drive spindle drives the chuck 1420. The chuck is held onto the spindle by way of a holding screw received within hole 1423 defined in the upper section 1422 of the chuck 1420. The chuck 1420 further comprises a lower section 1425 configured to receive a tap in a female driving aperture 1426.

Figure 22:
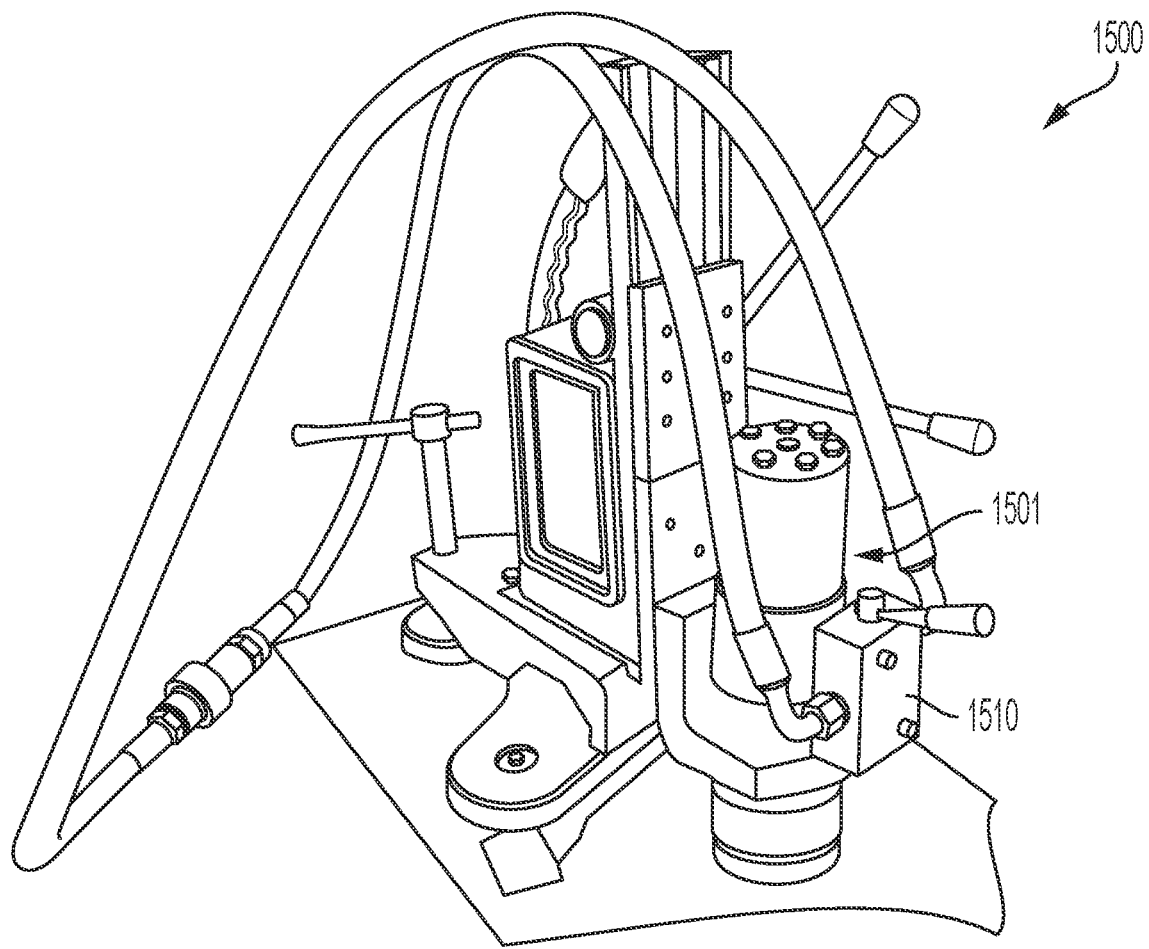
FIG. 22 is a perspective view of a drill assembly comprising a fluidic drive system including a pressure release valve, according to at least one aspect of the present disclosure.

FIG. 22 depicts a drill assembly 1500 in accordance with one aspect of the present disclosure. The drill assembly 1500 comprises a pressure relief valve 1510 fluidically coupled with a bit drive 1501.

Figure 23A:
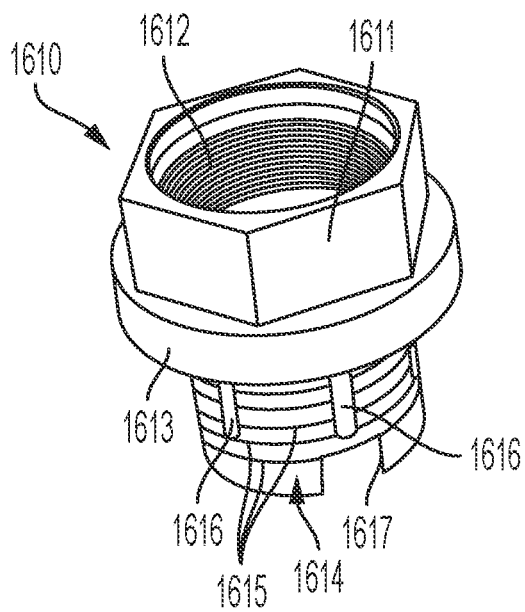
FIG. 23A is a perspective view of a self-tapping tap for use with a drill assembly, according to at least one aspect of the present disclosure.
Figure 23B:
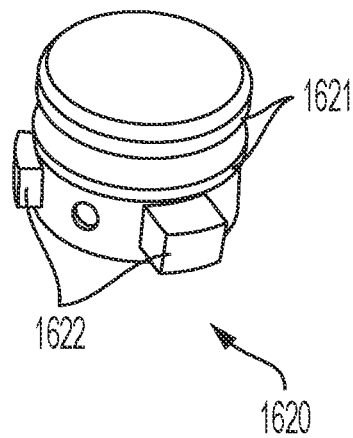
FIG. 23B is a perspective view of a plug for use with a drill assembly, according to at least one aspect of the present disclosure.
Figure 23C:
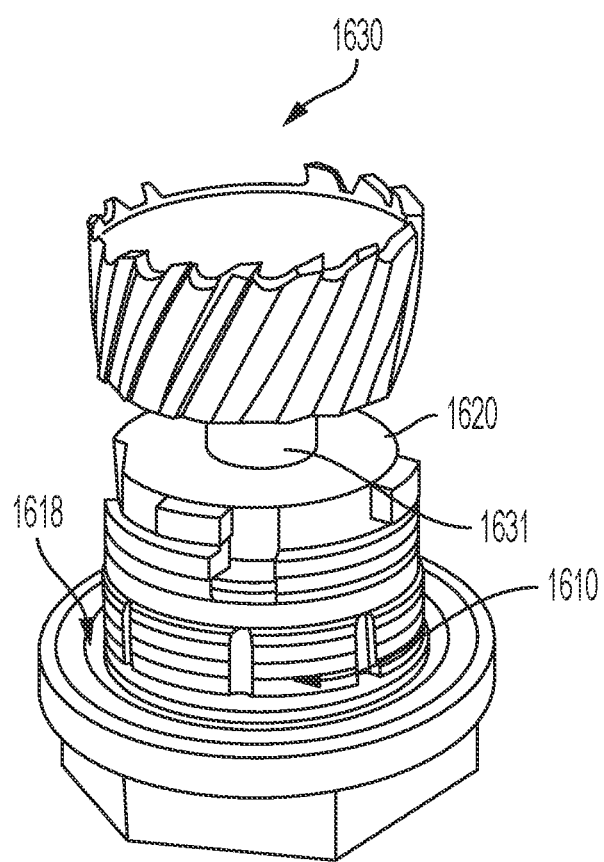
FIG. 23C is a perspective view of a bit assembly for use with a drill assembly, wherein the bit assembly comprises a self-tapping tap, a plug, and a drill bit, according to at least one aspect of the present disclosure.

FIGS. 23A-23C depict a self-tapping tap 1610, a plug 1620 removably positioned within and drivingly engageable with the self-tapping tap 1610, and a drill bit 1630 comprising a shaft 1631 fixedly attached to the plug 1620. The drill bit 1630 and the plug 1620 can be referred to as a bit assembly which is illustrated partially installed in the tap 1610 in FIG. 23C. The tap 1610 comprises a driving head 1611, threads 1612 defined inside the driving head, and a flange 1613 configured to abut a vessel hull, for example. The threads 1612 are configured to receive a device such as a hose or heater assembly, for example, after a drill assembly that installs the tap 1610 is removed from the site. The tap 1610 further comprises self-tapping threads 1615 defined on an internal tap section 1614 configured to tap threads into a vessel hull, for example, after a hole has been drilled with the drill bit 1630. The internal tap section 1614 of the tap 1610 further comprises relief slots 1616 configured to allow material to flow away from the site as the self-tapping threads 1615 tap into the vessel hull, for example. The internal tap section 1614 further comprises driving slots 1617 configured to drive the plug 1620 and an annular slot 1618 defined in the flange 1613 configured to receive a gasket therein, for example, to bolster the seal between the vessel hull, for example, and the tap 1610. The plug 1620 comprises driving teeth 1622 configured to be received within the driving slots 1617 and drive the drill bit 1630 to which it is operably attached. Friction rings 1621 configured to hold the plug 1620 inside the tap 1610 such as in scenarios where gravity would permit the plug to otherwise fall out of the tap 1610, for example.

In certain instances, the taps described herein can comprise a 2-inch diameter. In other instances, the diameter of the taps can be greater than two inches or less than two inches. For example, numerous taps described herein are 3-inch diameter taps. Additionally, 1-inch diameter taps, 4-inch diameter taps, 5-inch diameter taps, and 6-inch diameter taps are also contemplated. Larger diameter taps may allow an increased volumetric flowrate therethrough.

Figure 24:
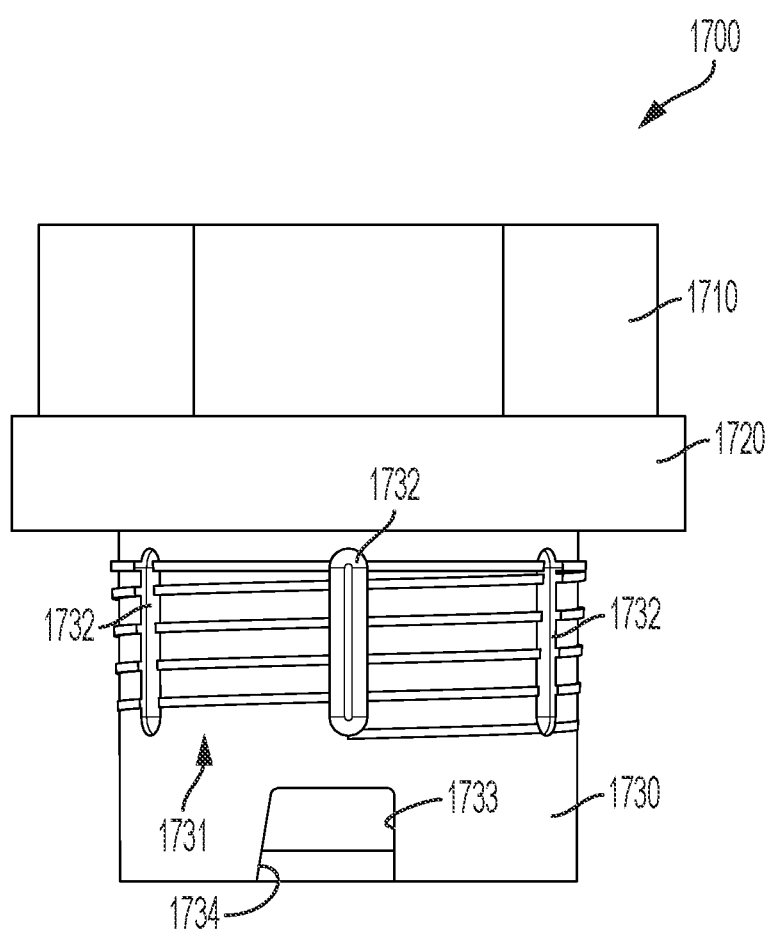
FIG. 24 is an elevational view of a self-tapping tap for use with a drill assembly, according to at least one of the present disclosure.
Figure 25:
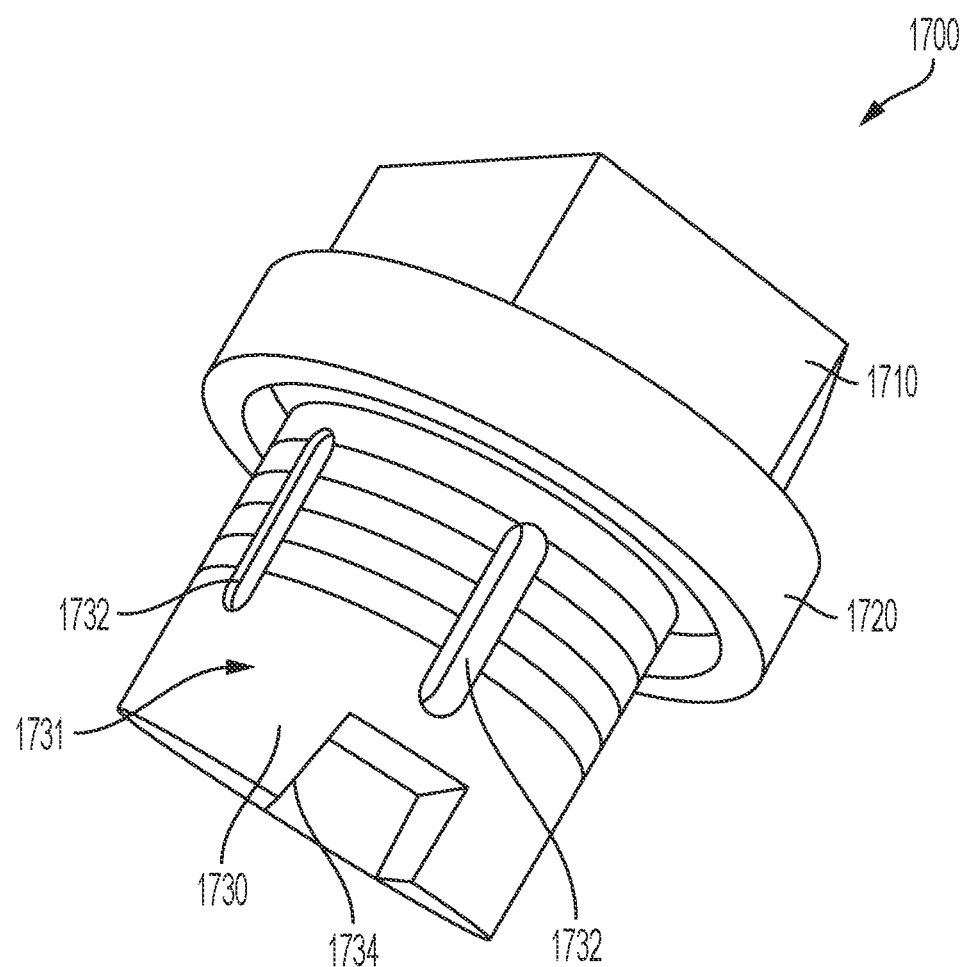
FIG. 25 is a perspective view of a self-tapping tap for use with a drill assembly, according to at least one aspect of the present disclosure.

FIGS. 24-27C illustrate various examples of self-tapping taps configured to be driven by a bit drive of a drill assembly of the present disclosure. FIGS. 24 and 25 depict a self-tapping tap 1700 comprising a driving head 1710, a flange 1720, and an inner threaded section 1730 comprising self-tapping threads 1731, relief slots 1732, and driving slots 1733. The driving slots 1733 of the tap 1700 comprise an angled surface 1734. Such an angled surface can provide clearance for driving teeth of a plug of the present disclosure to easily slide within the slots. In certain instances, the geometry of the driving slots can improve a connection between the tap 1700 and the plug and drill bit.

Figure 26A:
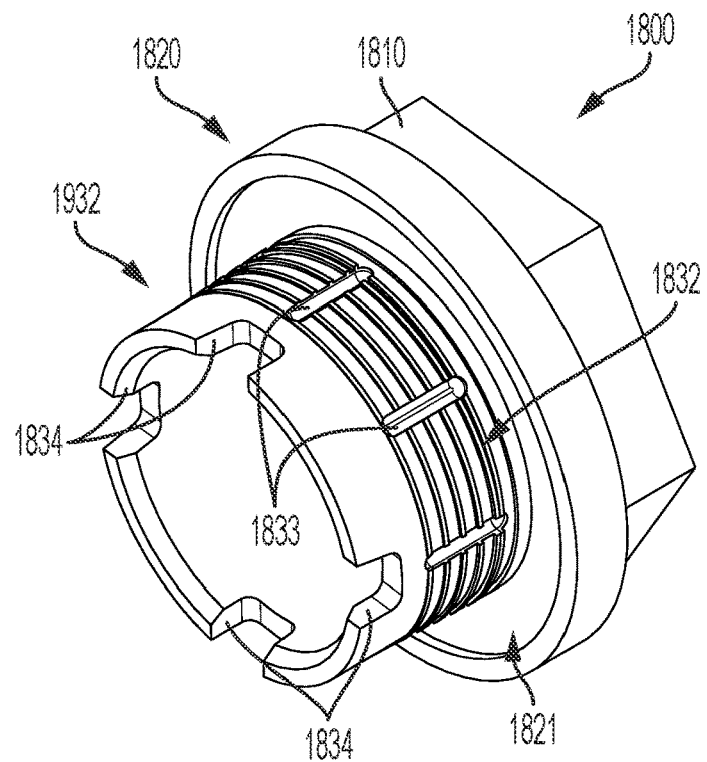
FIG. 26A is a perspective view of a self-tapping tap for use with a drill assembly, according to at least one aspect of the present disclosure.
Figure 26B:
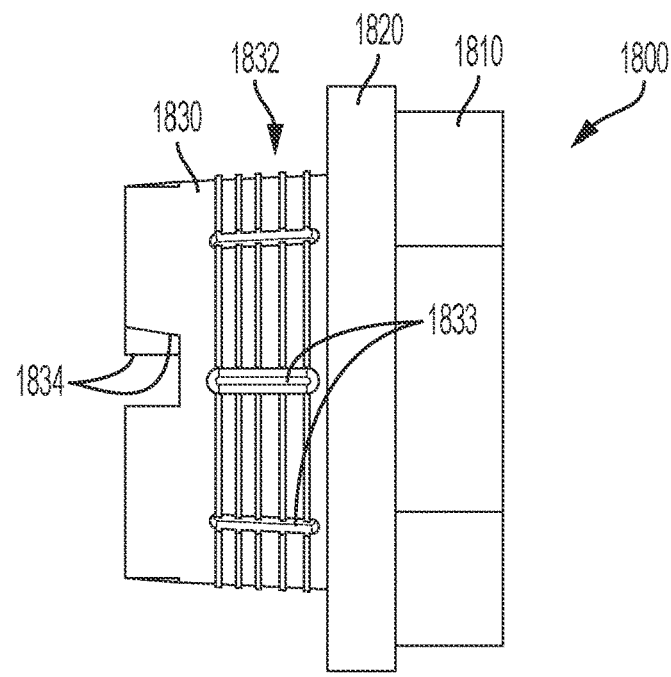
FIG. 26B is an elevational view of the self-tapping tap of FIG. 26A, according to at least one aspect of the present disclosure.

FIGS. 26A and 26B depict another self-tapping tap 1800. The self-tapping tap 1800 comprises a driving head 1810 configured to be drivingly coupled with a drill chuck of the present disclosure. The self-tapping tap 1800 further comprises a flange 1820 configured to abut the surface of a vessel hull, for example, and a threaded section 1830 configured to drive a drill bit to drill a hole in the surface of vessel hull, for example. The flange 1820 comprises an annular recess 1821 defined therein in configured to receive a seal, such as a rubber seal, for example, which is configured to seal the interface between the tap 1800 and the vessel hull. The threaded section 1830 comprises self-tapping threads 1832 and relief slots 1833 configured to permit material to flow therein during the tapping process. The threaded section 1830 further comprises driving slots 1834 configured to receive teeth of a drill bit assembly of the present disclosure.

Figure 27A:
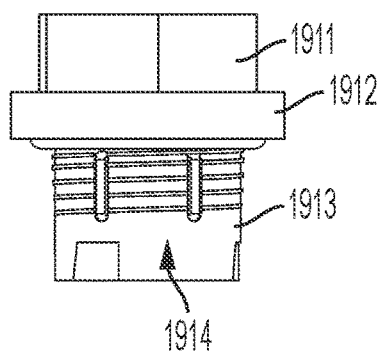
FIG. 27A is a perspective view of a tap, according to at least one aspect of the present disclosure.
Figure 27B:
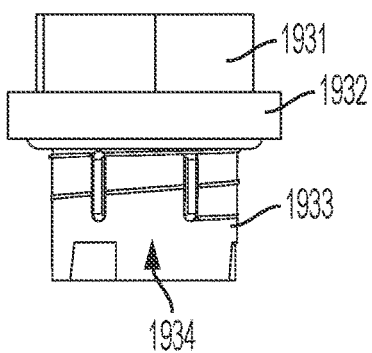
FIG. 27B is a perspective view of a tap, according to at least one aspect of the present disclosure.
Figure 27C:
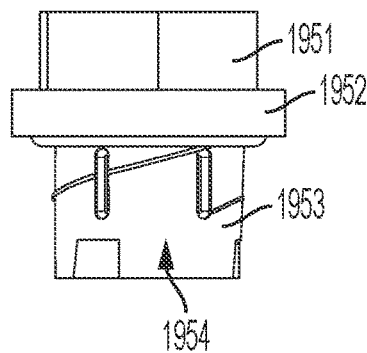
FIG. 27C is a perspective view of a tap, according to at least one aspect of the present disclosure.

FIGS. 27A-27C illustrate three variations of taps 1910, 1930, and 1950. The tap 1910 comprises a driving head 1911, a flange 1912, and a self-tapping section 1913. The self-tapping section 1913 comprises self-tapping threads 1914 comprising a first thread pitch. The tap 1930 comprises a driving head 1931, a flange 1932, and a self-tapping section 1933. The self-tapping section 1933 comprises self-tapping threads 1934 comprising a second thread pitch which is greater than the first thread pitch. The tap 1950 comprises a driving head 1951, a flange 1952, and a self-tapping section 1953. The self-tapping section 1953 comprises self-tapping threads 1954 comprising a third thread pitch which is greater than the first thread pitch and the second thread pitch. The thread-type and pitch can be optimized for different diameter taps. For example, as the diameter increases in size, less threads may be required to obtain a sufficient holding force. The holding force can be a function of the thread height and diameter, for example.

Threads may also vary in thread angle and/or thread length, for example. Self-tapping sections may vary in minor diameter and major diameter. Self-tapping sections may also widen along the thread length from a first diameter where the threads begin and a second diameter where the threads end. In certain instances, the second diameter is greater than the first diameter.

Additionally or alternatively, different pitches can be employed by the self-tapping section. For example, the pitch of the threads can vary along the length of the self-tapping section. For example, a first pitch can improve initial entry of the self-tapping section into the hull, and a second pitch can improve the subsequent seating or securing of the self-tapping section into the hole. The first pitch can be greater than the second pitch or vice versa.

Figure 28:
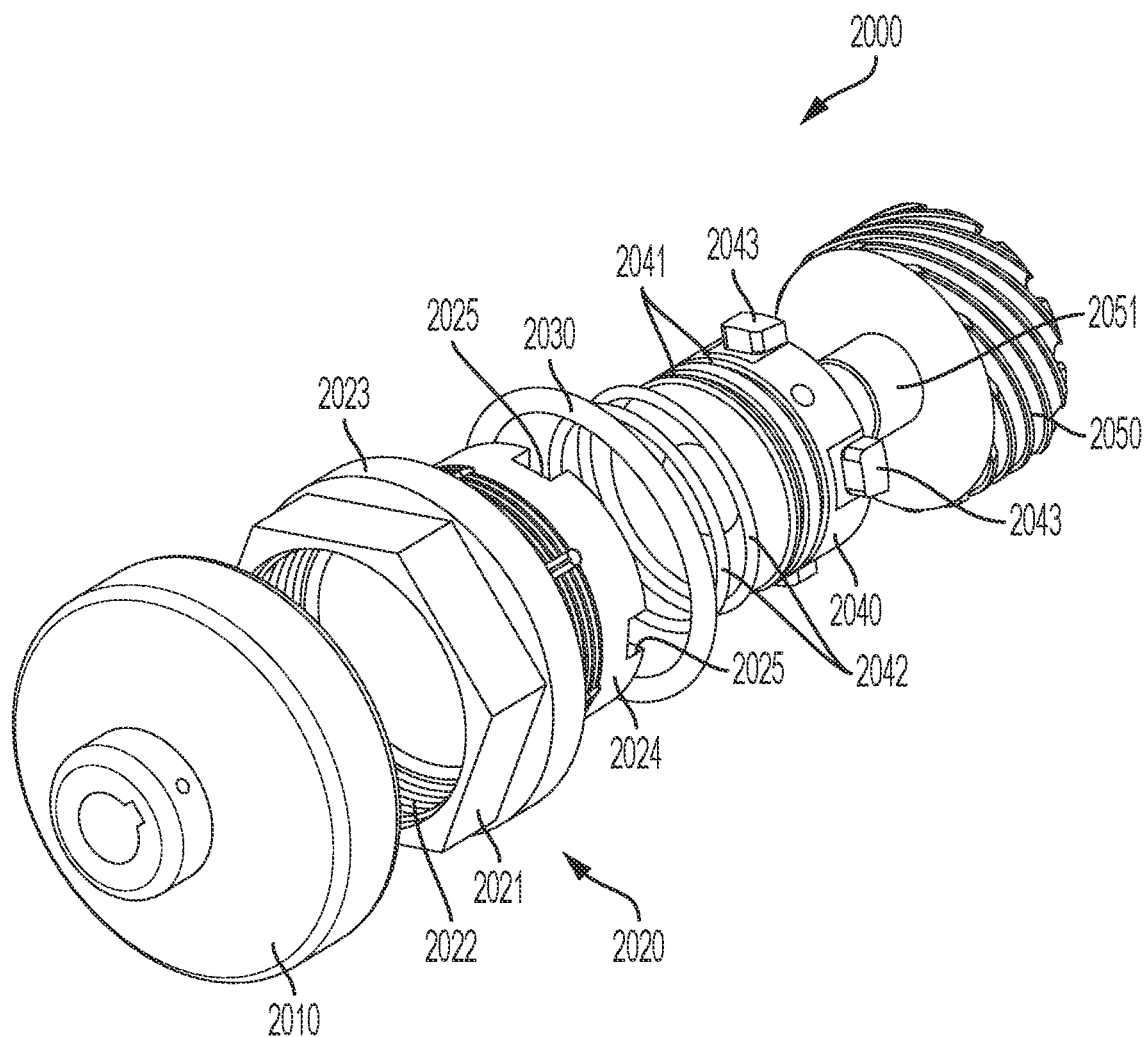
FIG. 28 is an exploded view of a bit assembly and a drill chuck for use with a drill assembly, according to at least one aspect of the present disclosure.
Figure 29:
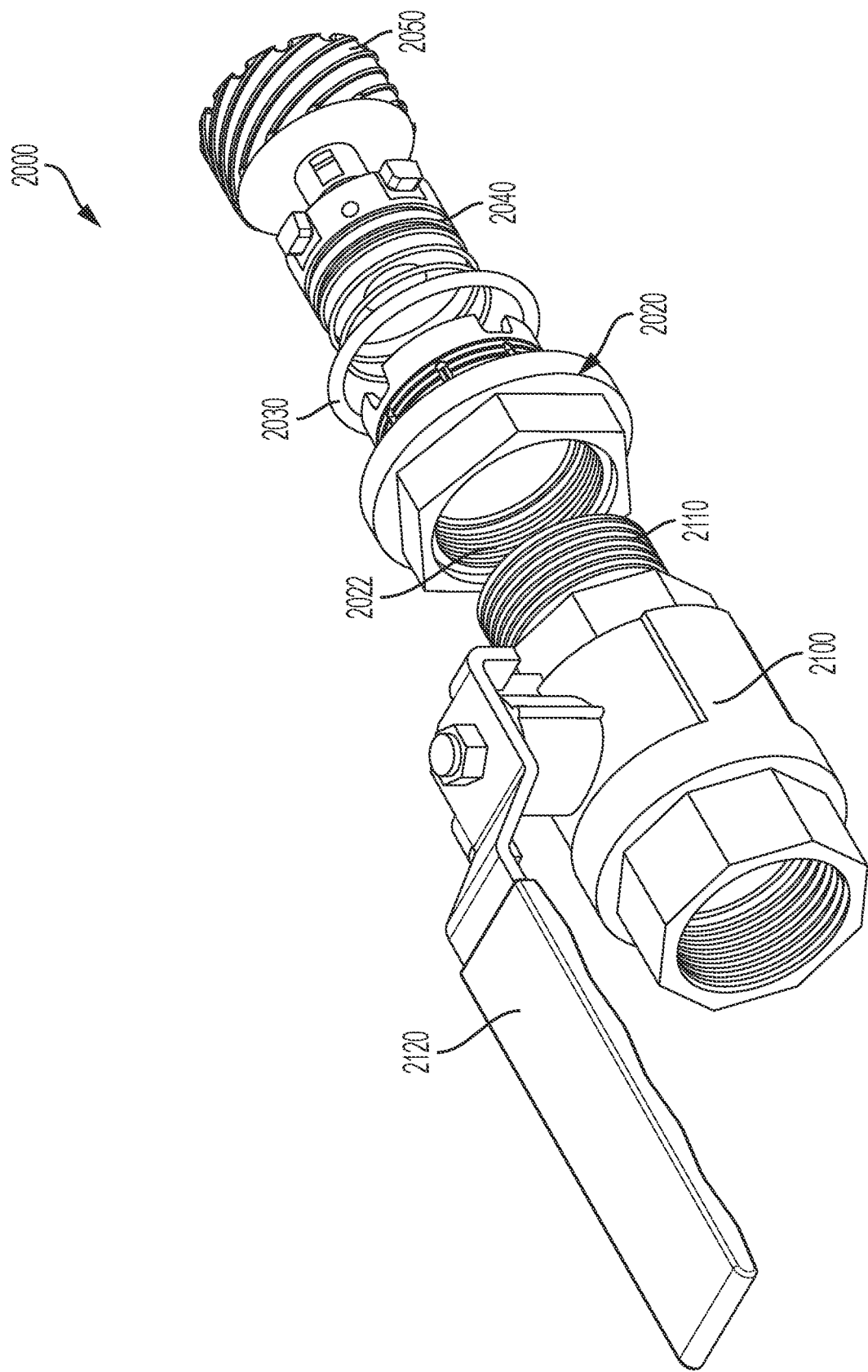
FIG. 29 is an exploded view of the bit assembly of FIG. 28 and an external valve, according to at least one aspect of the present disclosure.

FIGS. 28 and 29 depict a bit assembly 2000, a chuck 2010 configured to drive the bit assembly 2000, and a valve 2100 configured to be coupled with a tap 2020 of the bit assembly 2000 after the bit assembly 2000 is installed into a vessel hull, for example. The bit assembly 2000 comprises the tap 2020 comprising a driving head 2021 and internal threads 2022 defined in the driving head 2021 configured to receive a male valve section 2110 of the valve 2100 therein to attach the valve 2100 to the tap 2020, a flange 2023 configured to abut a surface of a vessel hull, for example, and driving slots 2025. The bit assembly 2000 further comprises a driving plug 2040 removably positioned within and drivingly engaged with the tap 2020 such that the tap 2020 can drive the driving plug 2040. The plug 2040 comprises annular slots 2041 configured to receive friction rings 2042 therein to hold the plug 2040 within the tap 2020. The plug 2040 further comprises driving teeth 2043 protruding therefrom configured to be received within the driving slots 2025 defined in an inner section 2024 of the tap 2020 so that the tap 2020 drives the plug 2040 which drives the drill bit 2050. The bit assembly 2000 further comprises a seal ring 2030 configured to provide a seal between the vessel hull, for example, and the tap 2020. The bit assembly further comprises the drill bit 2050, which is configured to drill a hole in the vessel hull, for example. The drill bit 2050 comprises a bit shaft 2051 that is fixedly attached to, by welding and/or threads, for example to the driving plug 2040 such that the driving plug 2040 rotates the drill bit 2050. The drill bit 2050 can be welded to the plug 2040 to prevent a threaded connection from decoupling if an attempt is made to unscrew the tap 2020 from the vessel hull, for example. The valve 2100 may comprise a ball valve, a gate valve, and/or any suitable type of valve. The valve 2100 also comprises a valve actuator 2120 (FIG. 21) configured to open and close the valve 2100.

Figure 30:
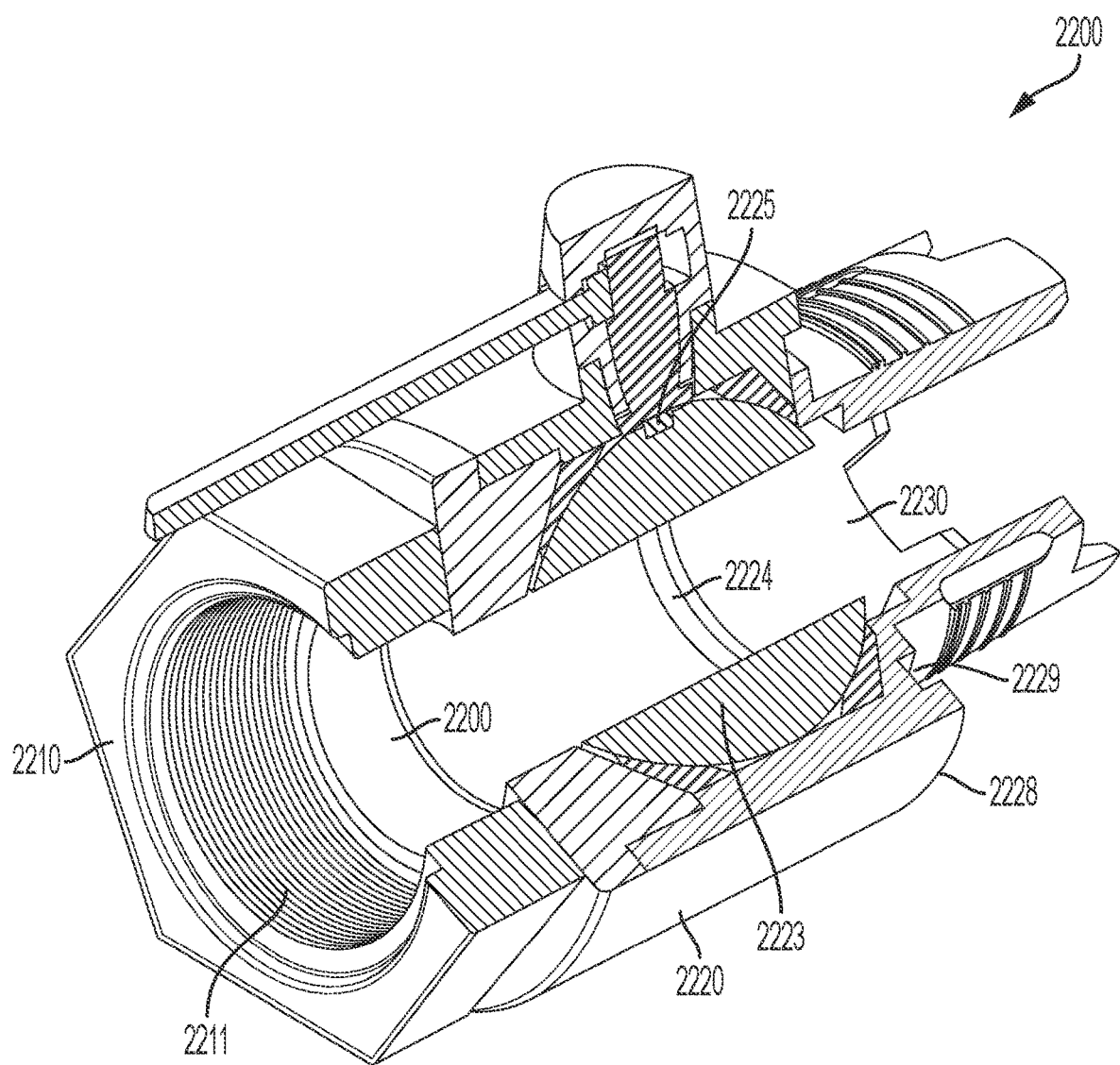
FIG. 30 is a cross-sectional perspective view of a bit assembly comprising a ball valve positioned in a tap of the bit assembly, according to at least one aspect of the present disclosure.
Figure 31:
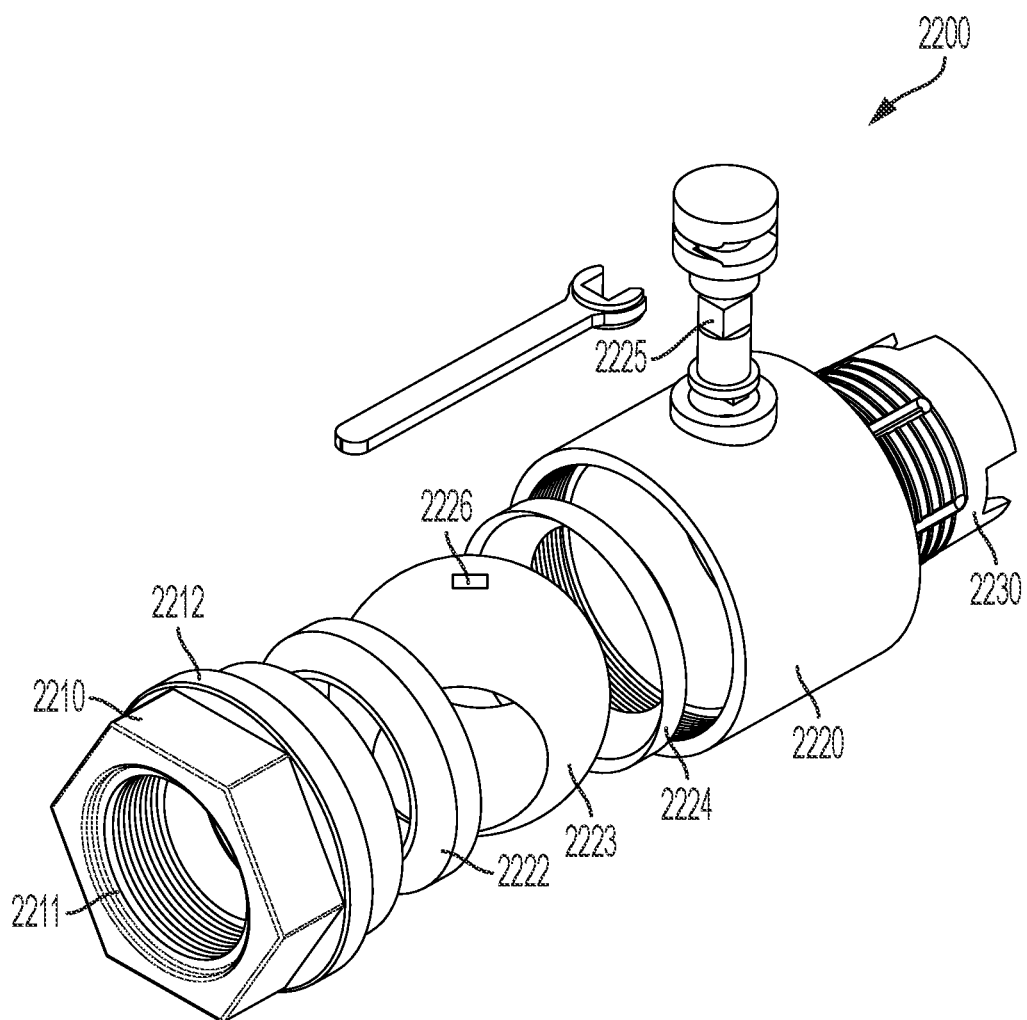
FIG. 31 is an exploded view of the bit assembly of FIG. 30, according to at least one aspect of the present disclosure.

FIGS. 30 and 31 depict a bit assembly 2200 comprising a driving head 2210 extending from a flange 2212, a valve section 2220 comprising an internal ball valve element 2223, and a self-tapping tap 2230 fixedly attached to the valve section 2220 such that rotation of the driving head 2210 rotates the valve section 2220 thereby rotating the self-tapping tap 2230. The driving head 2210 comprises threads 2211 defined therein configured to permit the coupling of a hose, for example, during the fluid extraction process. The driving head 2210 further comprises male-threaded section configured to be threadably coupled with a corresponding female-threaded section defined within the valve section 2220. The ball valve element 2223 is positioned within the valve section 2220 between a first seat 2222 and a second seat 2224. The ball valve element 2223 is configured to be rotated to open and close the bit assembly 2200 to permit fluid flow through the bit assembly 2200 when the ball valve element 2223 is open and prevent, or restrict, fluid flow when the ball valve element 2223 is closed. The ball valve element 2223 comprises a key hole 2226 defined therein configured to receive the valve actuator 2225 such that the valve actuator 2225 can open and close the ball valve element 2223. Other types of valves are envisioned.

The bit assembly 2200 is configured to be installed by a drill assembly of the present disclosure with a single bit drive stroke. For example, the tap 2230 is configured to drive a bit to drill a hole in a vessel hull, for example. After the hole is drilled, the drill assembly is advanced toward the vessel hull forcing engagement between the self-tapping threads of the tap 2230 and the vessel hull. The tap 2230 further comprises an abutment surface 2228 defining an annular ring 2229 therein configured to receive a rubber seal, for example, which is configured to be pressed up against the vessel hull to prevent fluid from leaking between the tap 2230 and the surface of the vessel. The tap can then be tapped into the vessel hull simultaneously creating a fluid port fastened against the vessel hull, configured to receive a hose coupling, for example, and having a valve positioned integrally therein. In instances where the bit comprises a plug, the valve can be opened and the plug can be mechanically and/or fluidically pushed out of the bit assembly 2200 and into the vessel hull. For example, a surge of fluid toward the plug can be configured to release the plug and bit from the valve and into the vessel. Because the bit is released into the vessel, the bit is a consumable bit. In other words, the bit is designed for a drilling and tapping a single tap site into a vessel.

Figure 32:
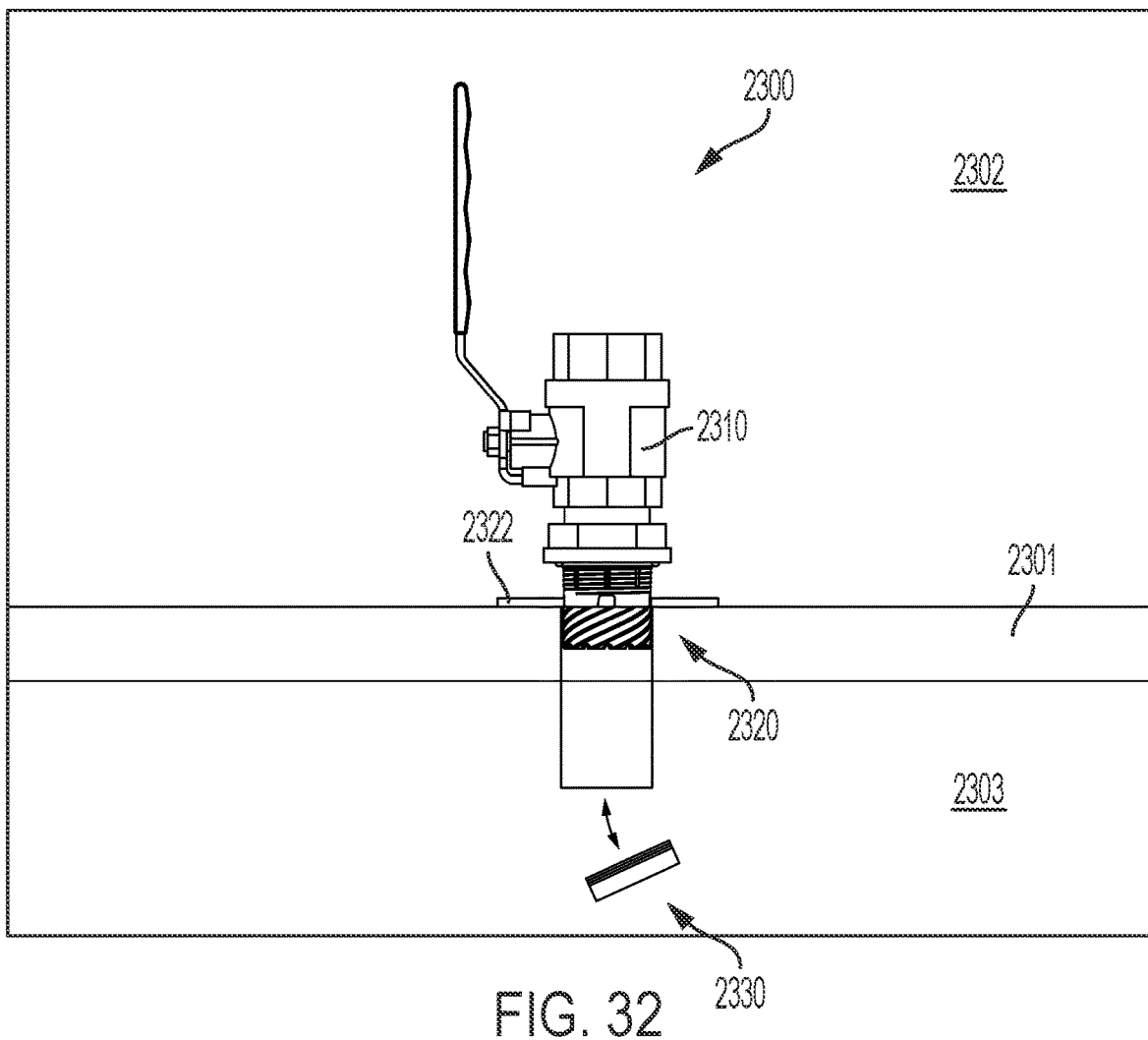
FIG. 32 is a schematic of a bit assembly for use with a drill assembly, wherein the bit tap assembly is installed on a shell of a vessel hull, according to at least one aspect of the present disclosure.

FIG. 32 is a schematic representation 2300 of a bit assembly installed into a vessel hull, or skin, 2301, for example. The bit assembly shown in FIG. 32 comprises a valve head 2310, a tap 2320 comprising a flange 2322 pressed against the vessel hull 2301 and self-tapped or, threadably coupled with, the vessel hull 2301, and a plug 2330 used for driving a leading drill bit to drill a hole in the vessel hull 2301. A hose, for example, can be coupled with the valve head 2310 outside 2302 the vessel hull 2301 to extract fluid out of and/or pump fluid into the inside 2303 of the vessel skin 2301.

Figure 33:
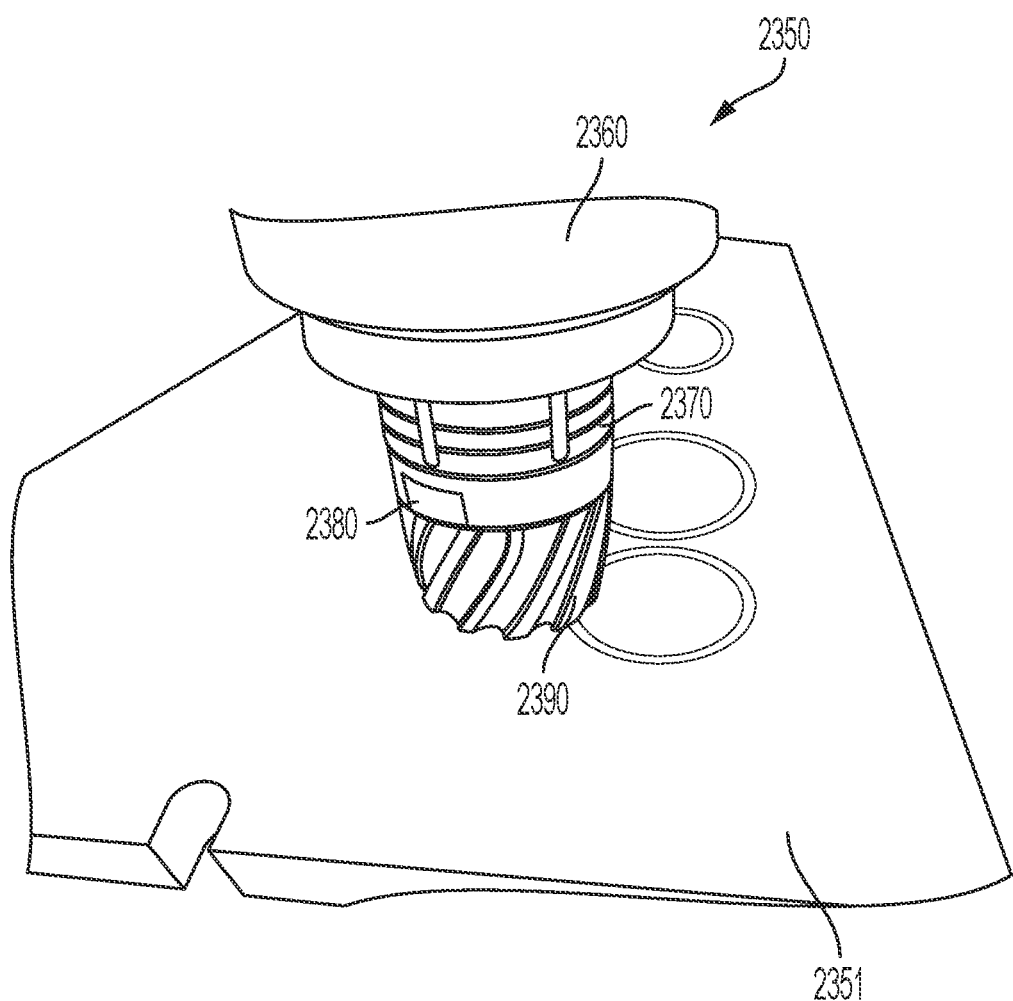
FIG. 33 is a perspective view of a drill assembly being used underwater, according to at least one aspect of the present disclosure.

FIG. 33 is a perspective view of a drill assembly 2350 being used underwater on a metal plate 2351. The drill assembly 2350 comprises a bit assembly comprising a chuck 2360, a tap 2370 drivingly coupled with the chuck 2360, and a plug 2380 drivingly coupled with the tap 2370. The bit assembly further comprises a drill bit 2390 configured to drill a hole in the metal plate 2351.

Figure 34:
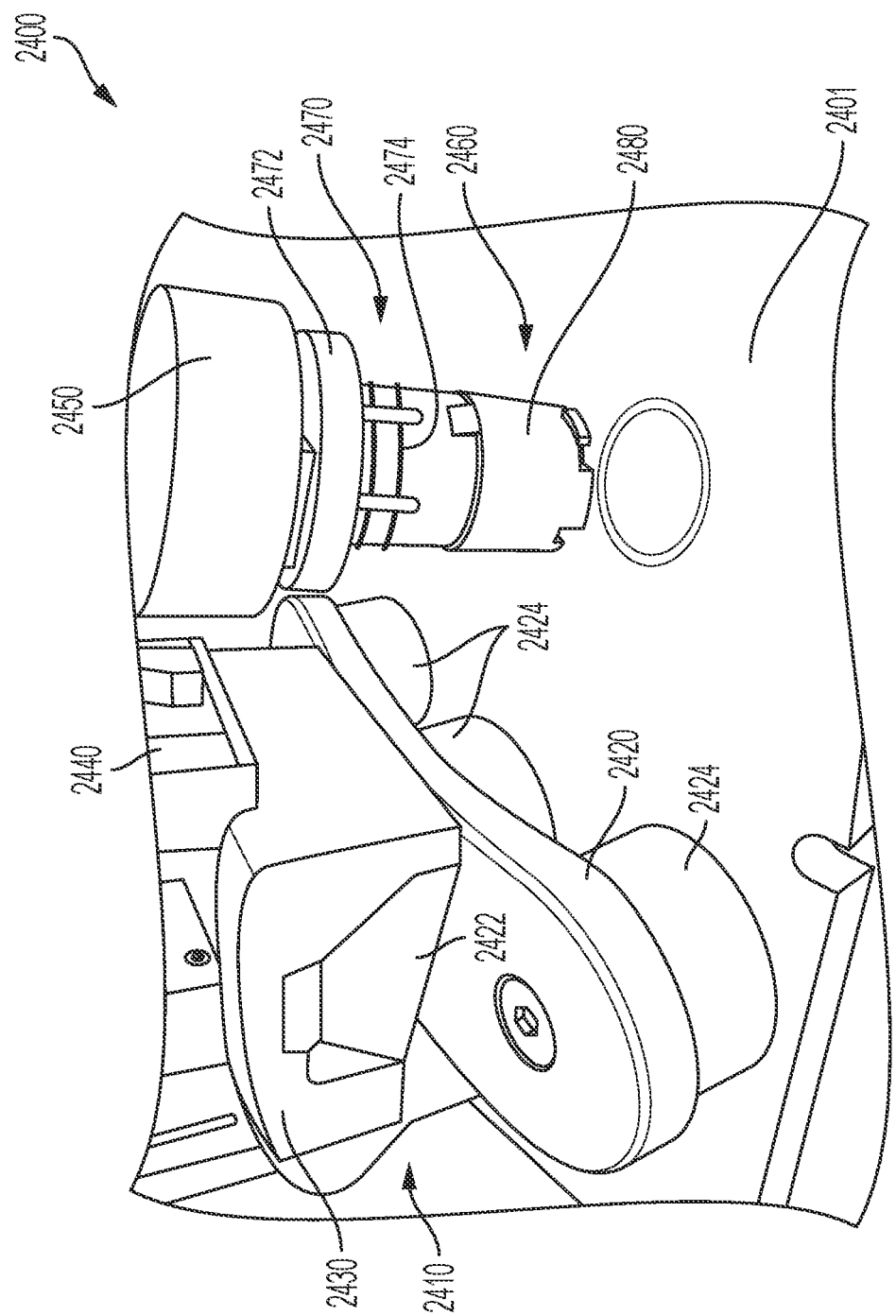
FIG. 34 is a perspective view of a drill assembly comprising an impact style drill motor, according to at least one aspect of the present disclosure.

FIG. 34 is a perspective view of a drill assembly 2400. The drill assembly 2400 comprises a base assembly, or frame, 2410 configured to be attached to a skin 2401 of a vessel, for example, a linear actuator system 2440 mounted to the base assembly 2410, and a bit drive attached to the linear actuator system 2440. The base assembly 2410 comprises a first base member 2420 comprising a lower body portion and an upper body portion 2422. The lower body portion comprises attachment elements 2424 fixedly attached to the lower body portion and configured to be attached to the vessel skin. The upper body portion 2422 is received within a cavity defined in a second base member 2430. The bit drive comprises a motor, for example, and a chuck 2450. A bit assembly 2460 of the drill assembly 2400 is configured to be driven by the drill assembly 2400 and comprises a tap 2470 comprising a driving head, a flange 2472 configured to be pressed up against a vessel skin, and self-tapping threads 2474 configured to threadably couple with the vessel skin after a hole is drilled. The bit assembly 2460 further comprises a drill bit 2480. The drill bit 2480 comprises an impact-style drill bit and is removably attached and drivingly engaged with the tap 2470.

In other instances, a non-impact drill bit and/or non-impact motor can be employed. For example, the drill bits can be rotary-style drill bits. A continuous-style, rotary motor can drive the drill bits. For example, a continuous, rotary driving motion can be imparted to the drill bits to drill the hole into the vessel hull. In certain instances, the rotary motor can be set to a maximum pressure to control the torque.

FIG. 35A is a perspective view 2510 of a drill assembly according to one aspect of the present disclosure. FIG. 35B is a perspective view 2520 of the drill assembly of FIG. 35A, according to at least one aspect of the present disclosure. FIG. 35C is a perspective view of drill bits 2530 of the drill assembly of FIG. 35A, according to at least one aspect of the present disclosure. The drill bits illustrated in FIG. 35C can be used with any of the drill assemblies described herein.

FIG. 36A is a perspective view of a drill bit arrangement 2610 for use with a drill assembly, according to at least one aspect of the present disclosure. FIG. 36B is a perspective view of a drill bit arrangement 2620 for use with a drill assembly, according to at least one aspect of the present disclosure. FIG. 36C is a perspective view of a drill bit arrangement 2630 for use with a drill assembly, according to at least one aspect of the present disclosure. The drill bit arrangements of FIGS. 36A-36C are configured to be used to drill a hole in a vessel skin, for example. FIG. 36D depicts a drill bit arrangement 2640 depicting a drill chuck 2642, a metal plate 2641, a tap 2643, and a drill bit 2644.

FIG. 37 depicts multiple drill bits 2700 for use with a drill assembly of the present disclosure.

Figure 38:
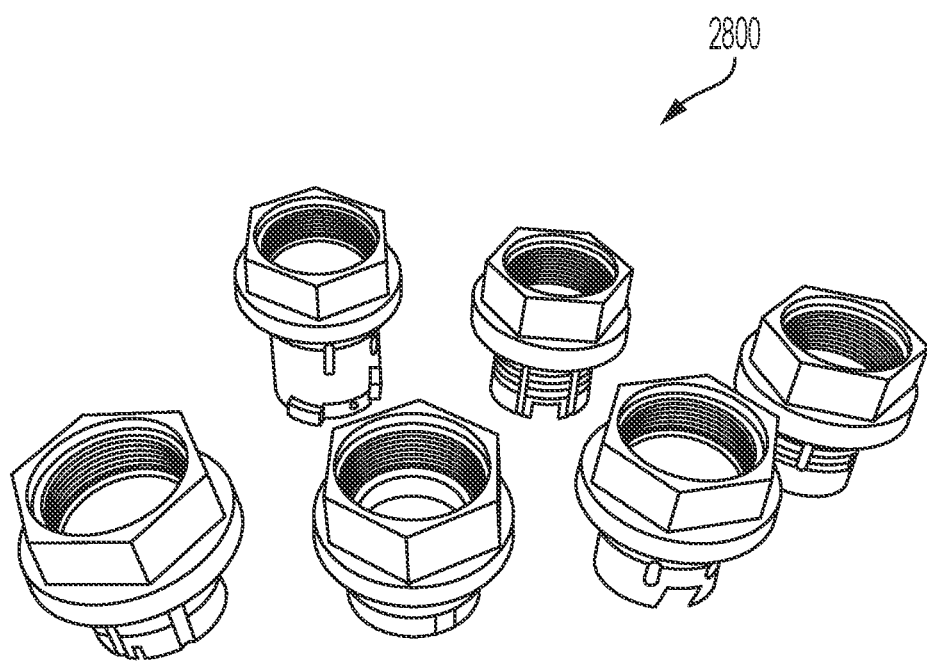
FIG. 38 is several views of various taps for use with a drill assembly, according to at least one aspect of the present disclosure.

FIG. 38 depicts multiple self-tapping taps 2800 comprising driving heads, flanges, and self-tapping threads. Each tap of the taps 2800 illustrated in FIG. 38 is configured to drive a drill bit configured to be removably attached thereto.

Figure 39:
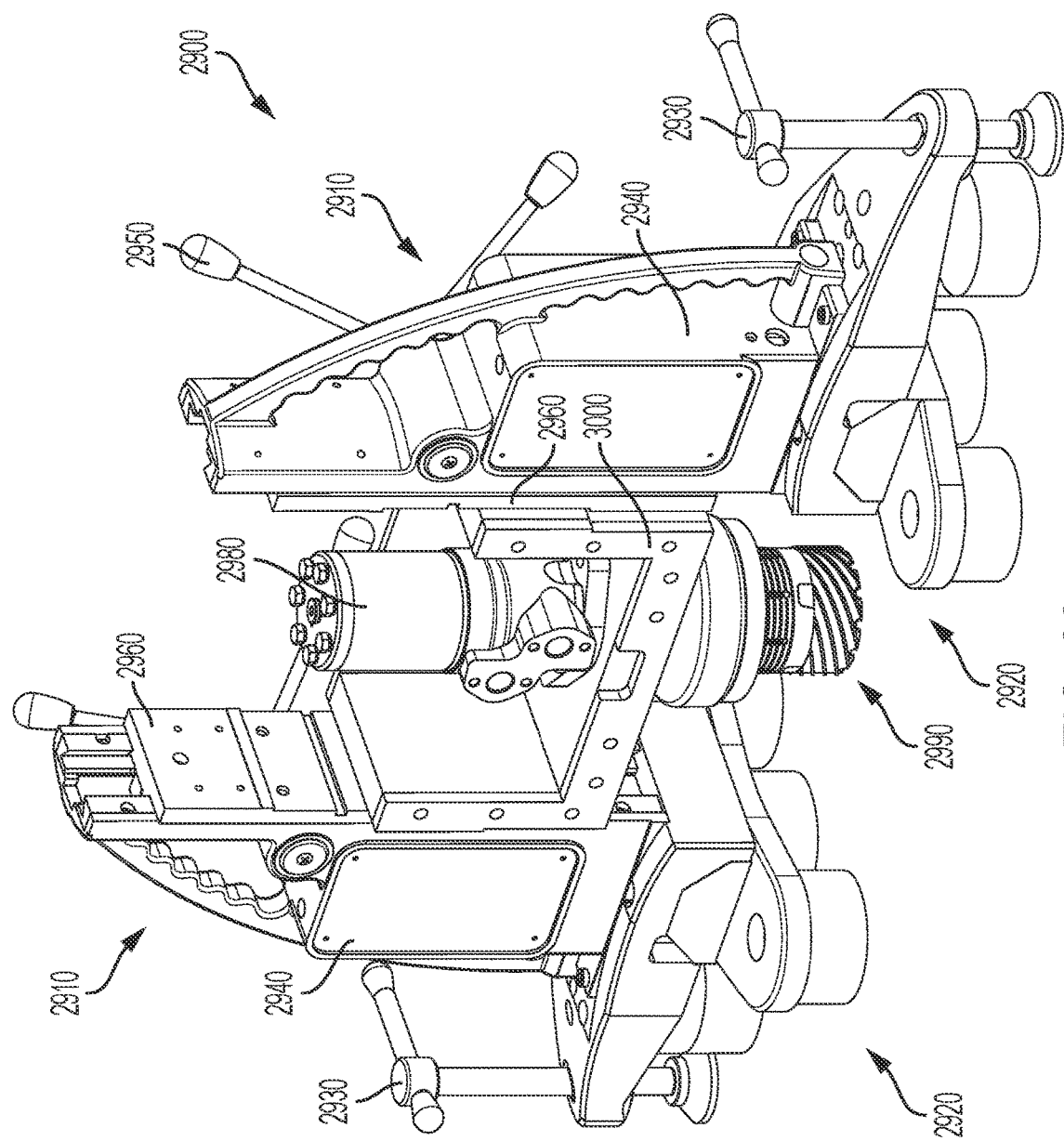
FIG. 39 is a perspective view of a drill assembly, according to at least one aspect of the present disclosure, the drill assembly comprising two linear actuators configured to raise and lower a single bit drive mounted to a carriage.

FIG. 39 depicts a drill assembly 2900 according to one aspect of the present disclosure. The drill assembly 2900 can be used for larger drill motors providing large torques where larger attachment forces are needed to hold the drill assembly to a vessel skin, for example. The drill assembly 2900 comprises two drill assemblies 2910 coupled to a single bit drive 2980. The drill assemblies 2910 are configured to cooperatively, linearly actuate the bit drive 2980 with linear actuators 2950. In other aspects, more than two drill assemblies 2910 are used. For example, drill assemblies may be arranged in a pattern resembling the base of the mount to which the bit drive is mounted. For example, three drill assemblies may be used to linearly actuate a bit drive containing a triangular mounting plate. Similarly, four drill assemblies may be used to linearly actuate a bit drive containing a quadrilateral mounting plate. The drill assembly 2900 further comprises release mechanisms 2930 configured to pry the drill assembly 2900 away from a vessel hull, for example.

Figure 40:
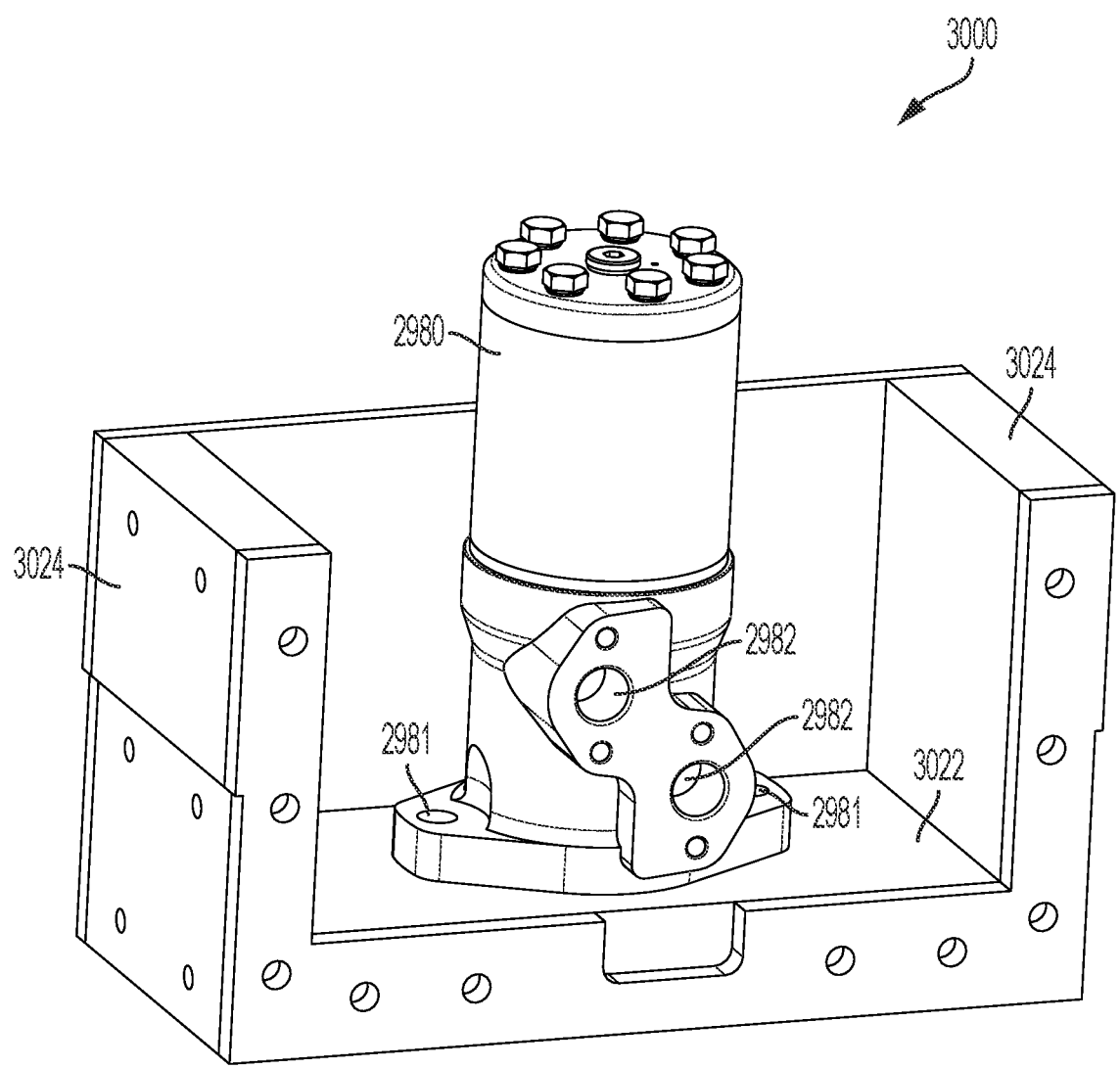
FIG. 40 is a perspective view of the carriage and the bit drive of FIG. 39, according to at least one aspect of the present disclosure.

At any rate, each drill assembly 2910 comprises a drill assembly base 2920, a release mechanism configured to push each drill assembly 2910 away from a vessel skin, for example, and a linear actuator 2940 configured to linearly actuate a slider 2960 that is mounted to a bit drive mounting bracket 3000. The sliders 2960 are configured to simultaneously raise and lower a bit assembly 2990 when the sliders 2960 of the linear actuators 2940 are actuated. The bit drive mounting bracket 3000 is shown in FIG. 40. The bit drive mounting bracket 3000 comprises a base 3022 and sides 3024 extending from the base 3022. The sides 3024 are configured to be fastened to the sliders 2960 by way of bolts, for example. The bit drive 2980 comprises fluid ports 2982 configured to permit the bit drive 2980 to be coupled to a hydraulic actuator drive line. The fluid ports 2982 can provide an inlet and an outlet to the bit drive 2980 for hydraulic fluid. The bit drive 2980 further comprises mounting flanges 2981 configured to be mounted to the mounting bracket base 3022.

Figure 41A:
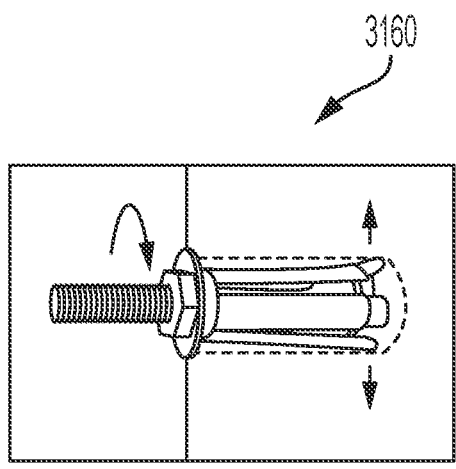
FIG. 41A is a perspective view of a rivet, according to at least one aspect of the present disclosure.
Figure 41B:
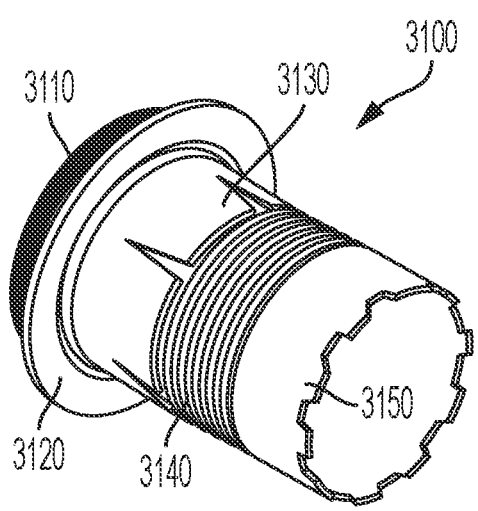
FIG. 41B is a perspective view of a bit coupling, according to at least one aspect of the present disclosure.

In certain instances, a rivet can be incorporated into a tap. Referring now to FIGS. 41A and 41B, a rivet 3160 and a bit coupling 3100 are depicted. The bit coupling 3100 is configured to be self-tapped into a vessel skin, for example, to provide a fluid port between the inside and outside of a sunken vessel, for example. The bit coupling 3100 comprises a head portion 3110, a flange 3120 configured to be pressed up against the vessel skin, and an insertion section. The insertion section comprises a drill bit 3150 configured to drill a hole in the vessel skin, self-tapping threads 3140 configured to threadably engage the vessel skin, and a wedged section 3130 expanding in diameter along its length. The wedged section 3130 comprises a first diameter equal to or similar to a diameter of the bit coupling 3100 where the self-tapping threads 3140 are positioned and a second diameter which is larger than the first diameter. The portion of the self-tapping threads 3140 that are configured to engage the vessel skin last are configured to wedge the wedged section 3130 into the hole drilled and tapped by the drill bit and self-tapping threads, respectively. Thus, once the wedged section 3130 reaches the vessel skin after the self-tapping threads 3140 are fully below the surface of the vessel skin, a portion of the self-tapping threads 3140 is still positioned within the hole and with further rotation of the bit coupling 3100, the self-tapping threads can pull the wedged section into the hole to bolster the seal and engagement of the bit coupling 3100 with the vessel skin.

Figure 42:
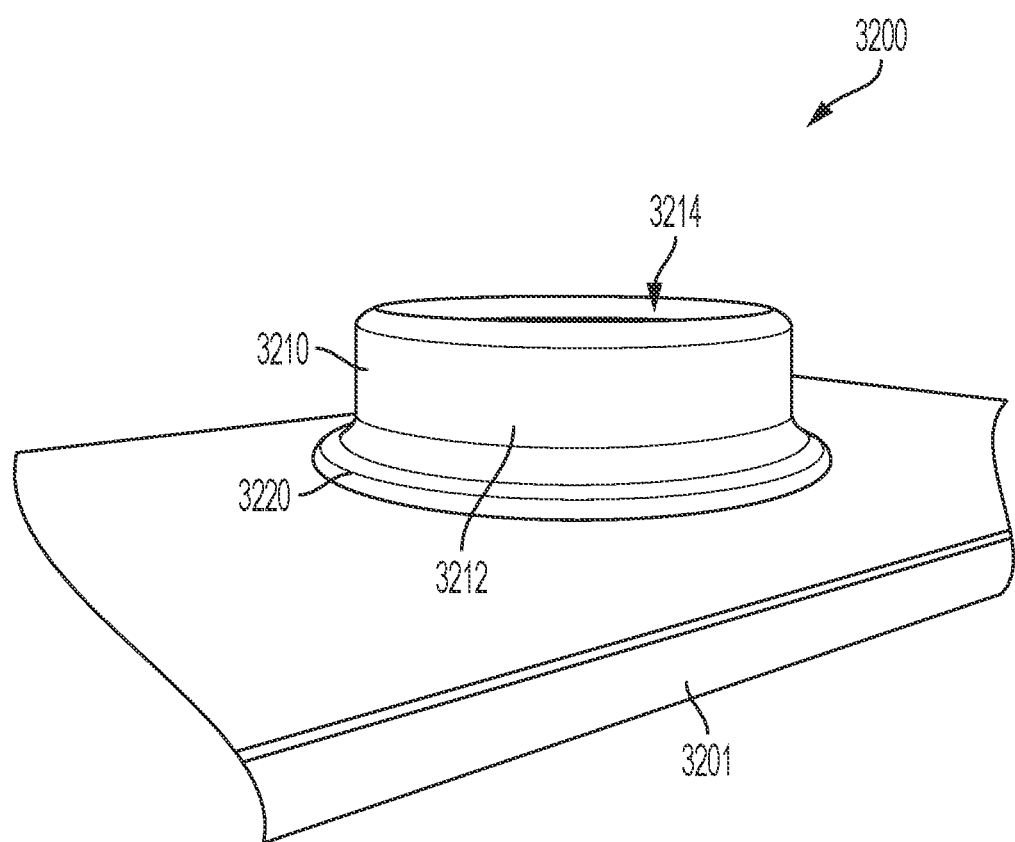
FIG. 42 is a perspective view of an outer end of a rivet coupling attached to a vessel hull, according to at least one aspect of the present disclosure.
Figure 43:
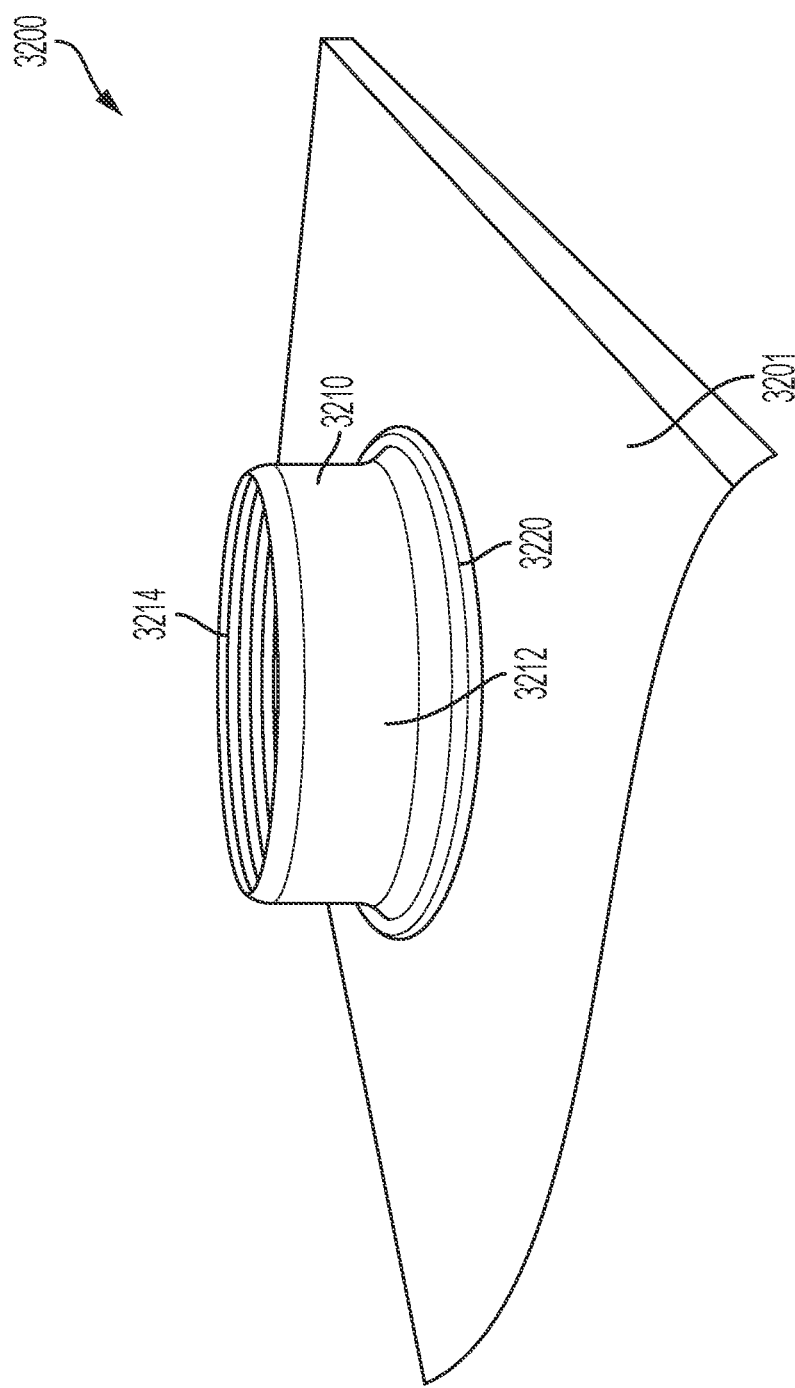
FIG. 43 is a perspective view of an outer end of a rivet coupling attached to a vessel hull, according to at least one aspect of the present disclosure.
Figure 44:
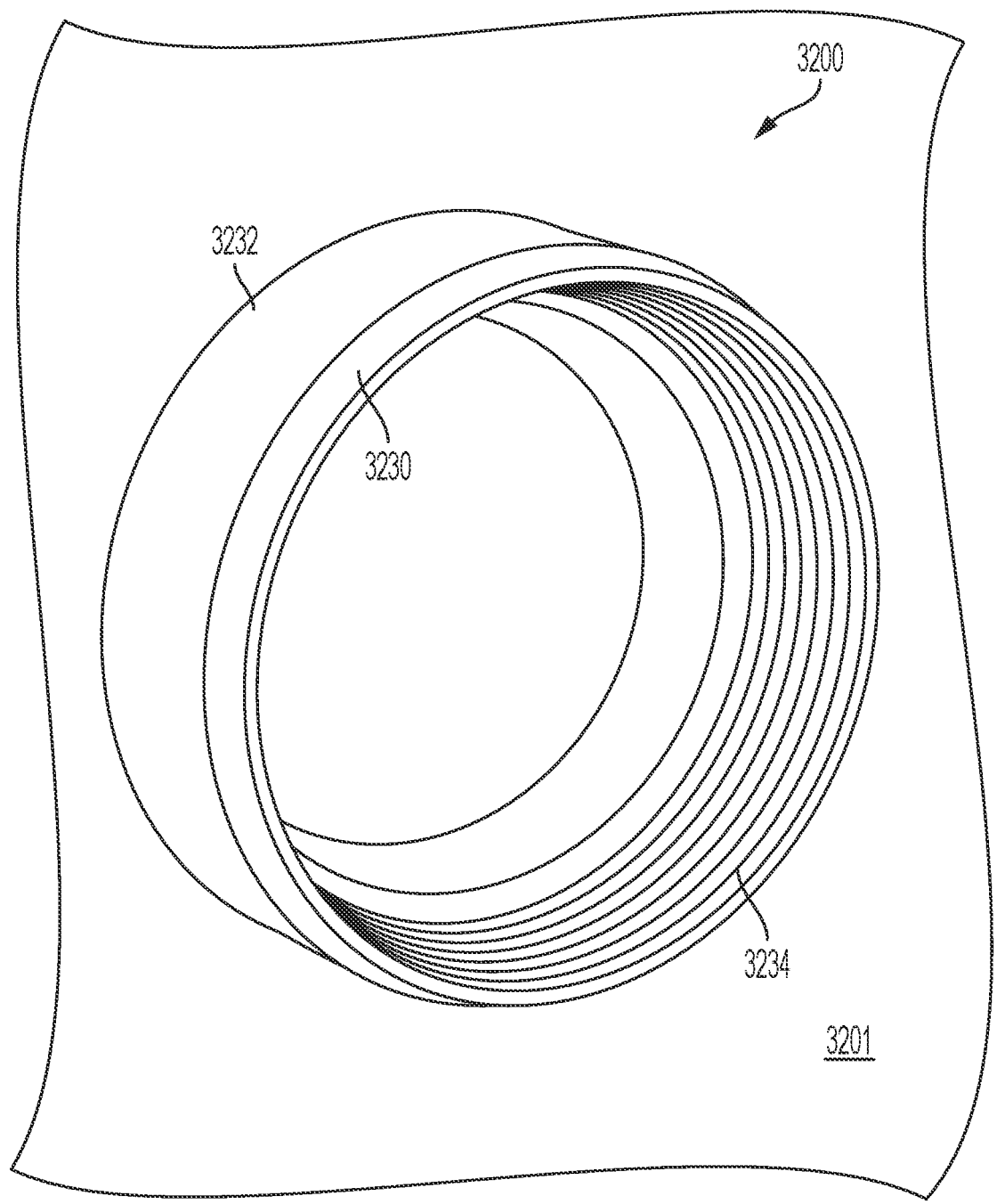
FIG. 44 is a perspective view of an inner end of the rivet coupling of FIG. 43, wherein a section of the rivet coupling is deformed radially outward to hold the rivet coupling to the vessel hull to which it is installed, according to at least one aspect of the present disclosure.

FIGS. 42-44 depict a rivet coupling 3200 configured to provide a fluid port between the inside and the outside of a vessel skin 3201, for example, by using a rivet-type device. The rivet coupling 3200 comprises an outer section 3210 comprising a flange 3220 configured to be pressed up against the vessel skin 3201. The rivet coupling 3200 also includes threads 3214 defined on the inside of an upper portion 3212 of the outer section 3210. The threads 3214 permit the outer section 3210 to be coupled with a hose, for example, to be used for fluid extraction or insertion. FIG. 44 depicts the rivet coupling 3200 installed into the vessel skin 3201 and depicting a bottom section 3230 of the rivet coupling 3200. The bottom section 3230 comprises internal threads 3234 and a deformable rivet section 3232, shown in the deformed state, pressed up against the inside of the vessel skin. Deformation of the rivet section 3232 is discussed in greater detail herein.

Figure 45:
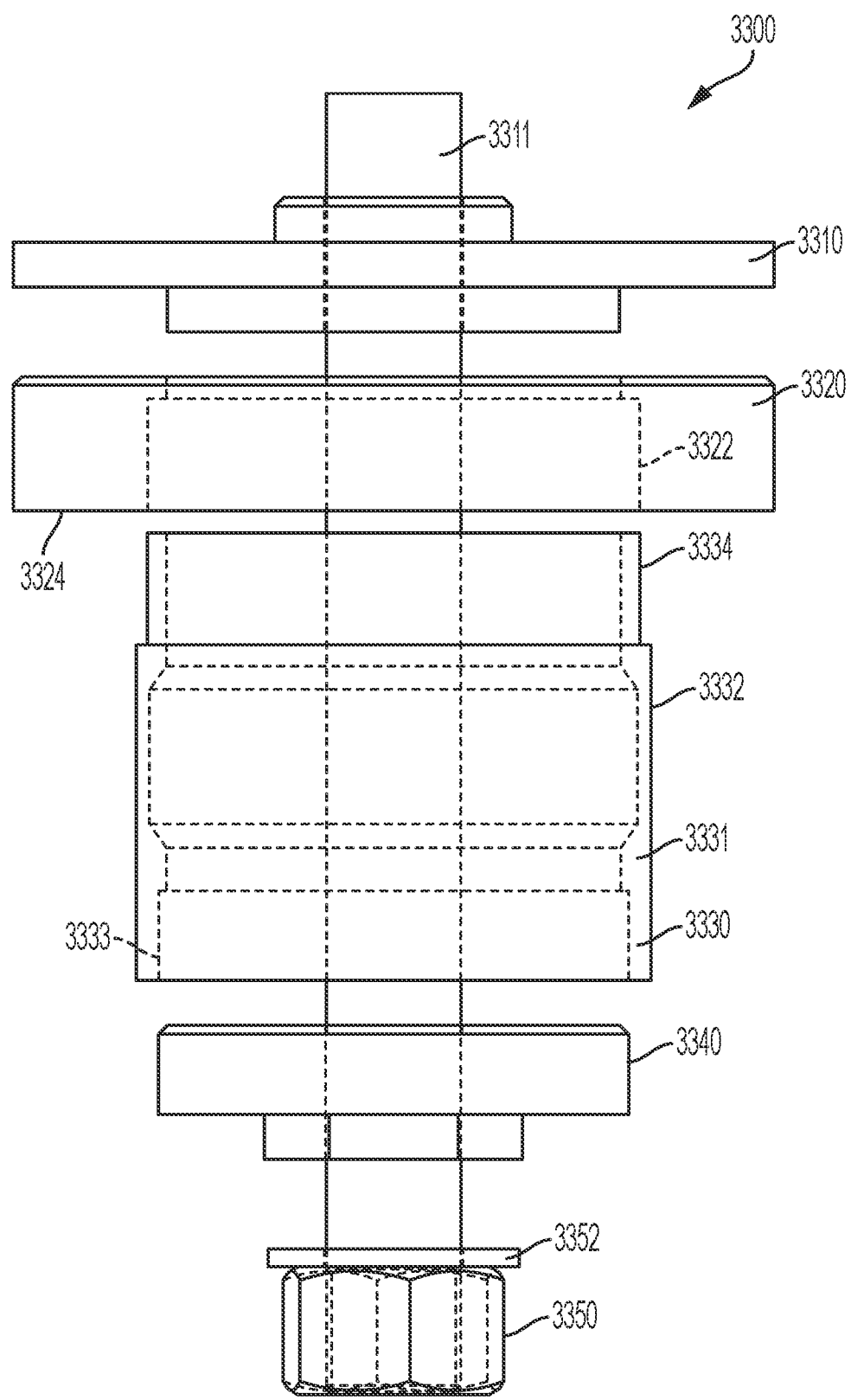
FIG. 45 is an elevational exploded view of a rivet coupling, according to at least one aspect of the present disclosure.
Figure 46:
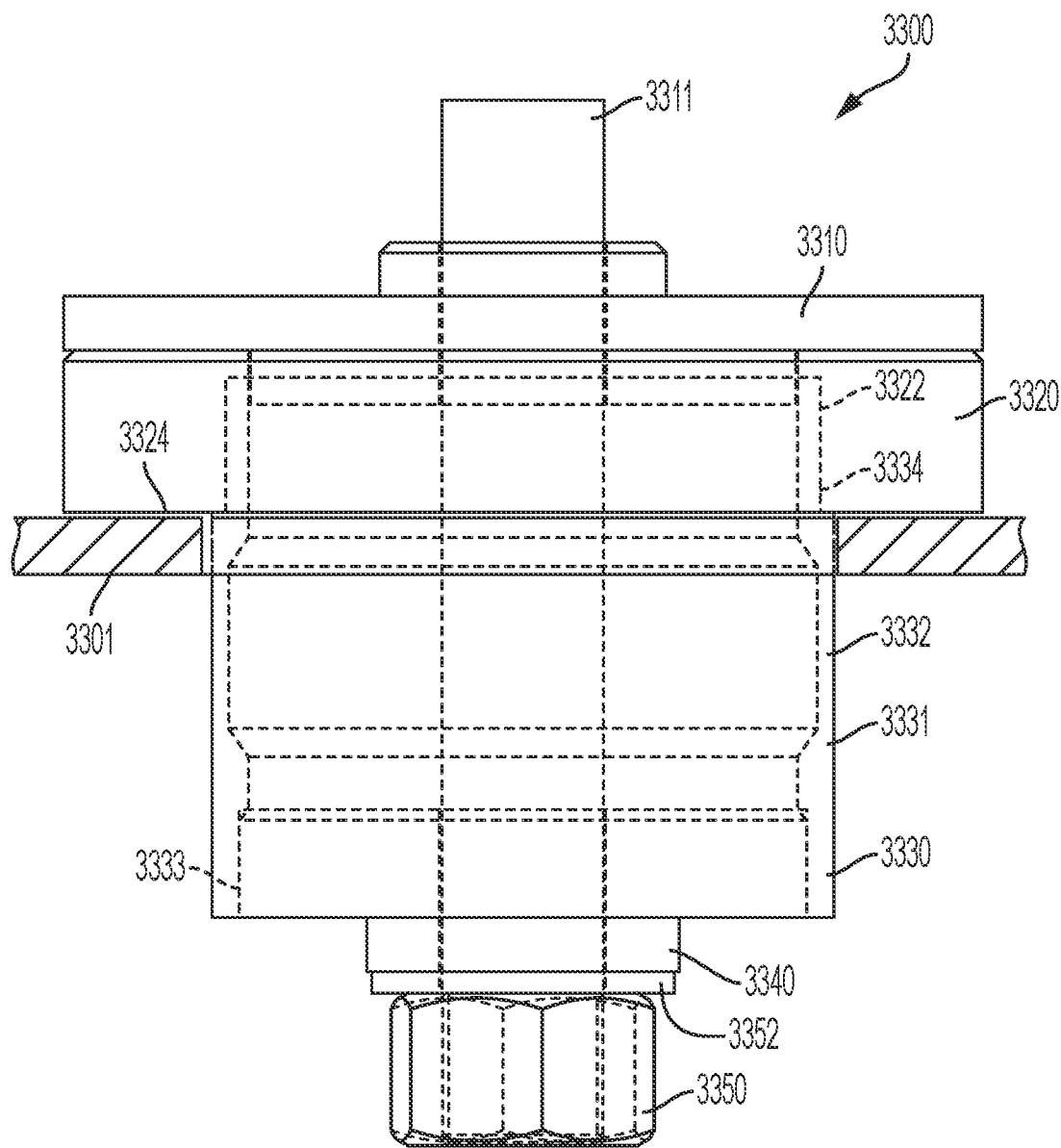
FIG. 46 is an elevational view of the rivet coupling of FIG. 45 in a pre-installed configuration, according to at least one aspect of the present disclosure.
Figure 47:
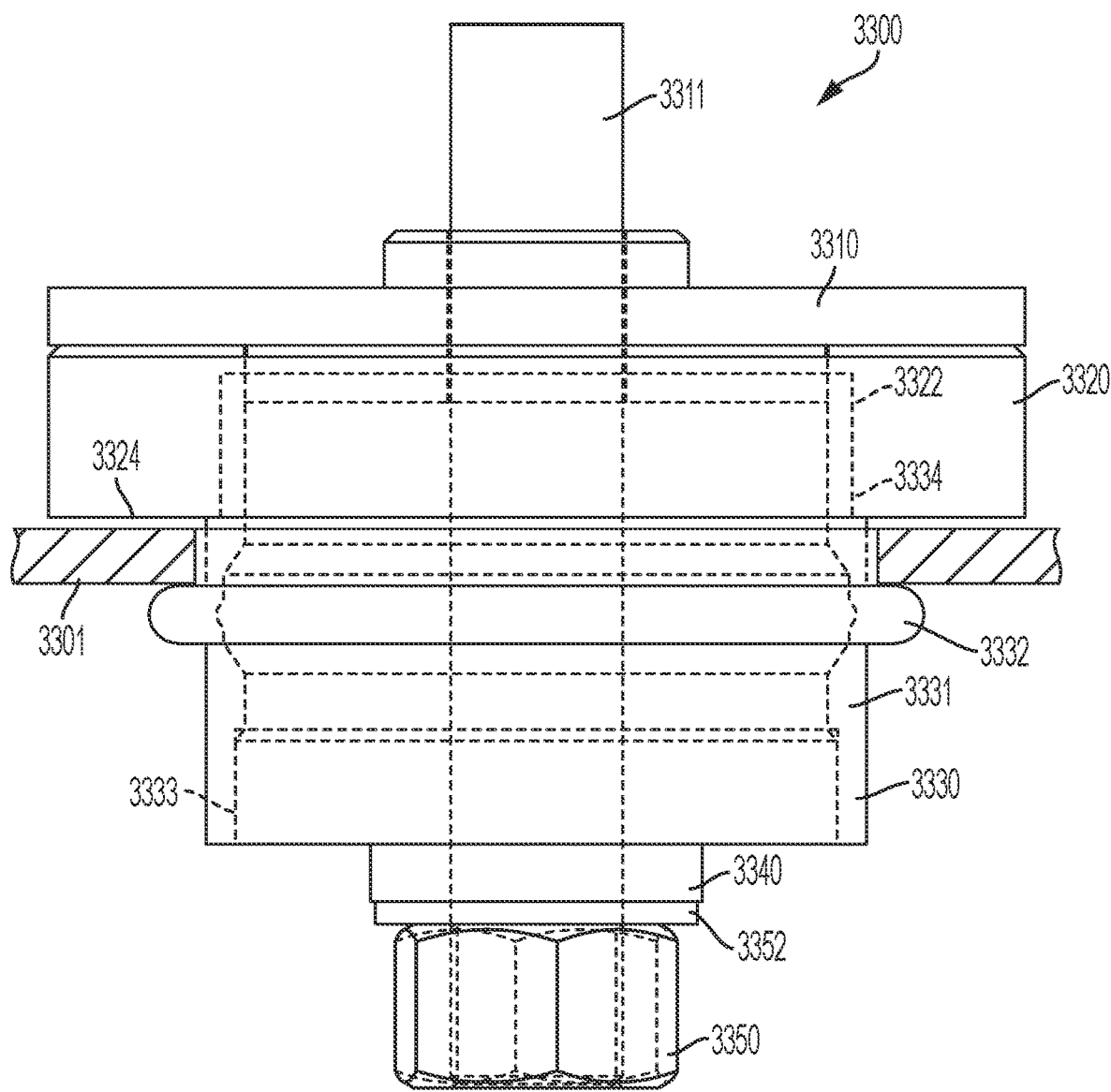
FIG. 47 is an elevational view of the rivet coupling of FIG. 45 in a fully installed configuration, according to at least one aspect of the present disclosure.

FIGS. 45-47 depict a rivet coupling 3300 configured to provide a fluid port between the inside and the outside of a vessel skin 3301. The rivet coupling 3300 comprises a rivet actuator 3311 comprising a first compression ring assembly 3310 configured to press the rivet coupling 3300 against the outside of the vessel skin 3301 and a second compression ring assembly comprising a nut 3350 and a washer 3352 configured to press the rivet coupling 3300 against the inside of the vessel skin 3301. The rivet coupling 3300 comprises a flange 3320 comprising a recess 3322 defined therein and a surface-facing side 3324 configured to abut the vessel skin 3301, a rivet member 3330 configured to be deformed against the vessel skin 3301, and an actuator link 3340. The rivet member 3330 comprises a male fitting section 3334 configured to be received within the recess 3322 of the flange 3320. The rivet member 3330 comprises a first section 3331 comprising a first thickness and a second section 3332 comprising a second thickness which is less than the first thickness. Different thicknesses can be used to encourage the location of deformation of the rivet member 3330 when the rivet member 3330 experiences compression loads. In one instance, the inner profile and dimensions of the passageway defined therethrough define where the second section 3332 is designed to deform under compression loads.

To employ the rivet coupling 3300, a hole is drilled in the vessel skin 3301 and the rivet coupling 3300 is assembled. The assembly of the rivet coupling 3300 can comprise the following steps. The actuator 3311 is provided without the washer 3352 and nut 3350 installed. First, the first compression ring assembly 3310 is pushed on the pipe from the end where the nut 3350 is to be installed, the nut end, and is threadably coupled with the actuator 3311. Then, the flange 3320 is pushed on the actuator 3311 from the nut end toward the first compression ring assembly 3310. The flange 3320 can comprise a recess corresponding to a projection portion of the first compression ring assembly 3310 to ensure alignment and maintain stability during installation and compression. The rivet member 3330 is then provided on the actuator 3311 and is press fit, for example, into the flange 3320. Then, the second compression ring assembly including the actuator link 3340, the washer 3352, and the nut 3350 is put on the actuator 3311 and fitted into a recess 3333 defined in the rivet member 3330. Once the above is completed, the washer 3352 is then put on the actuator 3311 along with the nut 3350 which is threadably coupled with the actuator 3311. Thus, in one instance, the threaded connections between the actuator 3311 and the first compression ring assembly 3310 and the actuator 3311 and the nut 3350 are the only connections holding the rivet coupling 3300 together. The other components may be fitted on the actuator 3311 freely so that they may move longitudinally relative to the actuator.

The threaded connections may comprise opposite direction threads such that if the first compression ring assembly 3310 is held stationary and the actuator 3311 is twisted, the actuator 3311 can be moved longitudinally relative to the first compression ring assembly 3310. As a result, the rivet member 3330 can be compressed by twisting the actuator 3311 in a direction resulting in the nut 3350 and washer 3352 moving toward the first compression ring assembly 3310. Such an arrangement would cause the washer 3352 to press against the actuator link 3340 to compress the rivet member 3330 between the first compression ring assembly 3310 and the nut 3350 and washer 3352. Such compression can cause predictable deformation of the rivet member 3330 in the region with the reduced thickness near the inside surface of the vessel skin 3301 such as, for example, in the second section 3332. Such deformation can provide a flange inside the vessel and provide the rivet coupling 3300 with a holding force to hold the coupling 3300 to the vessel skin 3301. In one instance, the thread lengths are designed such that a maximum compression is given around when the actuator 3311 is to be separated from the rivet coupling 3300 such that the actuator 3311 can be decoupled from its actuation system and pushed through the rivet coupling 3300 to separate it from the rivet coupling 3300.

Figure 48:
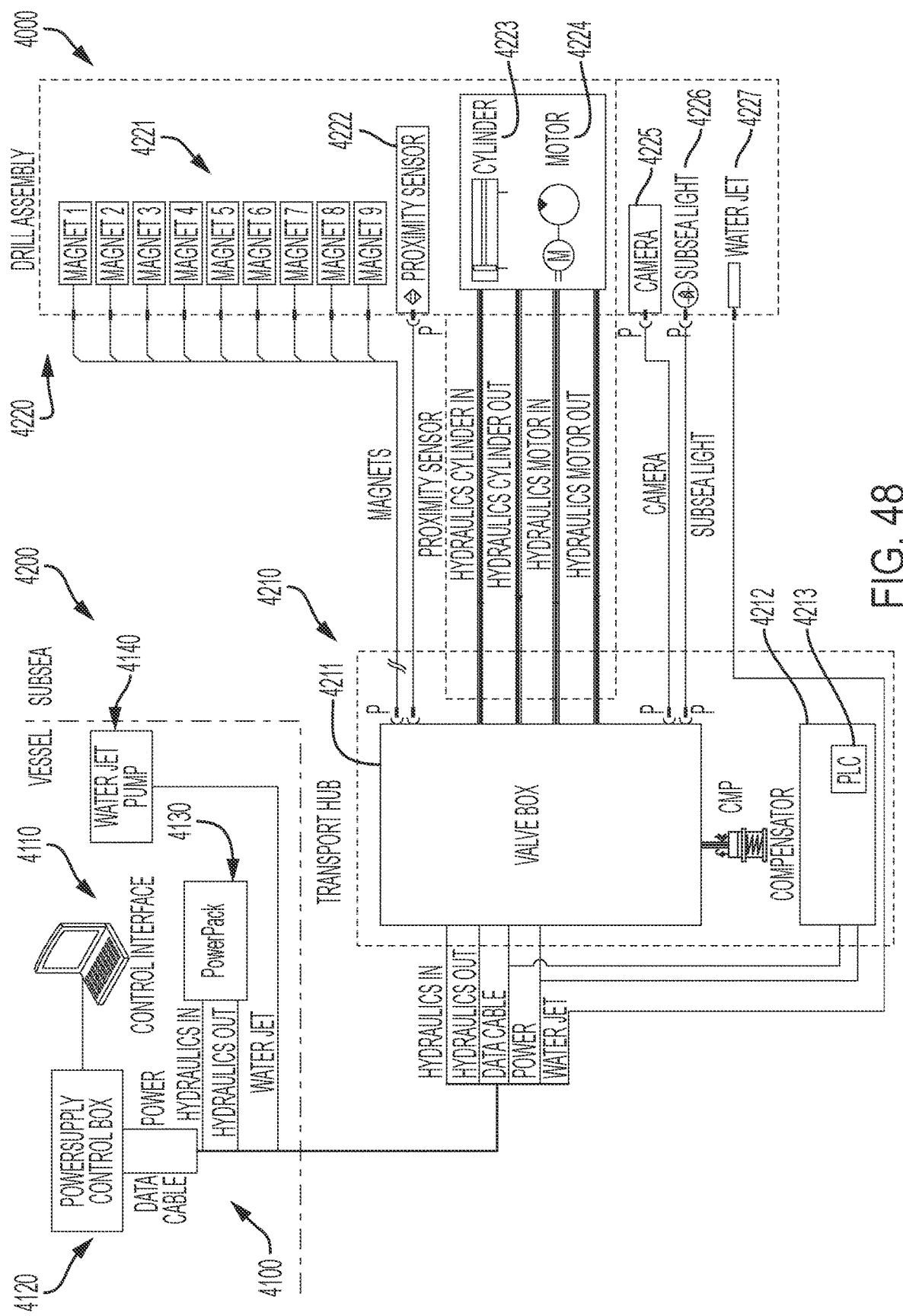
FIG. 48 is a schematic of a system including a drill assembly and various components to operate the drill assembly, according to at least one aspect of the present disclosure.
Figure 49:
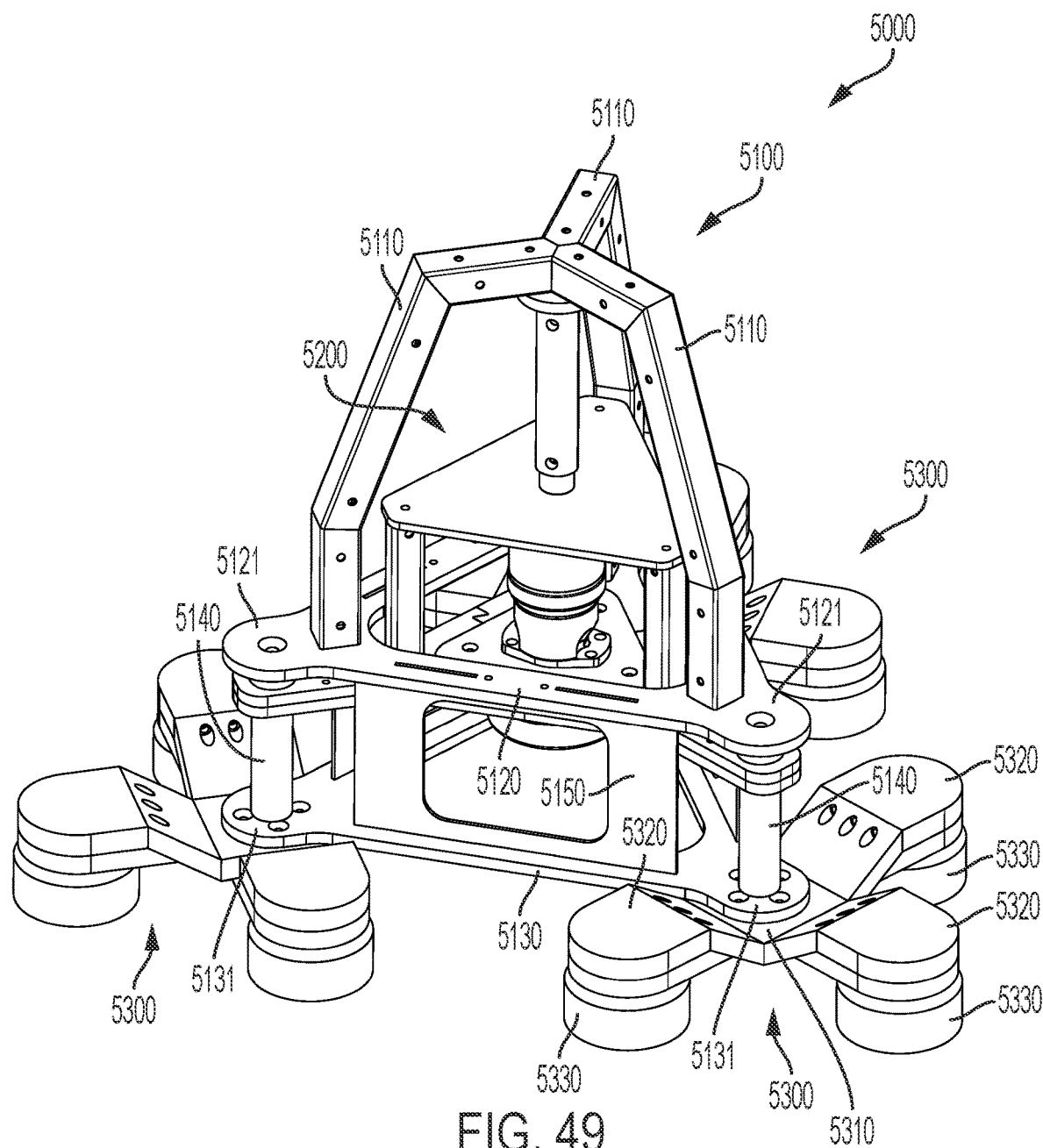
FIG. 49 is a perspective view of a drill assembly comprising a frame, a drilling system, and mounting elements attached to the frame, according to at least one aspect of the present disclosure.
Figure 50:
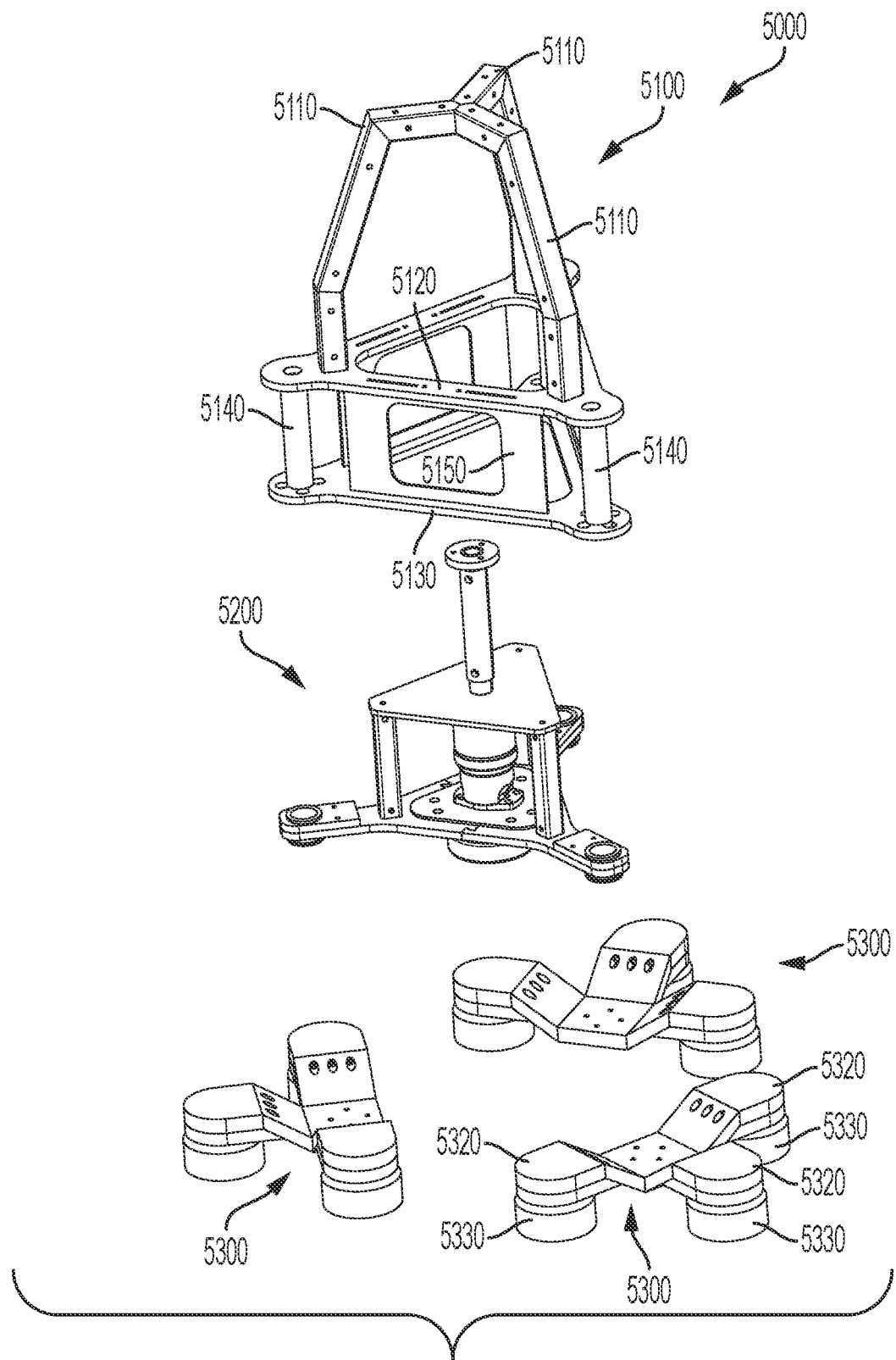
FIG. 50 is an exploded view of the drill assembly of FIG. 49, according to at least one aspect of the present disclosure.
Figure 51:
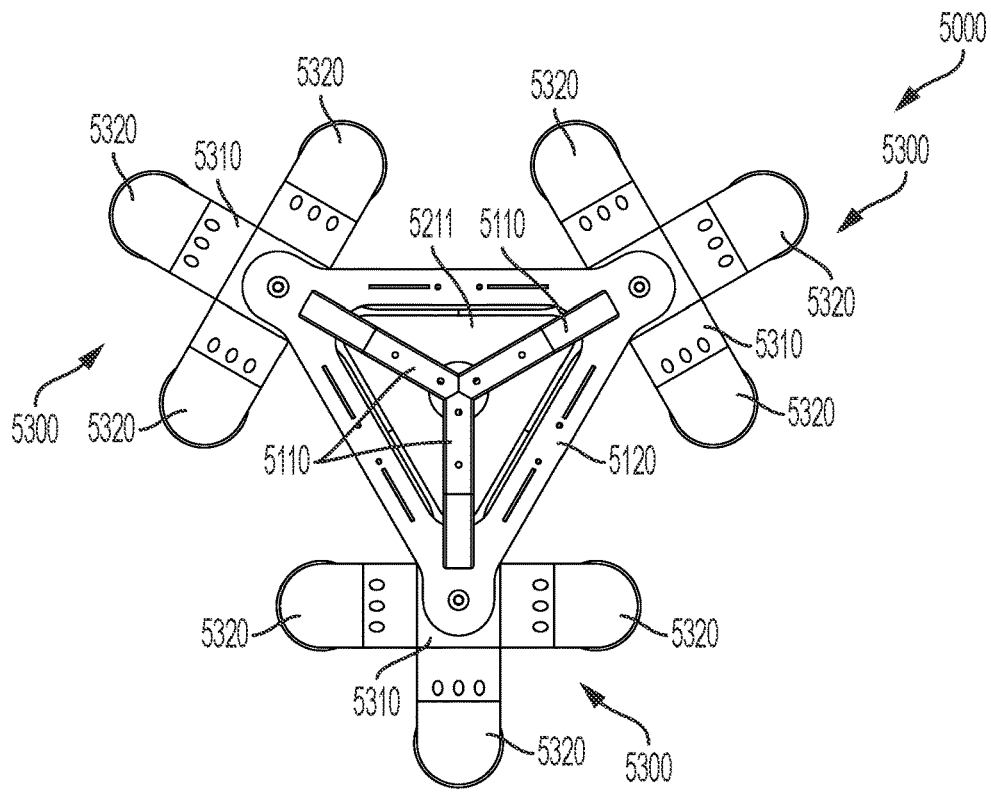
FIG. 51 is a top view of the drill assembly of FIG. 49, according to at least one aspect of the present disclosure.
Figure 52:
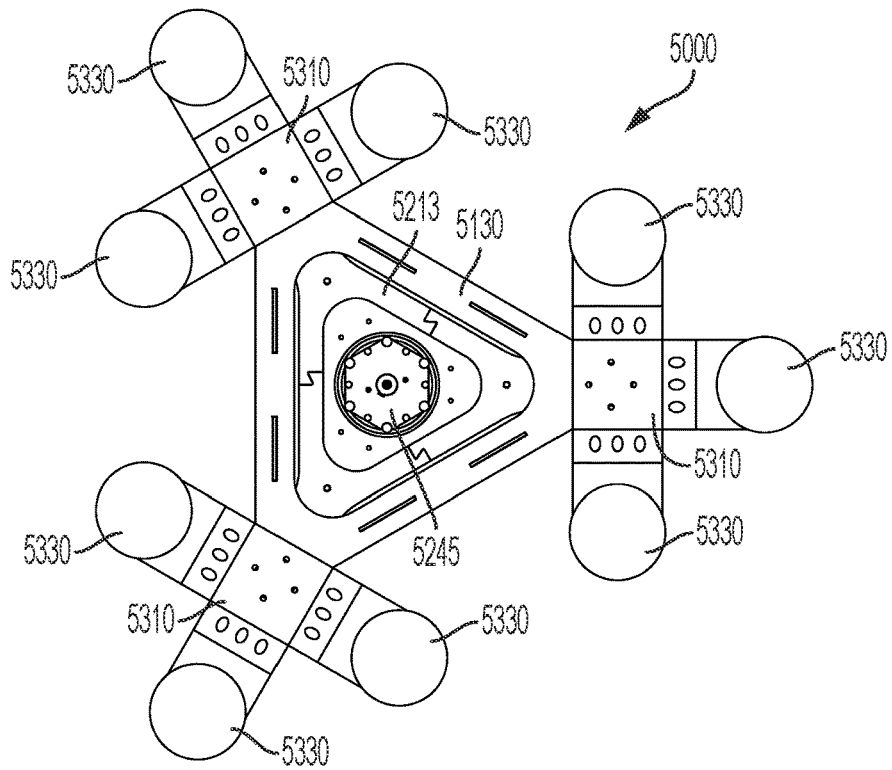
FIG. 52 is a bottom view of the drill assembly of FIG. 49, according to at least one aspect of the present disclosure.
Figure 56:
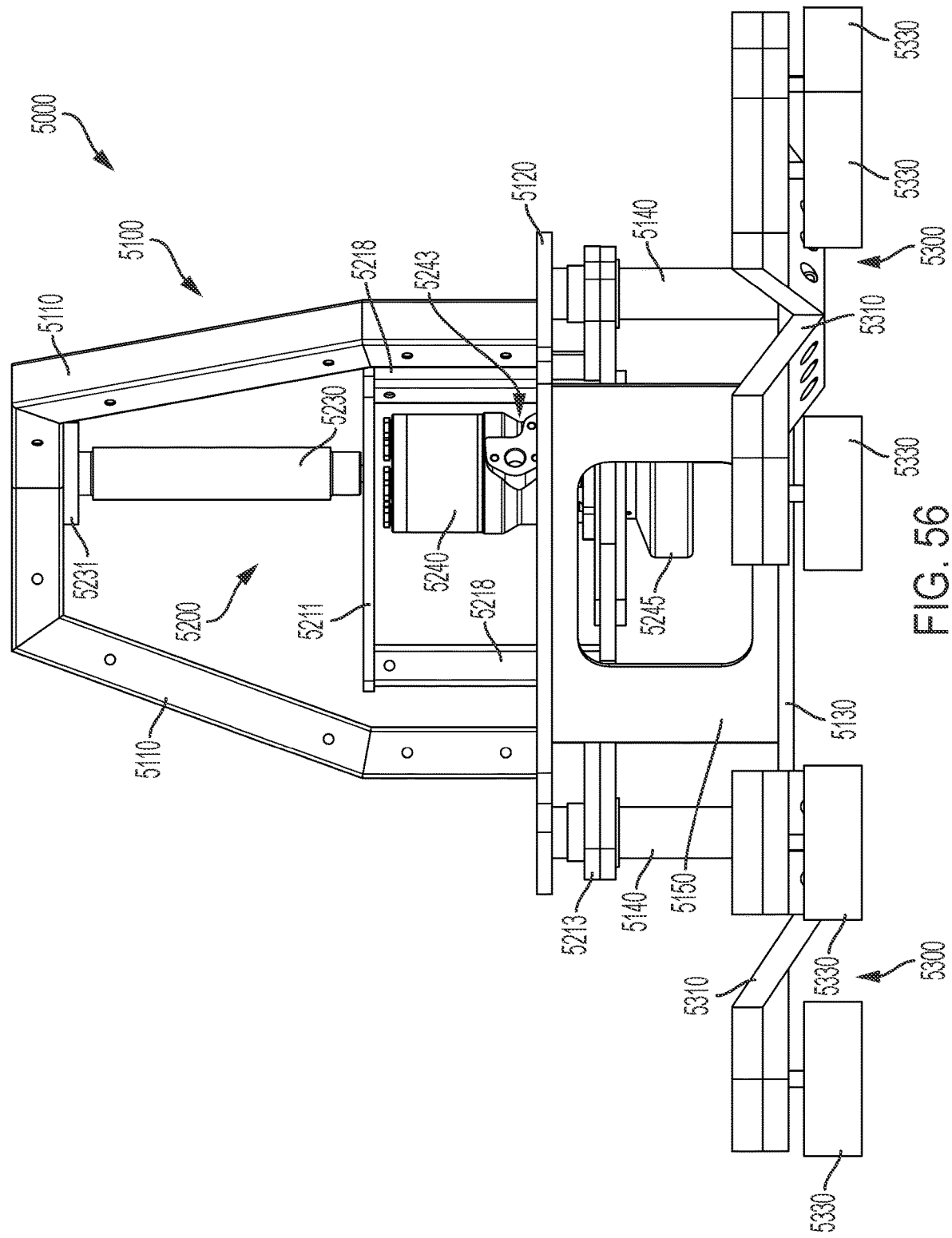
FIG. 56 is an elevational view of the drill assembly of FIG. 49, according to at least one aspect of the present disclosure.
Figure 57:
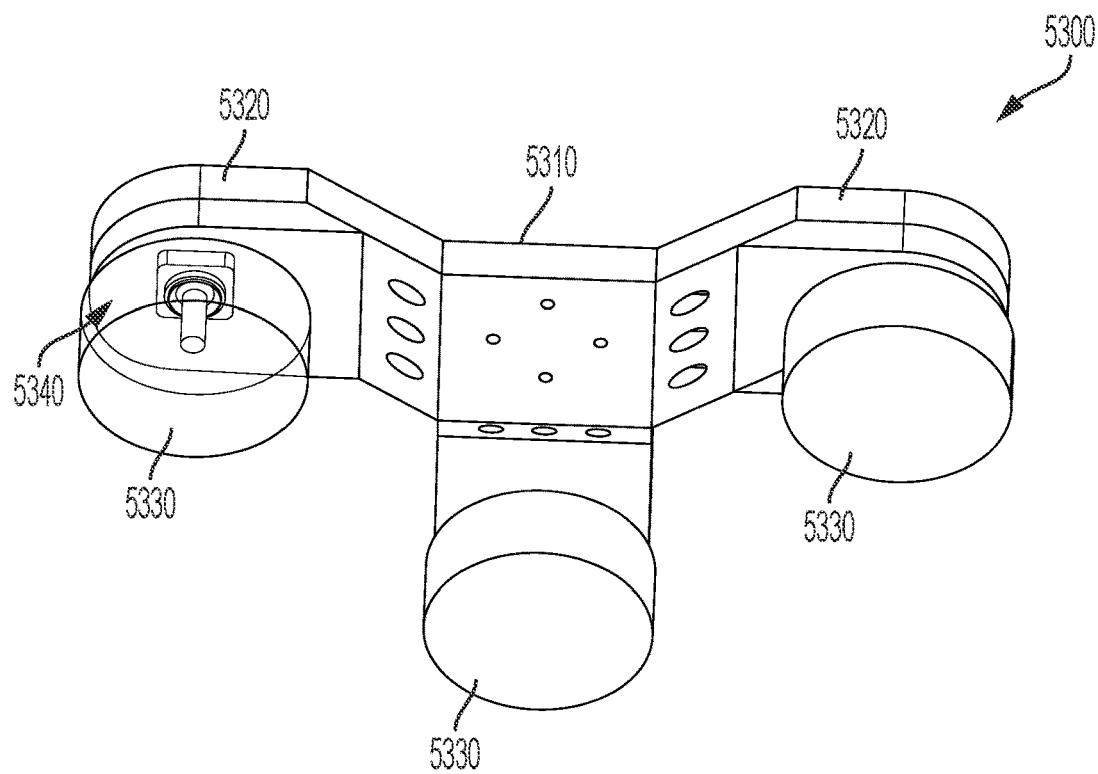
FIG. 57 is a bottom perspective view of a mounting element of FIG. 49, wherein the mounting element comprises a frame and a plurality of magnets attached thereto, according to at least one aspect of the present disclosure.

FIG. 48 is a schematic of a control system 4000 comprising above-sea components 4100 and sub-sea components 4200 of a drill assembly 4220. The above-sea components 4100 and the sub-sea components 4200 cooperate to permit a user to operate the drill assembly 4220 from aboard a vessel, for example. The above-sea components 4100 are positioned aboard the vessel, for example, and are configured to send power, send and receive hydraulic fluid, and send and receive data signals to and from the sub-sea components 4200. The sub-sea components 4200 comprises a transport hub 4210 configured to transport the drill assembly 4220 from the vessel to a drilling site and also control the transmission of fluid flow, electrical signals, and data signals between the above-sea components 4100 and the drill assembly 4220. Once the transport hub 4210 is positioned on the sea floor, for example, near the drilling site, the drill assembly 4220 is removed from the transport hub 4210 and positioned on a target drilling location on a sunken ship haul, for example.

The above-sea components 4100 comprise a control interface 4110, a power supply control box 4120, and a hydraulic power pack 4130 configured to deliver power, hydraulic fluid, and data signals to the sub-sea components 4200. The control interface 4110 may comprise a computer, for example. An operator uses the control interface 4110 to send commands in the form of data signals to the power supply control box 4120 which communicates the commands and power to the sub-sea components 4200. The hydraulic power pack 4130 is positioned in a hydraulic circuit of the system 4000 to control the flow of hydraulic fluid through the sub-sea components 4200. The above-sea components 4100 further comprise an optional system including a pump 4140 configured to deliver a fluid to the drilling location to spray away debris at the drilling location. All electrical and fluidic transmission between the above-sea components 4100 and the sub-sea components 4200 is achieved through transmission cables and hoses. The data signals may be communicated through an Ethernet cable, fiber optic cable, and/or coaxial cable, for example.

The transport hub 4210 is tethered to the above-sea components 4100 and the drill assembly 4220 to control the transmission of power, hydraulic fluid, data signals, and electric signals between the above-sea components 4100 and the drill assembly 4220. The transport hub 4210 comprises a valve box 4211 configured to house the non-fluid sensitive transmission components and an isolated electrical pod, or cavity, 4212 configured to house the fluid-sensitive transmission components. The valve box 4211 comprises internal fluidic valves and electronics such as proportional valves, pressure release valves, pressure sensors, a valve control module, and solid state relays. The isolated electrical pod 4212 comprises a dry environment in which to house a control circuit 4213 such as a programmable logic controller, for example. The programmable logic controller 4213 is connected to the electronics such as the relays, sensors, and valve control module, for example, inside the valve box 4211. The programmable logic controller 4213 is also connected to the above-sea components to send and receive data signals to and from the control interface 4110 so that the programmable logic controller 4213 can communicate with the control interface 4110 to receive instructions from and deliver information to the control interface 4110. Instructions may be received from the control interface 4110 telling the programmable logic controller 4213 to activate the relays and/or adjust the valves inside the valve box 4211 with a remote control module. Information may be delivered to the control interface 4110 corresponding to the information gathered by the sensors inside the valve box 4211.

The control circuit may comprise a microcontroller comprising one or more processors (e.g., microprocessor, microcontroller) coupled to at least one memory circuit. The memory circuit stores machine-executable instructions that, when executed by the processor, cause the processor to execute machine instructions to implement various processes described herein. The processor may be any one of a number of single-core or multicore processors known in the art. The memory circuit may comprise volatile and non-volatile storage media. The processor may include an instruction processing unit and an arithmetic unit. The instruction processing unit may be configured to receive instructions from the memory circuit.

The drill assembly 4220 comprises several components some of which require power, electrical signal transmission, fluidic transmission, and/or data transmission. The drill assembly 4220 comprises a mounting system comprising a plurality of magnets 4221 which may be, for example, electromagnets to affix the drill assembly 4220 to a magnetic material such as a ship skin, for example, as further described herein. The electromagnets 4221 receive power from the power supply control box 4120 through the valve box 4211. To activate the electromagnets 4221, power can be delivered when instructions from the control interface 4110 are sent to the programmable logic controller 4213 to switch the relays in the valve box 4211 on. Similarly, to de-activate the electromagnets 4221 and detach the drill assembly 4220 from the ship skin, power can be cut off when instructions from the control interface 4110 are sent to the programmable logic controller 4213 to switch the relays in the valve box 4211 off.

The drill assembly 4220 further comprises a drilling system, as discussed in greater detail herein, comprising a linear actuator system 4223 and a bit drive system 4224 configured to be moved up and down by the linear actuator system 4223 and configured to drill a self-tapping bit assembly into the ship skin. The linear actuator system 4223 may comprise a hydraulic cylinder, for example, requiring hydraulic fluid to flow to and from the hydraulic cylinder to move the hydraulic cylinder and, thus, the bit drive system 4224 up and down. Hydraulic fluid is configured to flow between the hydraulic power pack 4130, the valve box 4211 in the transport hub 4210, and the hydraulic cylinder. To control the position of the bit drive system 4224, the valve control module in the valve box 4211 can adjust the valve configurations inside the valve box 4211 based on instructions received from the programmable logic controller 4213 to adjust the flow of fluid to the hydraulic cylinder to actuate the hydraulic cylinder. The position of the bit drive system 4224 can be monitored by monitoring the pressure in the hydraulic cylinder fluid circuit with a pressure sensor in the valve box 4211. This monitored pressure can be communicated to the control interface 4110 so that an operator is provided the position of the bit drive system 4224 during operation of the drill assembly 4220.

The bit drive system 4224 is configured to drill a self-tapping bit assembly into the ship skin. The bit drive system 4224 may comprise a hydraulic drill, for example, requiring hydraulic fluid to flow to and from the hydraulic drill to actuate the hydraulic drill and, thus, rotate the self-tapping bit assembly clockwise and counterclockwise. Hydraulic fluid is configured to flow between the hydraulic power pack 4130, the valve box 4211 in the transport hub 4210, and the hydraulic drill. To control the rotation of the hydraulic drill, the valve control module in the valve box 4211 can adjust the valve configurations inside the valve box 4211 based on instructions received from the programmable logic controller 4213 to adjust the flow of fluid to the hydraulic drill to actuate the hydraulic drill. The pressure required to drive the bit assembly into the ship skin can be monitored by monitoring the pressure in the hydraulic drill fluid circuit with a pressure sensor in the valve box 4211 to determine the amount of resistance the hydraulic drill is experiencing during the drilling process. This monitored pressure can be communicated to the control interface 4110 so that an operator can adjust the bit drive system 4224 and/or the linear actuator system 4223 accordingly. For example, the operator may reduce the speed of the hydraulic drill and/or raise the bit drive system 4224 to reduce the resistance experienced by the hydraulic drill.

The drill assembly 4220 comprises various other components. For example, the drill assembly 4220 comprises an underwater camera 4225 to allow an operate to see the drilling location, a subsea light 4226 to illuminate the drilling location for camera visibility, and one or more proximity sensors 4222 configured to determine the relative position between the drill assembly 4220 and the ship skin and/or the relative position between the bit assembly and the ship skin during the drilling process. The underwater camera 4225, subsea light 4226, and one or more proximity sensors 4222 require power from the transport hub 4210. The underwater camera 4225 requires data signal transmission between the underwater camera 4225 and the control interface 4110 so that an operator can see the drilling location via the control interface 4110. The one or more proximity sensors 4222 require electrical signal and/or data signal transmission so that the programmable logic controller 4213 can communicate the relative position between components to the control interface 4110.

Various components of the system 4000 may comprise analog components and/or digital components. Where analog sensors are used, for example, the need to transmit digital data from and to the analog sensors is not required an thus, may simplify the system 4000. Where digital sensors are used, digital data is required to be transmitted to and from the digital sensors. In various instances, both analog components and digital components are used, however, any suitable arrangement of analog components and digital components can be employed. Some analog components may provide greater simplicity to a system. Some digital components may provide a greater degree of accuracy than their analog counterparts, for example. Moreover, where digital components are used, the required analog to digital conversions of the signals can take place in converters placed aboard the vessel to further simplify a system containing digital components.

The drill assembly 4220 may further comprise a water jet nozzle 4227 configured to receive fluid, such as water, for example, from the pump 4140 to spray away debris at the drilling location. This system bypasses the transport hub 4210 and the control interface 4110 to increase the simplicity of the system 4000; however, the water jet nozzle 4227 and pump 4140 may be integrated with the other components to increase controllability of the water jet nozzle 4227 and pump 4140, for example.

Any transmission lines in the system 4000, such as the electrical cables and fluidic hoses, for example, may be attachable to and detachable from the components to which they are connected such that components can be quickly and/or easily swapped out if a component needs to be replaced and/or repaired. The system 4000 may also comprise various non-detachable transmission lines to decrease the possibility of leaking that may be caused by some detachable/attachable interfaces. The system 4000 may comprise both detachable/attachable transmission lines as well as non-detachable transmission lines.

FIGS. 49-59 depict a drill assembly 5000 comprising a frame 5100, a drilling system 5200 supported within the frame 5100, and mounting elements 5300 attached to the frame 5100 configured to permit securement of the drill assembly 5000 to a ship skin, for example. The drill assembly 5000 is configured to drill one or more self-tapping tap assemblies into the ship skin to create passageway(s) and allow fluid flow therethrough.

The frame 5100 comprise a plurality of arms 5110, an upper bracket 5120, and a lower bracket 5130. The plurality of arms 5110 are attached to each other at one end defining the top of the drill assembly 5000. The plurality of arms 5110 extend downwardly from the top of the drill assembly 5000 and are attached to outer portions 5121 of the upper bracket 5120. The frame 5100 further comprises posts 5140 extending between and attached to the outer portions 5121 of upper bracket 5120 and outer portions 5131 of the lower bracket 5130. The frame 5100 further comprises brace plates 5150 positioned between the posts 5140 and attached to the upper bracket 5120 and the lower bracket 5130. The brace plates 5150 can provide structural support to the frame 5100 as well as act as a protective barrier to the drilling system 5200. Various attachment means can be employed such as welding, bolts, screws, and/or adhesive, for example. The frame 5100 can be comprised of primarily metal; however, any suitable material or combination of materials can be used.

Each mounting element 5300 is attached to the underside of the outer portions 5131 of the lower bracket 5130 and is configured to secure the drill assembly 5000 to the ship skin. Each mounting element 5300 comprises a body portion 5310 attached to an outer portion 5131 of the lower bracket 5130, a plurality of arms 5320 extending from the body portion 5310, and a magnet 5330 attached to each arm 5320. The magnets 5330 comprise electromagnets; however, any suitable type of magnet may be employed.

Referring primarily to FIGS. 53-55, the drilling system 5200 is supported within the frame 5100 and comprises a linear actuator 5230, a sub-frame 5210, and a bit drive, or drill, 5240 attached to the sub-frame 5210. The linear actuator 5230 is fixed to the top of the drill assembly by way of a mounting bracket, or plate, 5231 and can comprise a hydraulic cylinder, for example; however, any suitable linear actuator may be used. The rod of the linear actuator 5230 is attached to an upper plate 5211 of the sub-frame 5210 such that the linear actuator 5230 moves the sub-frame 5210 and, thus, the bit drive 5240 vertically relative to the frame 5100 of the drill assembly 5000. The sub-frame 5210 further comprises vertical frame elements 5218 attached to the upper plate 5211 and a lower plate 5213 of the sub-frame 5210. The bit drive 5240 is mounted to the lower plate 5213 of the sub-frame 5210. The lower plate 5213 of the sub-frame 5210 comprises outer portions 5215 each comprising a slide bearing 5217 positioned therein. The lower plate 5213 is supported by the frame 5100 by the posts 5140 such that the slide bearings 5217 receive the posts 5140 allowing the entire sub-frame 5210 to be slid vertically relative to the frame 5100 as the linear actuator 5230 is actuated. Movement of the sub-frame 5210 allows the bit drive 5240 to be advanced toward, into, and away from the ship skin to drill a hole and install a tap assembly into the ship skin.

The bit drive 5240 comprises a hydraulic motor 5241, a hydraulic input and output 5243 configured to permit hydraulic fluid to flow through the hydraulic motor 5241 to actuate the hydraulic motor 5241, and a chuck 5245 attached to the hydraulic motor 5241 and configured to receive a bit assembly, as discussed in greater detail herein.

Referring primarily to FIGS. 57 and 58A-58C, a mounting element 5300 of the drill assembly 5000 is illustrated. The magnets 5330 are attached to the arms 5320 by way of ball-and-socket attachment mechanisms 5340. The attachment mechanisms 5340 permit a degree of leeway for the magnets 5330 to move to allow the magnets 5330 to more easily affix themselves to the surface of the ship skin, which may be uneven. In at least one instance, the ship skin to which the drill assembly 5000 is attached is convex or, at least curved to some degree, and the attachment mechanisms 5340 allow the mounting elements 5300 to compensate for this curvature and not sacrifice the amount of available holding force from all of the magnets 5330 of the drill assembly 5000.

Figure 58A:
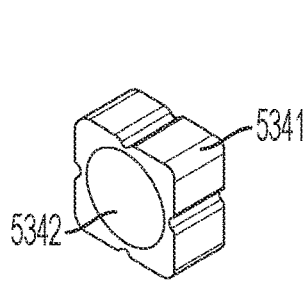
FIG. 58A is a perspective view of a portion of an attachment mechanism used to attach each magnet to the frame of the mounting element of FIG. 57, according to at least one aspect of the present disclosure.
Figure 58B:
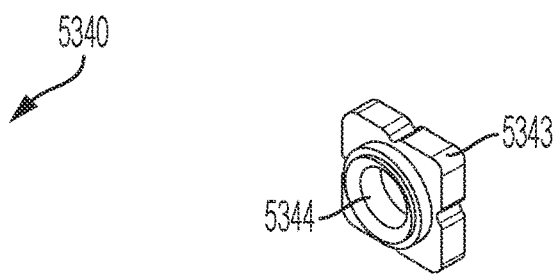
FIG. 58B is a perspective view of a portion of an attachment mechanism used to attach each magnet to the frame of the mounting element of FIG. 57, according to at least one aspect of the present disclosure.
Figure 58C:
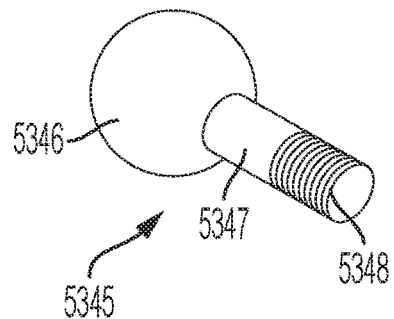
FIG. 58C is a perspective view of a portion of an attachment mechanism used to attach each magnet to the frame of the mounting element of FIG. 57, according to at least one aspect of the present disclosure.

Referring primarily to FIGS. 58A-58C, each attachment mechanism 5340 comprises a first socket element 5341 comprising an upper socket surface 5342. The first socket element 5341 is positioned within the arm 5320. The attachment mechanism 5340 comprises a second socket element 5343 comprising a lower socket surface 5344. The second socket element 5343 is also positioned within the arm 5320. The attachment mechanism 5340 further comprises a ball element 5345 comprising a ball portion 5346 and a threaded shaft 5347 extending from the ball portion 5346 comprising threads 5348. The ball portion 5346 is positioned within the upper socket surface 5342 and the lower socket surface 5344 which permits the ball portion 5346 to move freely within the first socket element 5341 and the second socket element 5343. The magnet 5330 is threadably engaged with, or screwed onto, the threads 5348 of the ball element 5345 to attach the magnet to the arm 5320. Although a ball joint is employed, any suitable type of joint can be used. For example, in at least one instance, a fixed joint may be used to increase simplicity of the drill assembly 5000. In at least one instance, the drill assembly 5000 can employ two or more different types of joints.

Figure 59:
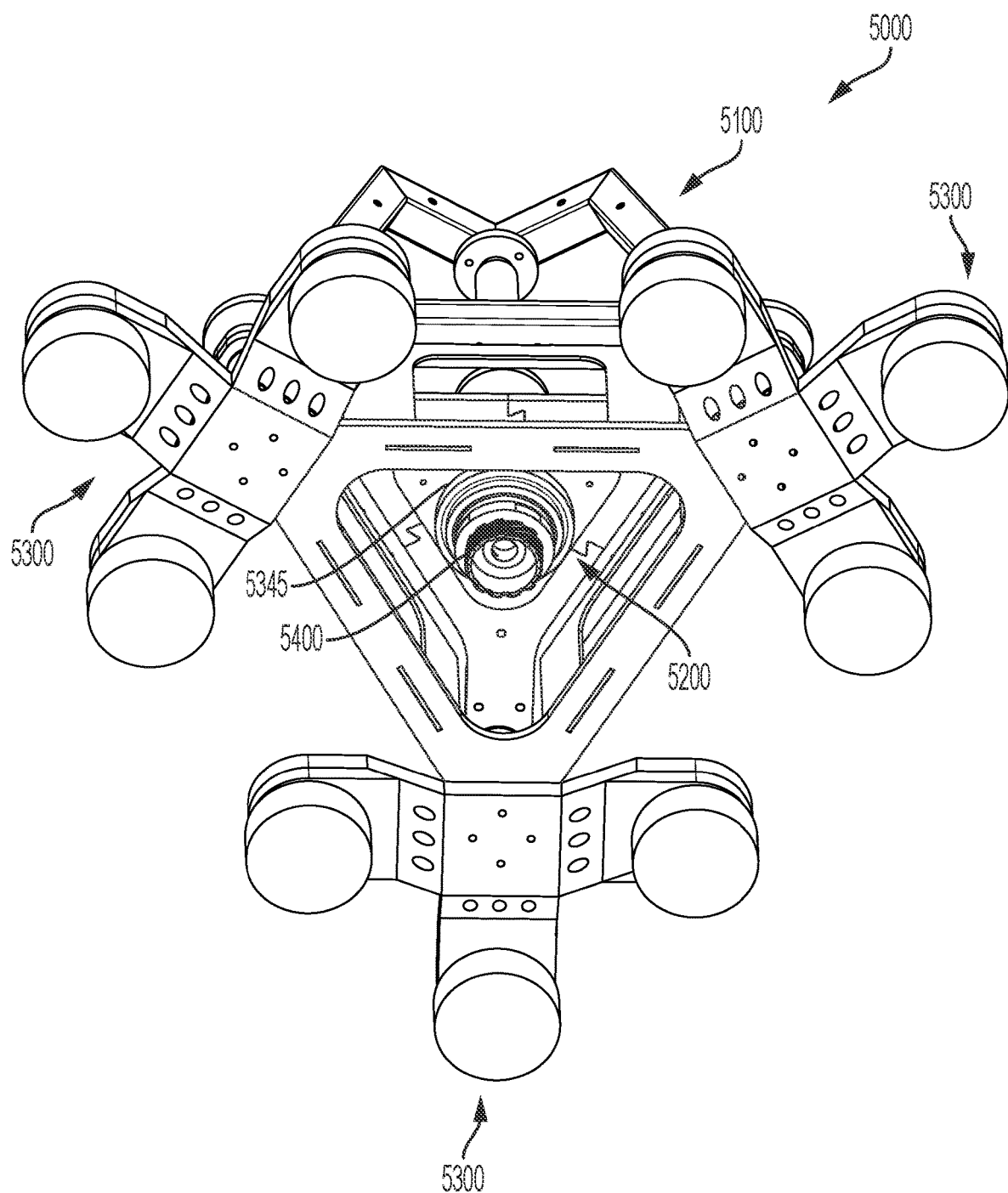
FIG. 59 is a bottom perspective view of the drill assembly of FIG. 49 illustrated with a bit assembly installed in the drill assembly, according to at least one aspect of the present disclosure.
Figure 60:
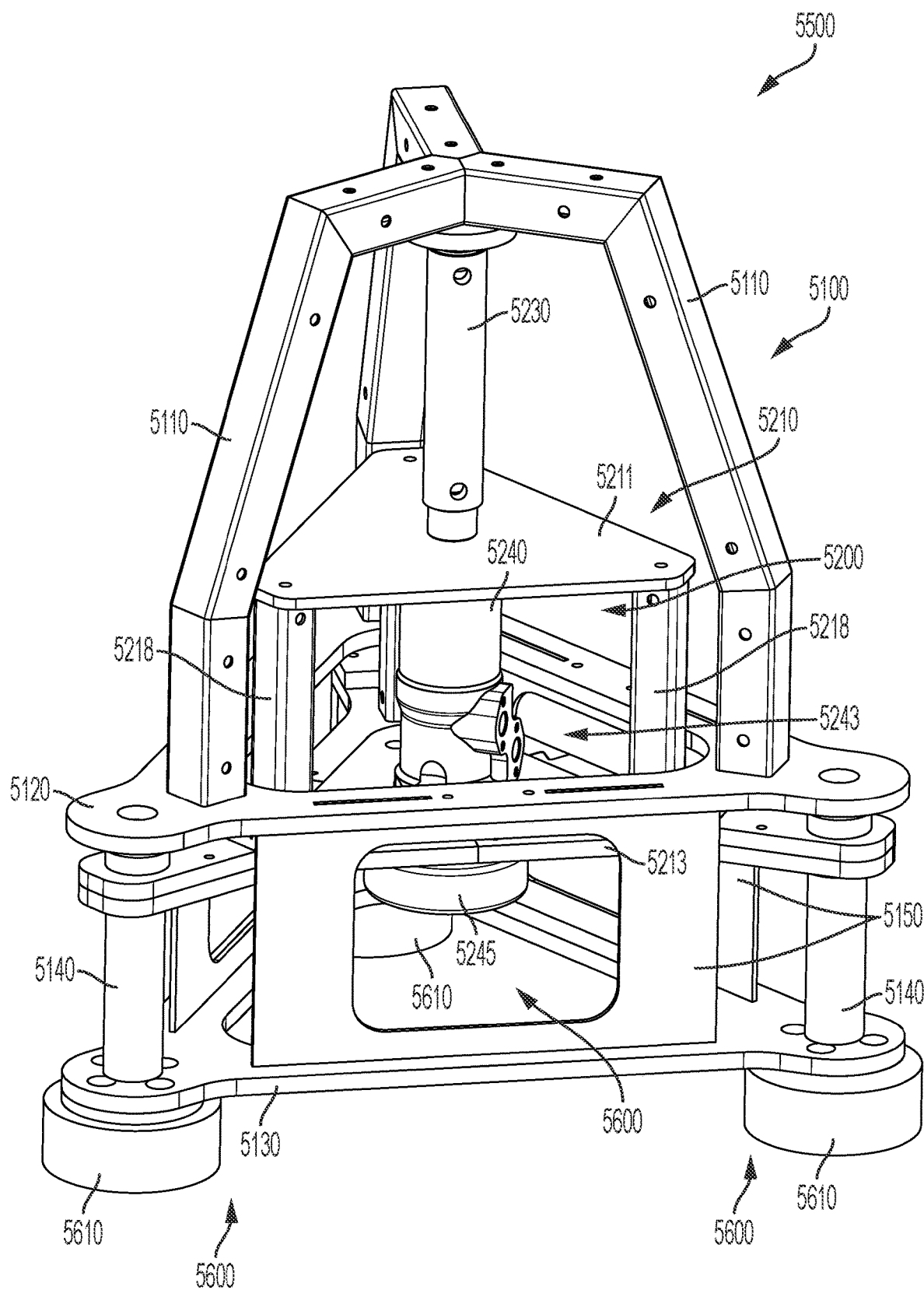
FIG. 60 is perspective view of a drill assembly comprising a frame, a drilling system, and mounting elements, wherein each mounting element comprises a single magnet, according to at least one aspect of the present disclosure.

FIG. 59 depicts the drill assembly 5000 with a bit, or tap, assembly 5400 engaged with the drilling system 5200. The bit assembly 5400 is shown in the chuck 5245 of the bit drive 5240. FIG. 59 illustrates the drilling system 5200 in its retracted-most position. This position prevents the installed bit assembly 5400 from contacting any part of the ship skin during transportation of the drill assembly 5000 and/or mounting of the drill assembly 5000 to the ship skin. In at least one instance, the retracted-most position of the drilling system 5200 positions the bit of the installed bit assembly 5400 above the lower bracket 5130. This position can provide adequate clearance for the bit to protect the bit from being engaged by the ship skin or any undesired debris before the drilling process is initiated.

FIGS. 60-64 depict a drill assembly 5500. The drill assembly 5500 is similar to the drill assembly 5000 except for the differences noted below. The drill assembly 5500 comprises mounting elements 5600 each comprising a single magnet 5610 attached to the lower bracket 5130 of the drill assembly 5500. The magnets 5610 comprise electromagnets, for example; however, any suitable type of magnet can be used. Each magnet 5610 is fixedly attached to the lower bracket 5130 such that no movement of the magnet 5610 is permitted by the fixed attachment of the magnets 5610 to the lower bracket 5130. In various aspects, the drill assembly 5500 employs ball-and-socket attachment mechanisms as described herein to attach the magnets 5610 to the lower bracket 5130 of the frame 5100.

Figure 61:
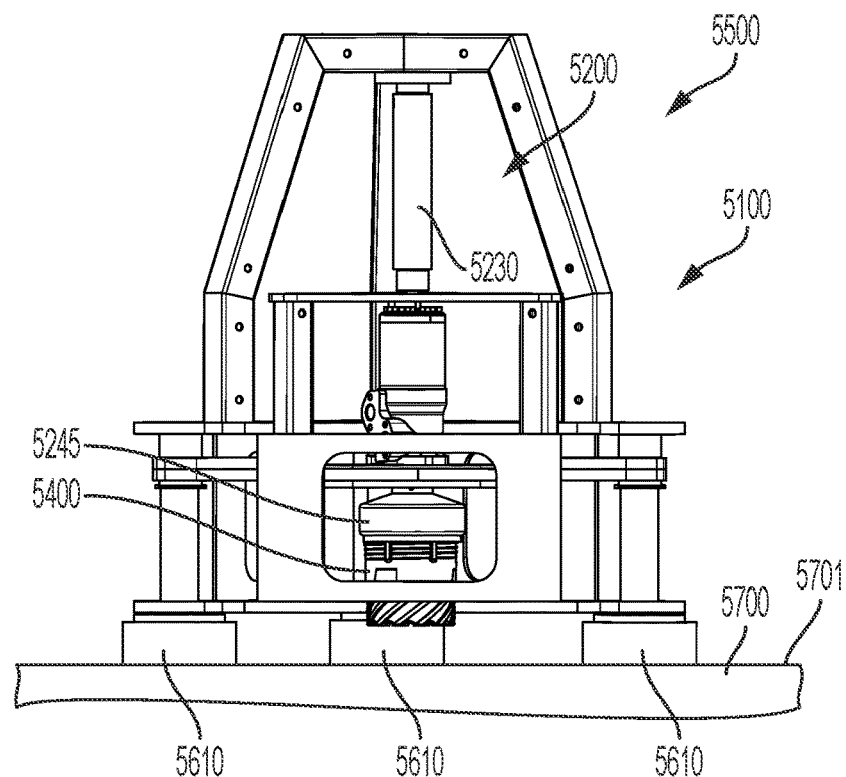
FIG. 61 is an elevational view of the drill assembly of FIG. 60 secured to a surface of a ship skin into which the drill assembly is configured to install a bit assembly, wherein the drilling system is in an unactuated position, according to at least one aspect of the present disclosure.

FIG. 61 depicts the drill assembly 5500 attached to a surface 5701 of a ship skin 5700. The magnets 5610 attract themselves to the surface 5701 to hold the drill assembly 5500 to the ship skin 5700 upon activation of the electromagnets 5610. As can be seen in FIG. 61, the drilling system 5200 is illustrated in its retracted-most position where the linear actuator 5230 is in its fully retracted position. When an operator is ready to drill the tap assembly 5400 into the ship skin 5700, the linear actuator 5230 is actuated to lower the bit drive 5240 and, thus, the bit assembly 5400 toward the ship skin 5700. By monitoring the pressure in the fluidic circuit of the linear actuator 5230, an operator can tell when the bit assembly 5400 comes into contact with the surface 5701 of the ship skin 5700. A camera, proximity sensors, and any suitable combination thereof can also be used to determine proximity of the bit assembly 5400 and the surface 5701 of the ship skin 5700 throughout the drilling process.

Figure 62:
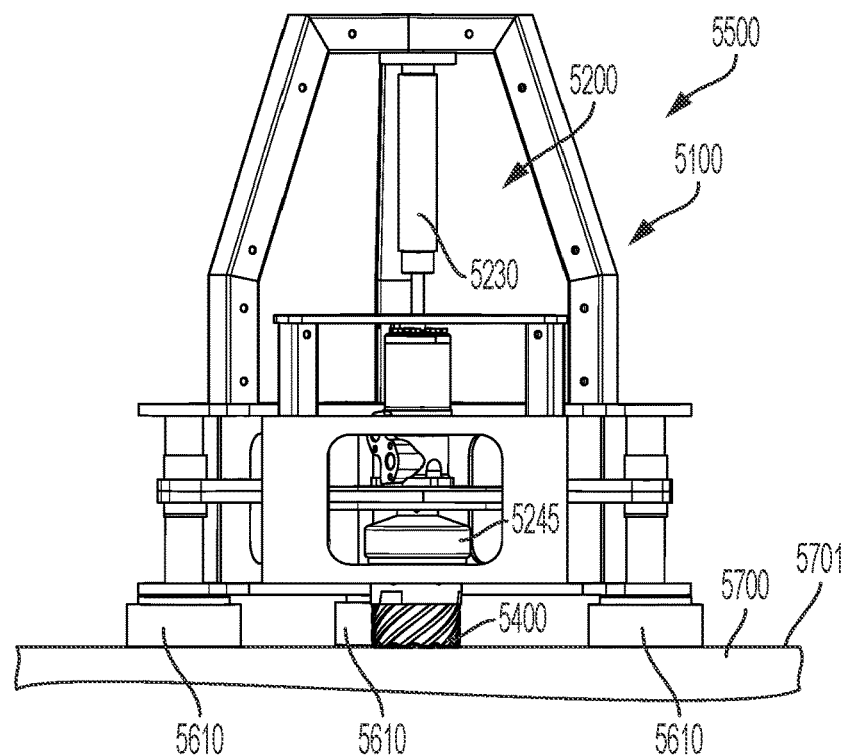
FIG. 62 is an elevational view of the drill assembly of FIG. 60, wherein the drilling system is in a first actuated position such that the bit assembly is in contact with the surface of the ship skin to which the drill assembly is secured, according to at least one aspect of the present disclosure.

FIG. 62 depicts the drill assembly 5500 in a position where the bit assembly 5400 is in contact with the surface 5701 of the ship skin 5700. At and/or before this point, the bit drive 5240 may be actuated to begin rotating the bit assembly 5400. When the bit assembly 5400 comes into contact with the surface 5701 of the ship skin 5700, the drill bit begins drilling a hole in the ship skin 5700. The linear actuator 5230 is lowered toward the ship skin 5700 until the hole is fully drilled and the bit assembly begins self-tapping a tap element, discussed in greater detail herein, into the ship skin 5700.

Figure 63:
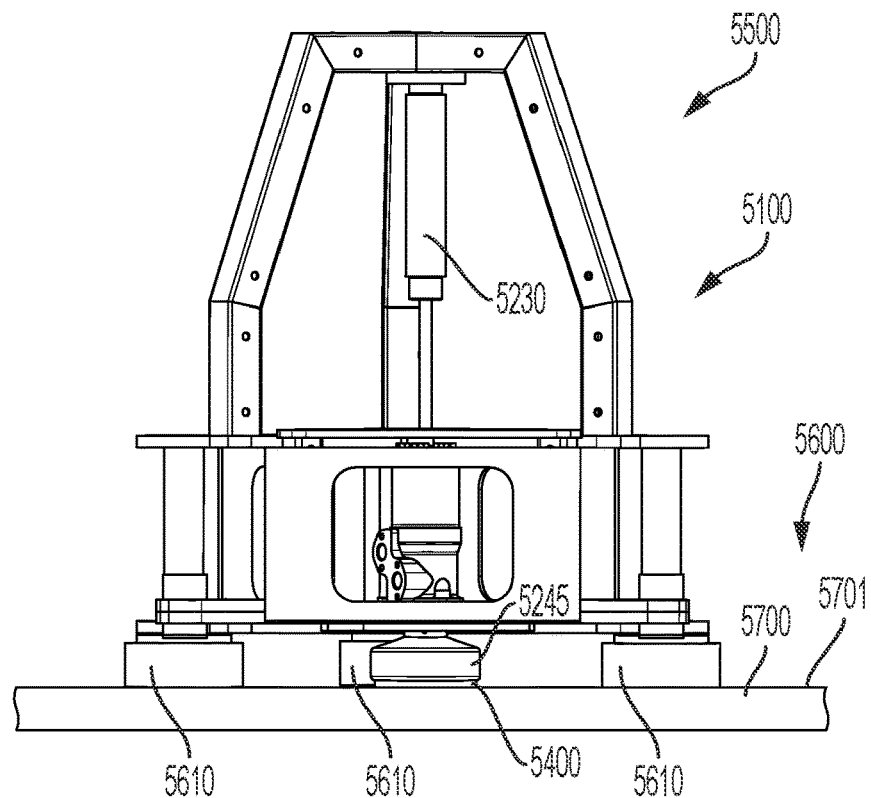
FIG. 63 is an elevational view of the drill assembly of FIG. 60, wherein the drilling system is in a fully actuated position such that the bit assembly is fully installed in the ship skin, according to at least one aspect of the present disclosure.
Figure 64:
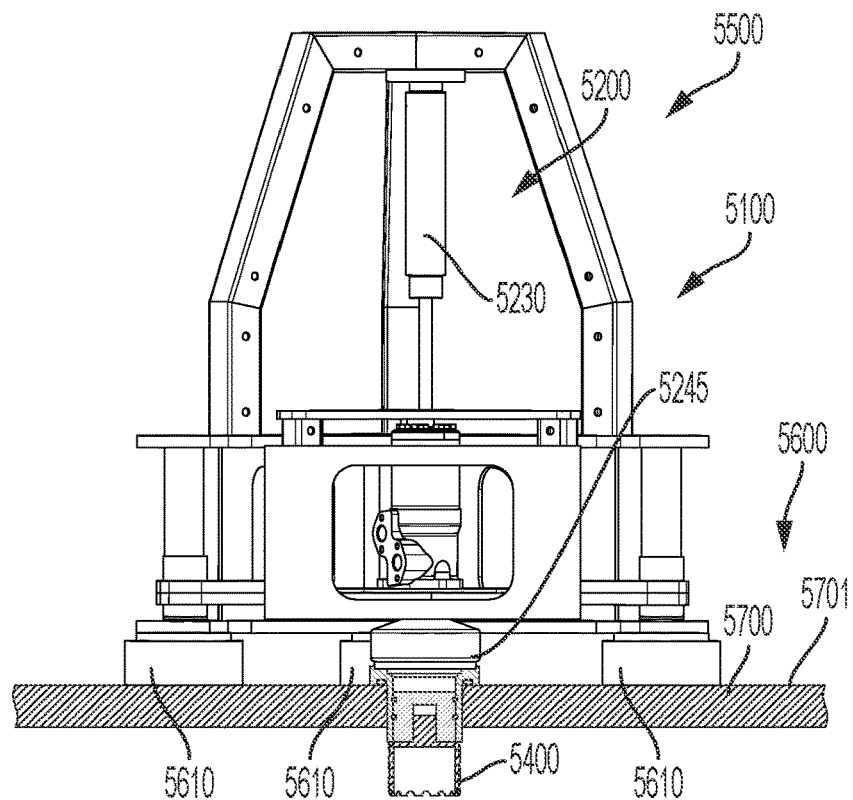
FIG. 64 is a partial cross-sectional and elevational view of the drill assembly of FIG. 60, wherein the drilling system is in a fully actuated position such that the bit assembly is fully installed in the ship skin, according to at least one aspect of the present disclosure.

FIGS. 63 and 64 depict the drilling system 5200 of the drill assembly 5500 in a fully actuated position such that the bit assembly 5400 has been driven into the ship skin 5700 and the tap element is fully installed in the ship skin 5701. At this point, the chuck 5245 may be loosened by a diver and/or an ROV so that the drill assembly 5500 may be lifted away from the drilling location and moved to another drilling location. In at least one instance, the chuck 5245 comprises a magnetic element positioned therein to vertically restrain and/or hold the bit assembly 5400 within the chuck 5245. In such an instance, the drill assembly 5500 may be lifted off of the installed bit assembly 5400 after the electromagnets 5610 are deactivated without interacting with the chuck 5245 and/or bit assembly 5400 directly. For example, an ROV and/or diver may lift the drilling assembly 5500 by its frame 5100 immediately after the bit assembly 5400 is installed and overcome a magnetic force holding the drill assembly 5500 to the ship skin 5700 through the chuck 5245 and the installed bit assembly 5400. In at least one instance, this holding force can be much more easily overcome than the holding force applied by the activated electromagnets 5610.

Figure 65:
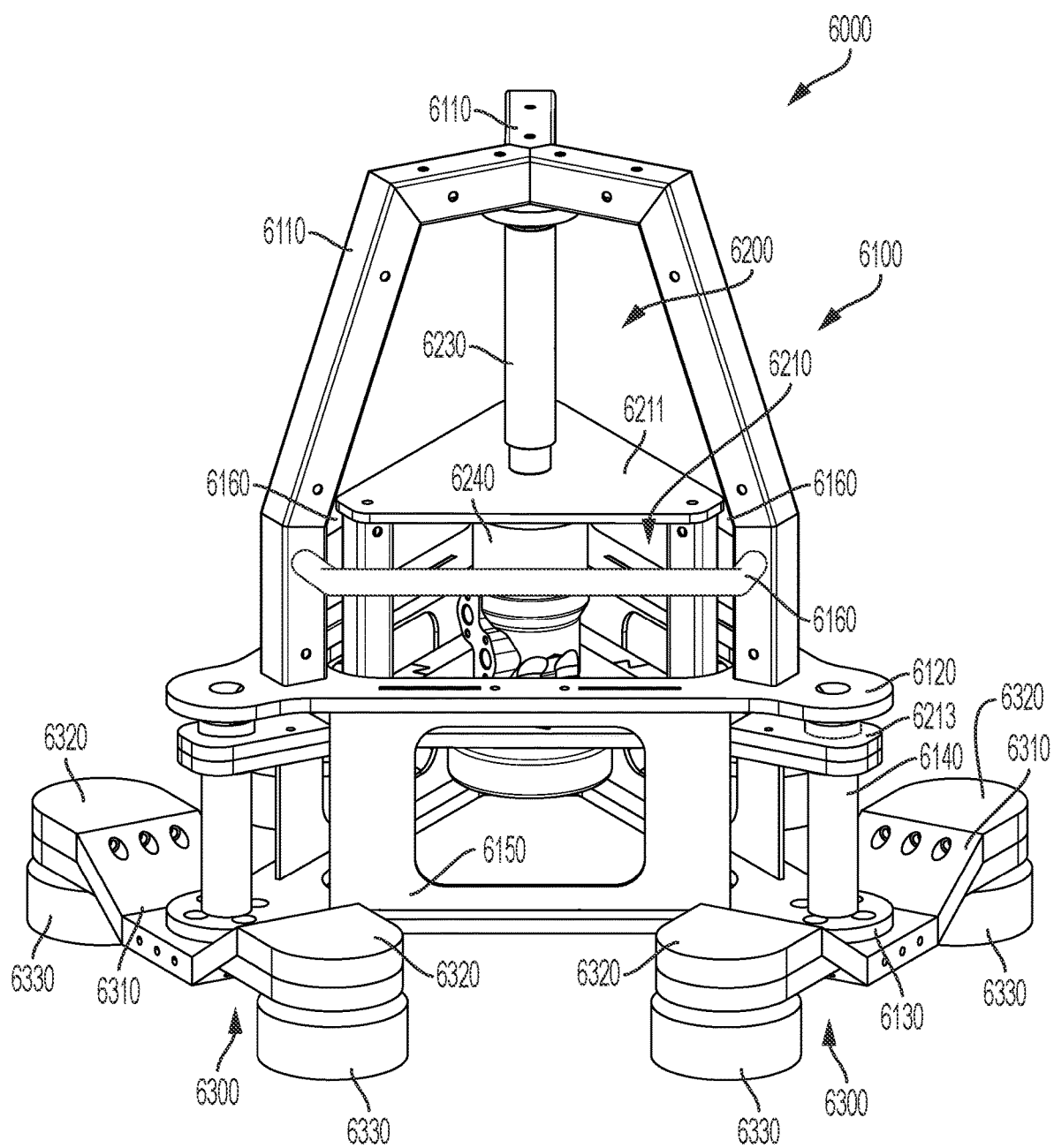
FIG. 65 is a perspective view of a drill assembly comprising a frame, a drilling system, and mounting elements, wherein each mounting element comprises two magnets, according to at least one aspect of the present disclosure.

FIG. 65 depicts a drill assembly 6000 comprising a frame 6100, a drilling system 6200 supported within the frame 6100, and mounting elements 6300 attached to the frame 6100 configured to permit securement of the drill assembly 6000 to a ship skin, for example. The drill assembly 6000 is configured to drill one or more self-tapping tap assemblies into the ship skin to create passageway(s) and allow fluid flow therethrough.

The drill assembly 6000 is similar to other drill assemblies disclosed herein in many respects, except for the differences noted below. The frame 6100 comprise a plurality of arms 6110, an upper bracket 6120, and a lower bracket 6130. The plurality of arms 5110 are attached to each other at one end defining the top of the drill assembly 6000. The plurality of arms 6110 extend downwardly from the top of the drill assembly 6000 and are attached to the upper bracket 6120. The frame 6100 further comprises posts 6140 extending between and attached to the upper bracket 6120 and the lower bracket 6130. The frame 6100 further comprises brace plates 6150 positioned between the posts 6140 and attached to the upper bracket 6120 and the lower bracket 6130. The brace plates 6150 can provide structural support to the frame 6100, as well as act as a protective barrier to the drilling system 6200. The frame 6100 further comprises cross brace elements 6160 extending horizontally between and attached to the arms 6110. The cross brace elements 6160 can further protect the drilling system 6200 as well as provide additional structural support to the frame 6100.

Each mounting element 6300 is attached to the underside of the lower bracket 6130 and is configured to secure the drill assembly 6000 to the ship skin. Each mounting element 6300 comprises a body portion 6310 attached to the lower bracket 6130, a plurality of arms 6320 extending from the body portion 6310, and a magnet 6330 attached to each arm 6320. The magnets 6330 comprise electromagnets; however, any suitable type of magnet may be employed.

Still referring to FIG. 65, the drilling system 6200 is supported within the frame 6100 and comprises a linear actuator 6230, a sub-frame 6210, and a bit drive, or drill, 6240 attached to the sub-frame 6210. The linear actuator 6230 is fixed to the top of the drill assembly by way of a mounting bracket, or plate, and can comprise a hydraulic cylinder, for example; however, any suitable linear actuator may be used. The rod of the linear actuator 6230 is attached to an upper plate 6211 of the sub-frame 6210 such that the linear actuator 6230 moves the sub-frame 6210 and, thus, the bit drive 6240 vertically relative to the frame 6100 of the drill assembly 6000. The sub-frame 5210 further comprises a lower plate 6213 to which the bit drive 6240 is mounted. The lower plate 6213 of the sub-frame comprises outer portions each comprising a slide bearing positioned therein. The lower plate 6213 is supported by the frame 6100 by the posts 6140 such that the slide bearings receive the posts 6140 allowing the entire sub-frame 6210 to be slid vertically relative to the frame 6100 as the linear actuator 6230 is actuated. Movement of the sub-frame 6210 allows the bit drive 6240 to be advanced toward, into, and away from the ship skin to drill a hole and install a tap assembly into the ship skin.

Figure 66:
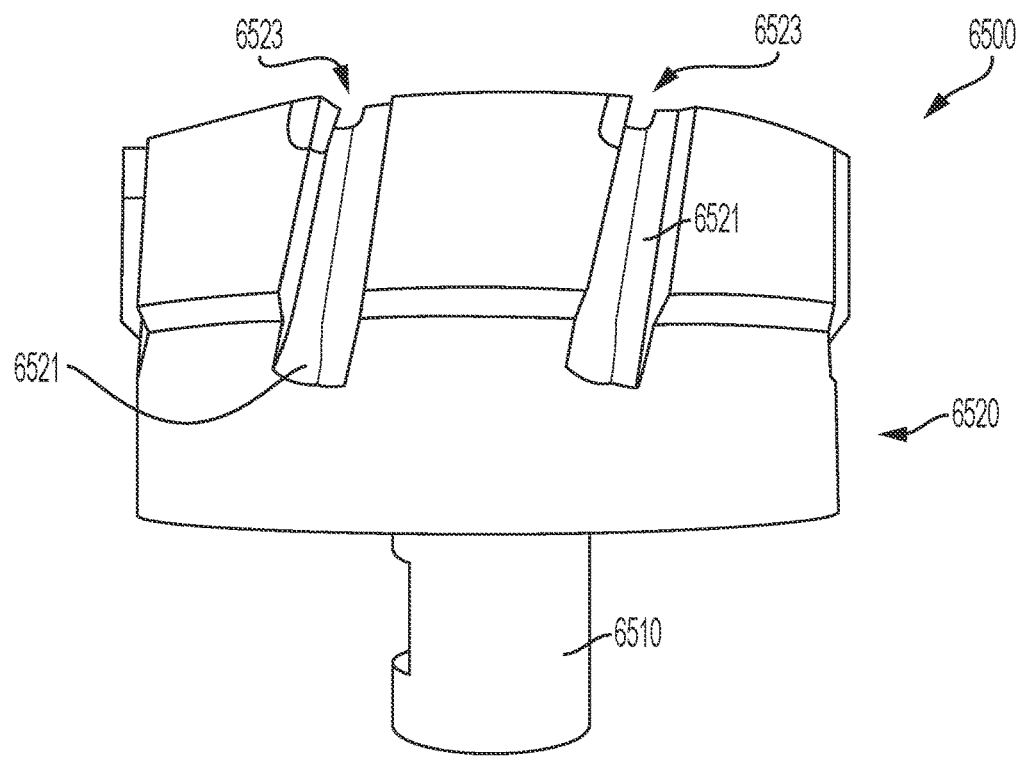
FIG. 66 is a perspective view of a drill bit configured to be used with a bit assembly, according to at least one aspect of the present disclosure.

FIG. 66 depicts a bit, or annular cutter, 6500 configured to be used with the drill assemblies described herein. The bit 6500 comprises a shank 6510 and a body portion 6520 extending from the shank 6510. The body portion 6520 comprises a plurality of flutes 6521 configured to eject the debris during the drilling of the hole. The body portion 6520 further comprises cutting teeth 6523 comprising chip breaking features configured to reduce the size of the shavings that result from drilling a hole.

Figure 67:
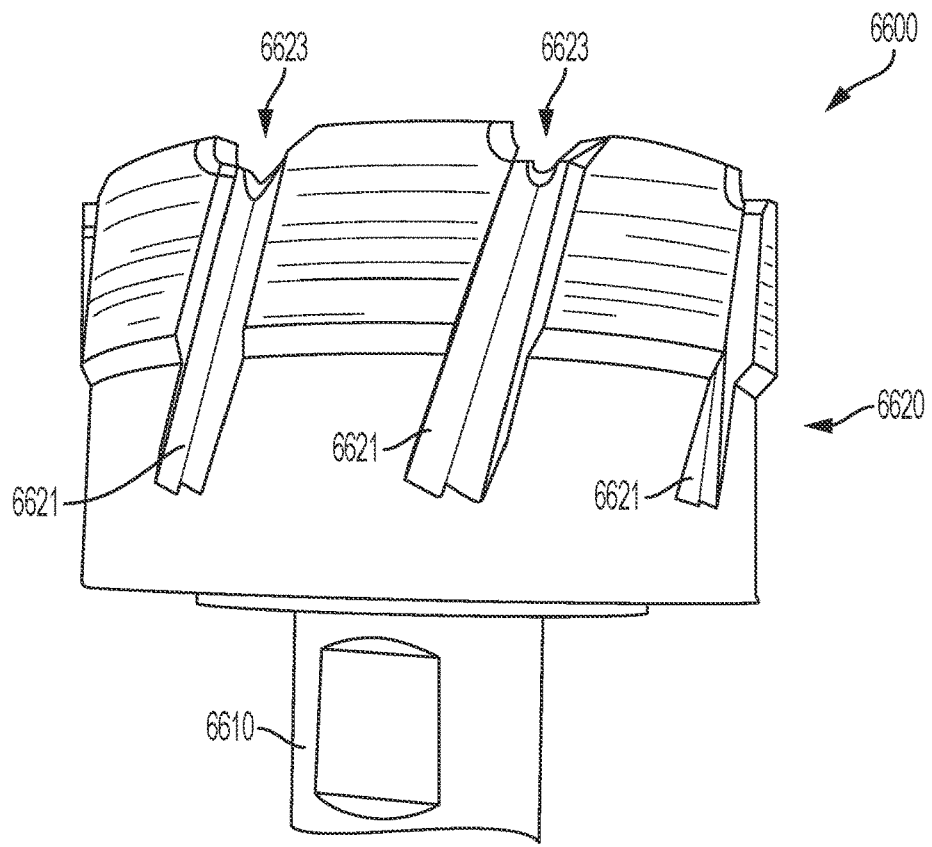
FIG. 67 is a perspective view of a drill bit configured to be used with a bit assembly, according to at least one aspect of the present disclosure.

FIG. 67 depicts a bit, or annular cutter, 6600 configured to be used with the drill assemblies described herein. The bit 6600 comprises a shank 6610 and a body portion 6620 extending from the shank 6610. The body portion 6620 comprises a plurality of flutes 6621 configured to eject the debris during the drilling of the hole. The body portion 6620 further comprises cutting teeth 6623 comprising chip breaking features configured to reduce the size of the shavings that result from drilling a hole. Long shavings can become entangled and possibly hinder the drilling process. Thus, it may be advantageous to reduce the size of the shavings by using chip breaking features to consistently break the shavings as the hole is drilled. These bits may also be referred to as annular cutters, core cutters, and/or hole saws, for example.

Figure 68:
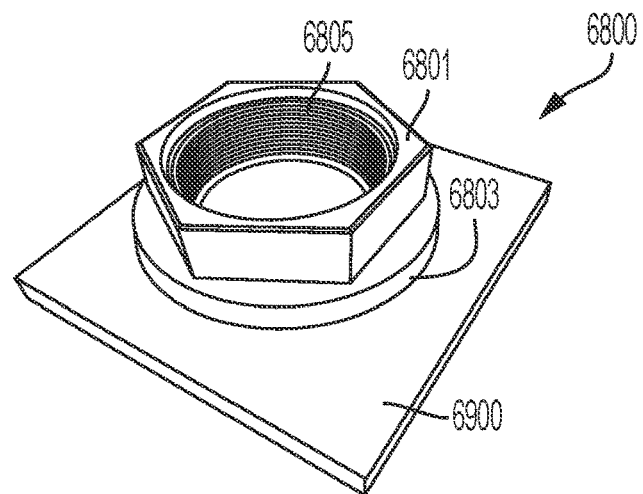
FIG. 68 is a perspective view of a tap installed in a ship skin, wherein the tap comprises internal threads, according to at least one aspect of the present disclosure.
Figure 69:
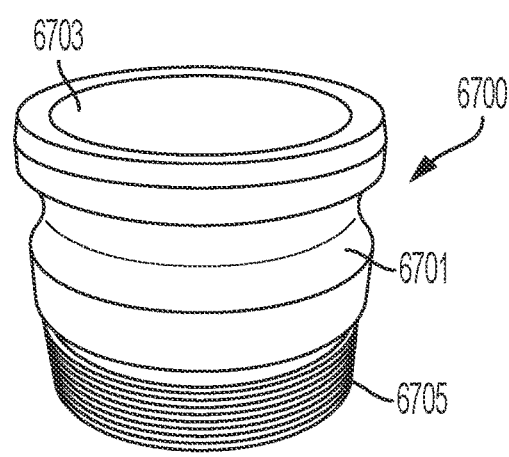
FIG. 69 is a perspective view of an adapter configured to be threaded into the tap of FIG. 68, wherein the adapter comprises an annular locking channel formed therein, according to at least one aspect of the present disclosure.
Figure 70:
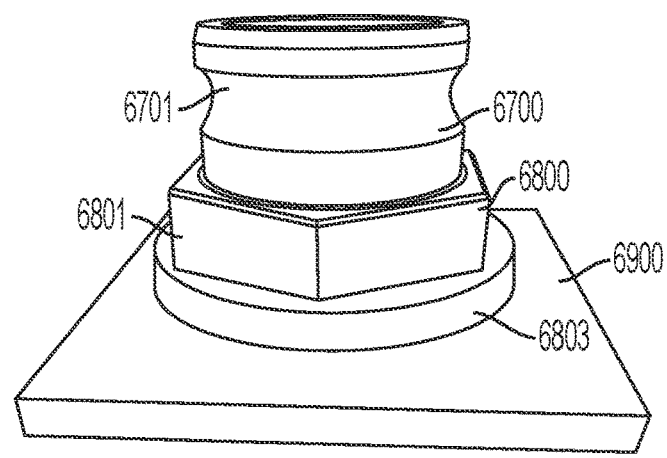
FIG. 70 is a perspective view of the adapter of FIG. 69 installed in the tap of FIG. 68, according to at least one aspect of the present disclosure.

FIG. 68 depicts a tap element 6800 installed in a ship skin 6900. The tap element 6800 comprises a driving head portion 6801 configured to be driven by the chuck of a drill. The driving head portion 6801 comprises a hexagonal shape; however, any suitable shape is envisioned. The tap element 6800 further comprises a flange portion 6803 positioned below the driving head portion 6801 which is configured to abut the surface of the ship skin 6900. The tap element 6800 further comprises threads 6805 formed inside of the tap element 6800 which are configured to threadably receive an adapter 6700 shown in FIG. 69. Once the tap element 6800 is installed in the ship skin 6900 and the drill assembly of which installed the tap element 6800 is removed from the drilling location, the adapter 6700 is screwed into the tap element 6800. The adapter 6700 comprises an annular ridge 6701 formed therein and a threaded base portion 6705. The threaded base portion 6705 is configured to be threadably engaged with the threads 6805 of the tap element 6800. Once the adapter 6700 is fully installed in the tap element 6800, a hose connection assembly, as discussed in greater detail herein, can be attached to the adapter element 6700 by way of the annular ridge 6701 such that cam lock levers can latch onto the annular ridge 6701. Once the adapter 6700 is attached to a hose and/or hose connection assembly, for example, fluid may flow through the cylindrical passageway 6703 defined by the adapter element 6700. In at least one instance, an adapter is not necessary. In such an instance, the tap assembly that is attached to the drill chuck contains an annular ridge as a part of the assembly that is drilled by the drill assembly and that is configured to engage corresponding cam lock levers of a hose connection assembly. The adapter 6700 and/or tap element 6800 may further comprise seal rings, for example, to prevent fluid flowing through the installed configuration of the adapter 6700 and tap element 6800 (FIG. 70) from leaking.

FIGS. 71-78 depict a hose connection assembly 7000 configured to be attached to a tap element or, in certain instances, an adapter to provide a mechanism for punching the sealing plug of the tap element out of the tap element, safely extracting fluid through the tap element without exposing the fluid to the surrounding medium, and sealing the tap element after the fluid is extracted through the tap element. The hose connection assembly 7000 can be used with the bit assemblies, tap assemblies, and/or drill assemblies described herein.

The hose connection assembly 7000 comprises a plunger 7100 and a body portion 7200. The body portion 7200 comprises an attachment portion 7220 and a cam lock mechanism 7201 such as cam lock arms, for example, to latch the body portion 7200 onto the adapter 6700 once the attachment portion 7220 is positioned over the adapter 6700. Once the hose connection assembly 7000 is attached to the adapter 6700, the tap element 6800, a plug 6810 and a cutter, or bit, 6820 of the tap element 6800 (FIG. 73) can be punched out through the tap element 6800 by the hose connection assembly 7000. Punching the plug 6810 and the cutter 6820 out of the tap element 6800 and into the haul of the ship allows for fluid to flow through the hose connection assembly 7000. The fluid is configured to be extracted through a side channel 7230 of the body portion 7200. To prevent the plunger 7100 from being actuated prematurely, the hose connection assembly 7000 comprises a safety pin 7120 which is engaged with the plunger 7100 to prevent vertical movement of the plunger 7100 when the plunger 7100 is in its retracted most position. This safety pin 7120 can also act as a mechanical device that ensures a pause in the operation of the plunger 7100 anytime the plunger 7100 is retracted to its unactuated most position.

To punch the plug 6810 and the cutter 6820 out of the tap element 6800, the plunger 7100 comprises an actuation shaft 7110 comprising a handle 7111 attached to the top of the shaft 7110 and a pusher element 7240 configured to be actuated up and down within a vertical chamber 7210 of the body portion 7200 by the plunger 7100. The hose connection assembly 7000 further comprises a magnet assembly 7250 positioned within the body portion 7200 of the hose connection assembly 7000 which comprises a housing element 7251 attached to a lower end 7115 of the actuation shaft 7110 and a magnet 7252 positioned within the housing element 7251 such that the magnet 7252 can be moved up and down as the plunger 7100 is moved up and down. The magnet may be held within the housing element 7251 using any suitable attachment means such as an adhesive, screws, bolts, and/or any other suitable attachment means. In other aspects, the magnet 7252 is fixed directly to the lower end 7115 of the actuation shaft 7110. In at least one instance, the magnet 7252 comprises a rare earth magnet; however, any suitable type of magnet can be employed. Discussed in greater detail herein, the magnet 7252 is configured to allow the pusher element 7240 to be deployed into the tap element 6800 and separated from the plunger 7100 after the extraction process.

The magnet 7252 holds the pusher element 7240 to the plunger 7100 by way of a holder plate 7253 which is screwed to the pusher element 7240 with a screw 7254. The screw 7254 is threadably received by threads 7242 defined in a top portion 7241 of the pusher element 7240. The magnetic holding force supplied by the magnet 7252 must be overcome to separate the plunger 7100 and the pusher element 7240. The hose connection assembly 7000 further comprises a seal 7255 at least partially surrounding the top portion 7241 of the pusher element 7240. The seal 7255 is configured to permit the permanent deployment of the pusher element 7240 into the tap element 6800.

Figure 73:
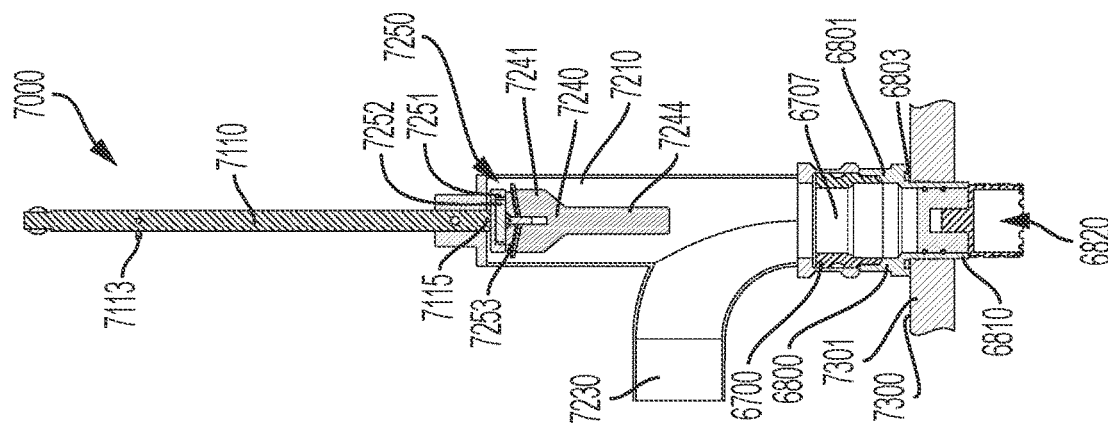
FIG. 73 is a cross-sectional elevation view of the hose connection assembly and the tap assembly of FIG. 71, wherein the tap assembly is installed in a ship skin, the hose connection assembly is connected to the tap assembly, and the hose connection assembly is in the unactuated configuration, according to at least one aspect of the present disclosure.

FIG. 73 depicts the hose connection assembly 7000 attached to the tap element 6800 which is installed in and positioned against a surface 7301 of a ship skin 7300. As described herein, the hose connection assembly 7000 is connected to the tap element 6800 by way of the adapter 6700 which is threadably received within the tap element 6800. The cam lock mechanism 7201 latches the hose connection assembly 7000 onto the adapter 6700. At this stage, a hose or extraction line may be connected to the side channel 7230. Once a hose or extraction line is connected to the side channel 7230, the plug 6810 and the bit 6820 are ready to be punched out of the tap element 6800. Before the plunger 7100 is actuated, the safety pin 7120 must be removed to disengage the safety pin 7120 from the actuation shaft 7110 such that the plunger 7100 can move relative to the body portion 7200. Once the safety pin 7120 is removed and a hose or extraction line is coupled to the side channel 7230, the plunger 7100 is pushed downwardly to the position illustrated in FIG. 74 until a pin 7113 positioned within the actuation shaft 7110 prevents further actuation of the plunger 7100. For example, the pin 7113 is positioned to contact the body portion 7200 of the hose connection assembly 7000. In reaching the position illustrated in FIG. 74, a bottom shank portion 7244 of the pusher element 7240 ejects the plug 6810 and the bit 6820 from the tap element 6800. Once the plug 6810 and the bit 6820 are ejected from the tap element 6800, fluid is ready to flow through the tap element 6800.

Figure 75:
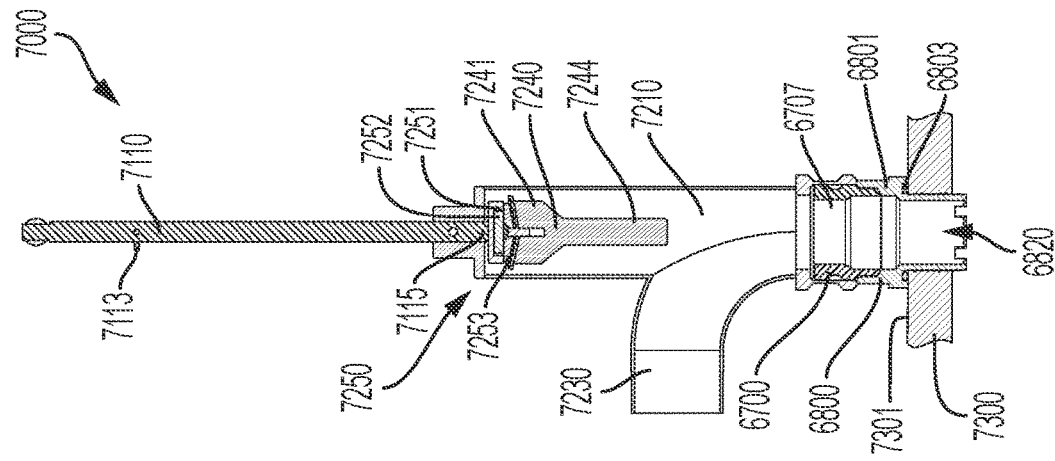
FIG. 75 is a cross-sectional elevation view of the hose connection assembly and the tap assembly of FIG. 73, wherein the hose connection assembly is illustrated in the unactuated configuration and fluid can be extracted through the hose connection assembly, according to at least one aspect of the present disclosure.
Figure 74:
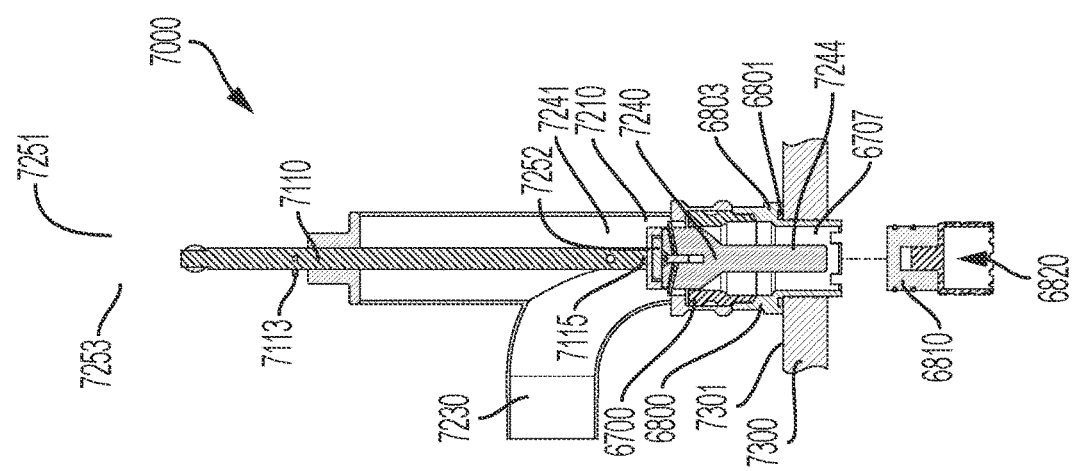
FIG. 74 is a cross-sectional elevation view of the hose connection assembly and the tap assembly of FIG. 73, wherein the hose connection assembly is illustrated in a first actuated configuration and a plug and bit of the tap assembly are punched out of the tap assembly, according to at least one aspect of the present disclosure.

To extract fluid through the hose connection assembly 7000, the plunger 7100 is pulled into its unactuated position (FIG. 75). Once the plunger 7100 is pulled to its retracted-most, or unactuated, position, fluid can now flow through the tap element 6800. During an extraction process, fluid is sucked out through the side channel 7230 of the hose connection assembly 7000 using a pump and/or vacuum and/or any other suitable extraction means. In at least one instance, the hose connection assembly 7000 permits fluid to be injected into a ship haul. Once the fluid extraction and/or injection process is complete, the pusher element 7240 is deployed into sealing engagement with the tap element 6800 to seal the tap element 6800 so that fluid does not flow through the tap element 6800 after the hose connection assembly 7000 is decoupled from the adapter 6700.

Figure 76:
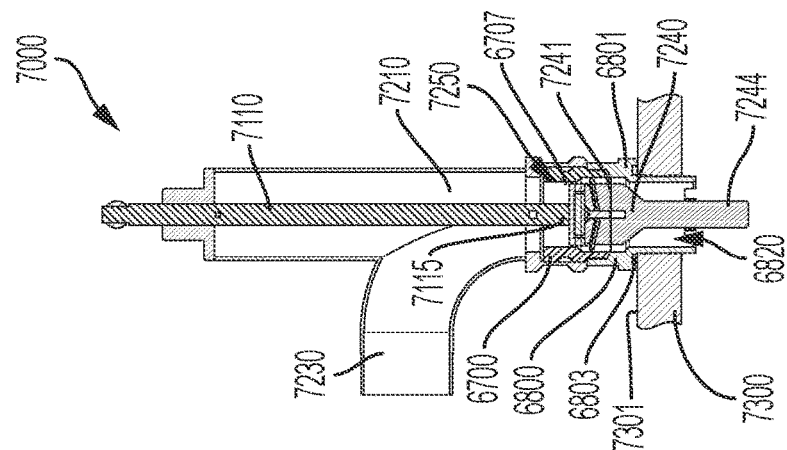
FIG. 76 is a cross-sectional elevation view of the hose connection assembly and the tap assembly of FIG. 73, wherein the hose connection assembly is illustrated in a second actuated configuration in which a seal of the hose connection assembly is deployed into the tap assembly to prevent fluid from flowing through the tap assembly, according to at least one aspect of the present disclosure.

FIG. 76 illustrates the pusher element 7240 deployed to a sealing position. To reach this position, the pin 7113 of the plunger 7100 must be removed to allow complete advancement of the plunger 7100. Once the pin 7113 is removed, the plunger 7100 can be pushed into the position illustrated in FIG. 76. Upon reaching this position, the seal 7255 and the top portion 7241 of the pusher element 7240 are positioned within an annular ring 6707 defined in the adapter 6700. The annular ring 6707 comprises a diameter which is greater than a main diameter of the adapter 6700 and the tap element 6800. This variation in diameter permits the seal 7255 to expand within the annular ring 6707 once the seal 7255 reaches the annular ring 6707. Expansion of the seal 7255 causes the seal to hold the pusher element 7240 within the adapter 6700 and seal the adapter 6700 to prevent further fluid flow through the tap element 6800 and the adapter 6700. Once the plunger 7100 deploys the pusher element 7240 into the position shown in FIG. 76, the plunger 7100 is retracted at which point the holding force provided by the engagement of the seal 7255 and the annular ring 6707 of the adapter 6700 overcomes the magnetic holding force supplied by the magnet 7252.

Figure 78:
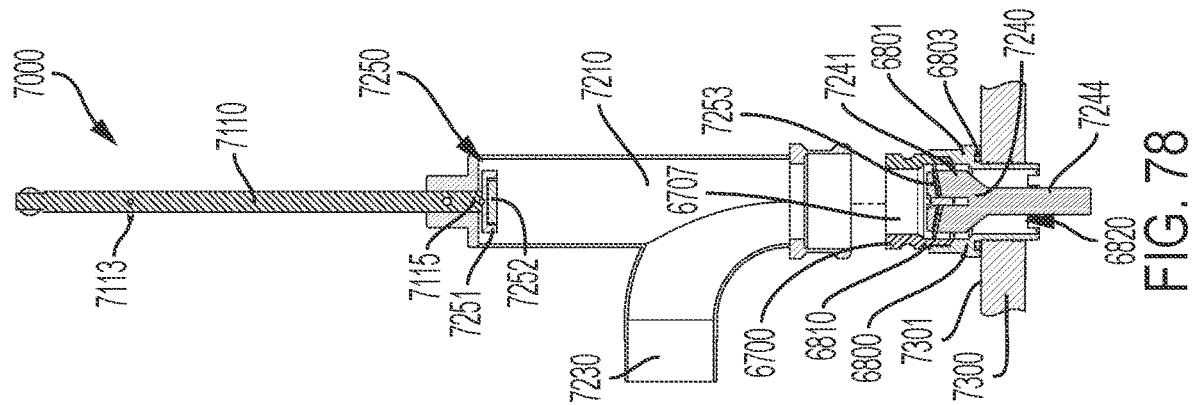
Figure 77:
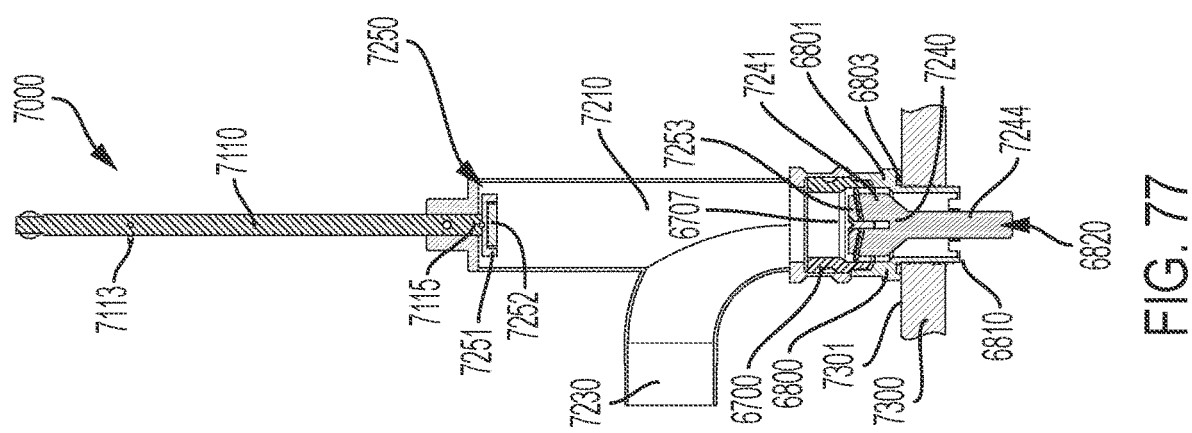
FIG. 77 is a cross-sectional elevation view of the hose connection assembly and the tap assembly of FIG. 73, wherein the hose connection assembly is illustrated in the unactuated configuration and the seal of the hose connection assembly is deployed into the tap assembly, according to at least one aspect of the present disclosure.

When the magnetic holding force supplied by the magnet 7252 is overcome, the magnet 7252 and the holder plate 7253 separate allowing the pusher element 7240 to remain in its final sealing position illustrated in FIGS. 76-78. Once the plunger 7100 is retracted away from the pusher element 7240 (FIG. 77), the hose connection assembly 7000 can be decoupled from the adapter 6700 thereby permitting removal of the hose connection assembly 7000 from the tap element 6800. At this stage, the adapter 6700, the tap element 6800, and the pusher element 7240 remain in the ship skin 7300 to seal the tap element 6800. After the hose connection assembly 7000 is removed from the adapter 6700 and the tap element 6800, a new pusher element and plate can be installed in the hose connection assembly 7000 to permit reuse of the hose connection assembly 7000.

FIGS. 79A and 79B depicts a fluid-interface detection device 7500 configured to detect the interface of different fluids by detecting the different electrical conductivities of each fluid. The detection device 7500 comprises an upper portion 7510 where cables can be connected and the device 7500 may be held by a diver and/or an ROV. The upper portion 7510 also includes a retaining pin 7515, a magnetic ring 7520, measuring rods 7530, and a disposable end tip 7540. The disposable end tip 7540 is configured to prevent the measuring rods 7530 from being exposed to fluid until the measuring process is initiated. The detection device 7500 is inserted through a tap element, such as the tap element 6800, to position the measuring rods 7530 inside the ship haul. Once the detection device 7500 is lowered into the ship's haul to a suitable location, such as to a point where it cannot be lowered any further, for example, the retaining pin 7515 is pulled to release the disposable end tip 7540 from the detection device 7500 to expose the measuring rods 7530. The measuring rods 7530 are connected to an electrical circuit which uses the fluid in contact with the rods 7530 to complete the electrical circuit. Because fluids will have different electrical conductivity, the resistance of the circuit can be monitored to determine when the measuring rods 7530 are in contact with different fluids.

Once the disposable end tip 7540 is released from the detection device 7500 and the electrical conductivity of the fluid in contact with the measuring rods 7530 can be measured, the detection device 7500 is gradually/incrementally pulled out of the tap element. During the removal of the detection device 7500, the distance traveled by the detection device 7500 is monitored using a reed chain, for example, and the electrical conductivity of the fluid in contact with the measuring rods 7530 is also monitored. This allows the detection device 7500 to measure, for example, the depth of one or more layers of fluid in the ship haul. For example, oil to be extracted from the ship haul may rest on top of sea water positioned below the oil because of the different densities of sea water and oil. In such an instance, water may first be detected by the detection device 7500 based on its electrical conductivity. As long as water is being detected by the measuring rods 7530 as the device is pulled upwardly out of the tap element, the distance traveled by the device can tell an operator the depth of the water. For example, the water may be detected for a distance of 5 meters from the bottom at which point the electrical conductivity may change to an electrical conductivity indicative of oil. As the detection device 7500 is pulled completely out of the tap element, the distance traveled while the measuring rods 7530 detect oil can be used to determine how much oil there is in the ship haul at that location.

Several locations can be measured using the detection device 7500 to determine the overall landscape of the fluids in the ship haul. For example, many sunken ships do not sink to where the ship haul is at the same elevation at every location of the ship wreck. In such an instance, if the ship haul has oil in it, for example, the oil may float toward the side of the ship that is at a greater elevation compared to other side of the ship. Using multiple measuring points can help determine where the oil is in the ship haul. At a point where the elevation is higher may be completely filled with oil. Another point with a lower elevation may comprise of more water than oil. Another point with the lowest elevation may comprise only of water. Thus, measuring the fluids at multiple locations within the ship haul can help better determine the overall content of the ship haul throughout the entire volume of the ship haul.

FIGS. 80-83 depict a transport hub 8000 configured to transport a drill assembly 8500 from a carrier vessel to a drilling site. The transport hub 8000 is also configured to control the transmission of fluid flow, electrical signals, and data signals between above-sea components and the drill assembly 8500. The transport hub 8000 is similar in many respects to the transport hub 4210 described herein. The transport hub 8000 comprises a collapsible carrier frame 8100, a drill assembly cage 8200 attached to the collapsible carrier frame 8100, and an isolated cavity 8300 configured to house a valve box and an electrical pod. The drill assembly cage 8200 is configured to protect the drill assembly 8500 during the transportation of the transport hub 8000.

FIG. 80 illustrates the transport hub 8000 in its fully erect configuration. In this configuration, the transport hub 8000 is configured to be lowered to its operational position at the drilling site by a crane, for example, positioned on the operation vessel. The operational position may be a location on the seabed floor next to the drilling location, for example. The collapsible carrier frame 8100 comprises foldable arms 8130 and non-foldable arms 8120 attached to a crossbar 8110 and the drill assembly cage 8200. The foldable arms 8130 are prevented from folding during transportation of the transport hub 8000 by using a sleeve 8131 positioned over each joint of the foldable arms 8130. In at least one instance, the sleeves 8131 are pinned to the foldable arms 8130 so that the sleeves 8131 do not move during transportation of the transport hub 8000. Once the transport hub 8000 is in its operational position, the foldable arms 8130 may be collapsed by sliding the sleeves 8131 away from the joints of the foldable arms 8130 so that the transport hub 8000 assumes the collapsed configuration illustrated in FIG. 81.

As can be seen in FIG. 81, the collapsible carrier frame 8100 is in its collapsed configuration exposing the top of the drill assembly 8500. When the collapsible carrier frame 8100 is in its collapsed configuration, the drill assembly 8500 can be lifted out of the cage 8200 of the transport hub 8000 (FIG. 82) by a diver and/or an ROV, for example. At this stage, the drill assembly 8500 can be delivered to the drilling location by the diver and/or the ROV. As discussed herein, the drill assembly 8500 may be tethered to the transport hub to transmit the hydraulic fluids, electrical signals, and/or data signals, for example, between the drill assembly 8500 and the transport hub 8000. In other aspects, transmission lines are connected to the drill assembly 8500 after the drill assembly 8500 is positioned at the drilling location.

The transport hub 8000 further comprises a loading mechanism 8400 configured to reload the drilling assembly

8500 with a new tap element, bit, and/or adapter, each time the drill assembly 8500 is placed back inside of the transport hub 8000. For example, after the drill assembly 8500 is removed from the transport hub 8000, the loading mechanism 8400 can be reloaded with a new tap element, bit, and/or adapter, such as the adapter 6700 and the tap element 6800, as shown in FIG. 83. Once a new tap element, bit and/or adapter is placed in the loading mechanism 8400, the loading mechanism 8400 can be deployed into the cage 8200 to position the new tap element, bit, and/or adapter in a location where reinsertion of the drill assembly 8500 would position the chuck of the drill and the new tap element, bit, and/or adapter relative to each other such that the new tap element, bit, and/or adapter can be fixed to the drill assembly 8500. After a new tap element, bit, and/or adapter is fixed to the drill assembly 8500, the drill assembly 8500 may be removed from the cage 8200 once again by a diver and/or an ROV, for example, and placed at a new drilling location.

In at least one instance, the transport hub 8000 can be configured to transport both an ROV and the drill assembly 8500. In such an instance, the ROV can be pre-attached to the drill assembly 8500 and positioned within the transport hub 8000. The pre-attachment can also include the attachment of all necessary electrical, data, and fluidic connections. After the transport hub 8000 is positioned on the seabed, for example, the ROV can immediately lift the drill assembly 8500 out of the cage 8200 because the ROV, in this instance, is pre-attached to the drill assembly 8500.

EXAMPLES

Example 1—A drill assembly comprising a frame comprising an attachment element configured to hold the drill assembly to a surface, a linear actuator system comprising a slide, a bit drive mounted to the slide, and a bit assembly configured to be driven by the bit drive. The bit assembly comprises an internal valve, a tap operably engaged with the bit drive, wherein the tap comprises self-tapping threads, a plug drivingly engaged with and removably positioned within the tap, wherein the plug is configured to be driven by the tap, and a drill bit attached to and configured to be driven by the plug, wherein the bit drive is configured to drill a hole in the surface with the drill bit and affix the tap to the surface by way of the self-tapping threads.

Example 2—The drill assembly of Example 1, wherein the attachment element comprises a magnet.

Example 3—The drill assembly of Example 2, wherein the magnet is an electromagnet.

Example 4—The drill assembly of Examples 2 or 3, wherein the magnet is a rare earth magnet.

Example 5—The drill assembly of any one of Examples 1-4, wherein the attachment element comprises a suction cup.

Example 6—The drill assembly of Example 5, wherein the suction cup comprises a vacuum port defined in the frame.

Example 7—The drill assembly of any one of Examples 1-6, wherein the attachment element and the frame are attached to each other by way of a ball and socket joint.

Example 8—The drill assembly of and one of Examples 1-7, wherein the linear actuator system comprises a hydraulic actuator.

Example 9—The drill assembly of any one of Examples 1-8, wherein the linear actuator system comprises a pneumatic actuator.

Example 10—The drill assembly of any one of Examples 1-9, wherein the bit drive comprises an electric motor.

Example 11—The drill assembly of any one of Examples 1-10, wherein the bit drive comprises a hydraulic motor.

Example 12—The drill assembly of Example 11, wherein the hydraulic motor comprises a pressure relief valve configured to limit torque provided by the hydraulic motor.

Example 13—The drill assembly of any one of Examples 1-12, wherein the linear actuator system comprises a vertical frame portion configured to guide the slide, and wherein the slide comprises PTFE plates configured to reduce friction experienced between the slide and the vertical frame portion.

Example 14—The drill assembly any one of Examples 1-13, wherein the linear actuator system comprises a vertical frame portion, wherein the vertical frame portion comprises a rod supported thereby, and wherein the rod is configured to guide the slide.

Example 15—The drill assembly any one of Examples 1-14, wherein the linear actuator system comprises a fluidic piston actuator, and wherein the fluidic piston actuator comprises a pressure release valve configured to reduce pressure applied by the fluidic piston actuator.

Example 16—The drill assembly any one of Examples 1-15, further comprising a release mechanism configured to detach the attachment element from the surface.

Example 17—The drill assembly of Example 16, wherein the release mechanism comprises a drive screw configured to push the attachment element away from the surface.

Example 18—The drill assembly of any one of Examples 1-17, wherein the internal valve comprises a ball valve.

Example 19—The drill assembly of any one of Examples 1-18, wherein the tap comprises a slot, wherein the plug comprises a driving tooth configured to be received within the slot, and wherein the driving tooth comprises a trapezoidal profile.

Example 20—The drill assembly any one of Examples 1-19, wherein the bit drive comprises an impact drill motor.

Example 21—The drill assembly of any one of Examples 1-20, wherein the bit drive comprises a rotary drill motor.

Example 22—The drill assembly of any one of Examples 1-21, wherein the linear actuator system comprises a rotary actuator comprising a pinion and a rack coupled to the slide and operably engaged with the pinon such that the rotary actuator can linearly actuate the rack causing linear actuation of the slide.

Example 23—The drill assembly of any one of Examples 1-22, wherein the plug comprises friction rings configured to prevent the plug from translating relative to the tap.

Example 24—The drill assembly any one of Examples 1-23, wherein the tap comprises a flange configured to abut the surface, wherein the flange comprises a surface-facing side, and an annular chamfered slot defined in the surface-facing side configured to provide a seal between the tap and the surface.

Example 25—The drill assembly any one of Examples 1-24, wherein the tap further comprises vertical relief slots intersecting the self-tapping threads.

Example 26—A drill assembly, comprising a frame comprising an attachment element configured to hold the drill assembly to a surface, a linear actuator system comprising a slide, a bit drive mounted to the slide, and a bit assembly configured to be driven by the bit drive. The bit assembly comprises a tap operably engaged with the bit drive, wherein the tap comprises self-tapping threads, a valve positioned in the tap, and a drill bit configured to be driven by the tap, wherein the bit drive is configured to drill a hole in the surface with the drill bit and affix the tap to the surface by way of the self-tapping threads.

Example 27—A drill assembly comprising a frame comprising an attachment element configured to hold the drill assembly to a surface, a linear actuator system comprising a slide, a bit drive mounted to the slide, and a bit assembly configured to be driven by the bit drive. The bit assembly comprises a tap operably engaged with the bit drive, wherein the tap comprises self-tapping threads and an inlet, a drill bit configured to be driven by the tap, wherein the drill bit comprises teeth, and wherein the bit drive is configured to drill a hole in the surface with the drill bit and affix the tap to the surface by way of the self-tapping threads, and a valve positioned intermediate the inlet and the teeth.

Example 28—A drill assembly comprising a frame comprising an attachment element configured to hold the drill assembly to a surface, a linear actuator system comprising a slide, a bit drive mounted to the slide, and a bit assembly configured to be driven by the bit drive. The bit assembly comprises a tap operably engaged with the bit drive, wherein the tap comprises self-tapping threads and an inlet, and a drill bit configured to be driven by the tap, wherein the drill bit comprises teeth, and wherein the bit drive is configured to drill a hole in the surface with the drill bit and affix the tap to the surface by way of the self-tapping threads.

Example 29—A drill assembly comprising a frame comprising an attachment element configured to hold the drill assembly to a surface, a linear actuator system comprising a slide, a bit drive mounted to the slide, and a bit assembly configured to be driven by the bit drive. The bit assembly comprises a tap operably engaged with the bit drive, wherein the tap comprises an engagement portion and an inlet, and a drill bit configured to be driven by the tap, wherein the drill bit comprises teeth, and wherein the bit drive is configured to drill a hole in the surface with the drill bit and affix the tap to the surface by way of the engagement portion.

Example 30—A drill assembly comprising a frame comprising an attachment element configured to hold the drill assembly to a surface, a linear actuator system comprising a slide, a bit drive mounted to the slide, and a bit assembly configured to be driven by the bit drive. The bit assembly comprises a tap operably engaged with the bit drive, wherein the tap comprises an engagement portion and an inlet, a drill bit configured to be driven by the tap, wherein the drill bit comprises teeth, and wherein the bit drive is configured to drill a hole in the surface with the drill bit and affix the tap to the surface by way of the engagement portion, and a valve positioned intermediate the inlet and the teeth.

Example 31—A drill assembly comprising a frame comprising an attachment element configured to hold the drill assembly to a surface, a linear actuator system comprising a slide, a bit drive mounted to the slide, and a bit assembly configured to be driven by the bit drive. The bit assembly comprises a tap operably engaged with the bit drive, wherein the tap comprises self-tapping threads and an inlet, and a drill bit configured to be driven by the tap, wherein the drill bit comprises teeth, and wherein the bit drive is configured to drill a hole in the surface with the drill bit and affix the tap to the surface by way of the self-tapping threads.

Example 32—A drill assembly comprising a frame comprising an attachment element configured to hold the drill assembly to a surface, wherein the attachment element is coupled to the frame by way of a ball and socket joint, a linear actuator system comprising a slide, a bit drive mounted to the slide, and a bit assembly configured to be driven by the bit drive. The bit assembly comprises a tap operably engaged with the bit drive, wherein the tap comprises self-tapping threads and an inlet, and a drill bit configured to be driven by the tap, wherein the drill bit comprises teeth, and wherein the bit drive is configured to drill a hole in the surface with the drill bit and affix the tap to the surface by way of the self-tapping threads.

Example 33—The drill assembly of Example 32, wherein the attachment element comprises a magnet.

Example 34—The drill assembly of Example 33, wherein the magnet is an electromagnet.

Example 35—The drill assembly of Examples 33 or 34, wherein the magnet is a rare earth magnet.

Example 36—The drill assembly of any one of Examples 32-34, wherein the attachment element comprises a suction cup.

Example 37—The drill assembly of Example 36, wherein the suction cup comprises a vacuum port defined in the frame.

Example 38—A drill assembly comprising a frame comprising an attachment element configured to hold the drill assembly to a surface, a fluidic actuator system comprising a slide, a bit drive mounted to the slide, and a bit assembly configured to be driven by the bit drive. The bit assembly comprises a tap operably engaged with the bit drive, wherein the tap comprises self-tapping threads and an inlet, and a drill bit configured to be driven by the tap, wherein the drill bit comprises teeth, and wherein the bit drive is configured to drill a hole in the surface with the drill bit and affix the tap to the surface by way of the self-tapping threads.

Example 39—The drill assembly of Example 38, wherein the fluidic actuator system comprises a hydraulic actuator.

Example 40—The drill assembly of Examples 38 or 39, wherein the fluidic actuator system comprises a pneumatic actuator.

Example 41—A drill assembly comprising a frame comprising an attachment element configured to hold the drill assembly to a surface, a linear actuator system comprising a slide, a rotary bit drive mounted to the slide, and a bit assembly configured to be driven by the rotary bit drive. The bit assembly comprises a tap operably engaged with the rotary bit drive, wherein the tap comprises self-tapping threads and an inlet, and a drill bit configured to be driven by the tap, wherein the drill bit comprises teeth, and wherein the rotary bit drive is configured to drill a hole in the surface with the drill bit and affix the tap to the surface by way of the self-tapping threads.

Example 42—The drill assembly of Example 41, wherein the rotary bit drive comprises an electric motor.

Example 43—The drill assembly of Examples 41 or 42, wherein the rotary bit drive comprises a hydraulic motor.

Example 44—The drill assembly of Example 43, wherein the hydraulic motor comprises a pressure relief valve configured to limit torque provided by the hydraulic motor.

Example 45—A drill assembly comprising a frame comprising an attachment element configured to hold the drill assembly to a surface, an actuator system comprising a slide, a bit drive mounted to the slide, and a bit assembly configured to be driven by the bit drive. The bit assembly comprises a tap operably engaged with the bit drive, wherein the tap comprises self-tapping threads and an inlet, and a drill bit configured to be driven by the tap, wherein the drill bit comprises teeth, and wherein the bit drive is configured to drill a hole in the surface with the drill bit and affix the tap to the surface by way of the self-tapping threads.

Example 46—The drill assembly of Example 45, wherein the actuator system comprises a vertical frame portion configured to guide the slide, and wherein the slide comprises PTFE plates configured to reduce friction experienced between the slide and the vertical frame portion.

Example 47—The drill assembly of Examples 45 or 46, wherein the actuator system comprises a vertical frame portion, wherein the vertical frame portion comprises a rod supported thereby, and wherein the rod is configured to guide the slide.

Example 48—The drill assembly of any one of Examples 45-47, wherein the actuator system comprises a fluidic piston actuator, and wherein the fluidic piston actuator comprises a pressure release valve configured to reduce pressure applied by the fluidic piston actuator.

Example 49—A drill assembly comprising a frame comprising an attachment element configured to hold the drill assembly to a surface, a release mechanism configured to detach the attachment element from the surface, a linear actuator system comprising a slide, a bit drive mounted to the slide, and a bit assembly configured to be driven by the bit drive. The bit assembly comprises a tap operably engaged with the bit drive, wherein the tap comprises self-tapping threads and an inlet, and a drill bit configured to be driven by the tap, wherein the drill bit comprises teeth, and wherein the bit drive is configured to drill a hole in the surface with the drill bit and affix the tap to the surface by way of the self-tapping threads.

Example 50—The drill assembly of Example 49, wherein the release mechanism comprises a drive screw configured to push the attachment element away from the surface.

Example 51—A drill assembly comprising a frame comprising an attachment element configured to hold the drill assembly to a surface, a linear actuator system comprising a slide, a bit drive mounted to the slide, and a bit assembly configured to be driven by the bit drive, wherein the bit assembly comprises a tap operably engaged with the bit drive, wherein the tap comprises self-tapping threads and an inlet, and wherein the tap is configured to drive a drill bit.

Example 52—A drill assembly comprising a frame comprising an attachment element configured to hold the drill assembly to a surface, a linear actuator system comprising a slide, a bit drive mounted to the slide, wherein the bit drive comprises an impact drill motor, and a bit assembly configured to be driven by the bit drive. The bit assembly comprises a tap operably engaged with the bit drive, wherein the tap comprises self-tapping threads and an inlet, and a drill bit configured to be driven by the tap, wherein the drill bit comprises teeth, and wherein the bit drive is configured to drill a hole in the surface with the drill bit and affix the tap to the surface by way of the self-tapping threads.

Example 53—A drill assembly comprising a frame comprising an attachment element configured to hold the drill assembly to a surface, a linear actuator system comprising a slide, a bit drive mounted to the slide, wherein the bit drive comprises a rotary drill motor, and a bit assembly configured to be driven by the bit drive. The bit assembly comprises a tap operably engaged with the bit drive, wherein the tap comprises self-tapping threads and an inlet, and a drill bit configured to be driven by the tap, wherein the drill bit comprises teeth, and wherein the bit drive is configured to drill a hole in the surface with the drill bit and affix the tap to the surface by way of the self-tapping threads.

Example 54—A drill assembly comprising a frame comprising an attachment element configured to hold the drill assembly to a surface, a linear actuator system comprising a slide, a bit drive mounted to the slide, and a bit assembly configured to be driven by the bit drive. The bit assembly comprises a tap operably engaged with the bit drive. The tap comprises self-tapping threads, a flange configured to abut the surface, wherein the flange comprises a surface-facing side, and an annular chamfered slot defined in the surface-facing side configured to provide a seal between the tap and the surface. The bit assembly further comprises a drill bit configured to be driven by the tap, wherein the drill bit comprises teeth, and wherein the bit drive is configured to drill a hole in the surface with the drill bit and affix the tap to the surface by way of the self-tapping threads.

Example 55—A drill assembly comprising a frame comprising an attachment element configured to hold the drill assembly to a surface, a linear actuator system comprising a slide, a bit drive mounted to the slide, and a bit assembly configured to be driven by the bit drive. The bit assembly comprises a tap operably engaged with the bit drive, wherein the tap comprises self-tapping threads and relief slots intersecting the self-tapping threads, and a drill bit configured to be driven by the tap, wherein the drill bit comprises teeth, and wherein the bit drive is configured to drill a hole in the surface with the drill bit and affix the tap to the surface by way of the self-tapping threads.

Example 56—A drill assembly comprising a frame comprising an attachment element configured to hold the drill assembly to a surface, a linear actuator system comprising a slide, a bit drive mounted to the slide, and a bit assembly configured to be driven by the bit drive. The bit assembly comprises a tap drivable by the bit drive, wherein the tap comprises self-tapping threads, a plug drivingly engaged with and removably attached to the tap, wherein the plug is configured to be driven by the tap, and a drill bit attached to and configured to be driven by the plug, wherein the bit drive is configured to drill a hole in the surface with the drill bit and affix the tap to the surface by way of the self-tapping threads.

Example 57—The drill assembly of Example 56, wherein the tap comprises a slot, wherein the plug comprises a driving tooth configured to be received within the slot, and wherein the driving tooth comprises a trapezoidal profile.

Example 58—The drill assembly of Examples 56 or 57, wherein the plug comprises friction rings configured to prevent the plug from translating relative to the tap.

Example 59—A drill assembly comprising a frame comprising an attachment element configured to hold the drill assembly to a surface, an actuator system, a bit drive slideably mounted to the actuator system, and a bit assembly configured to be driven by the bit drive. The bit assembly comprises a tap drivable by the bit drive, wherein the tap comprises an engagement portion, a plug drivingly engaged with and releasably attached to the tap, wherein the plug is configured to be driven by the tap, and a drill bit attached to and configured to be driven by the plug, wherein the bit drive is configured to drill a hole in the surface with the drill bit and affix the tap to the surface by way of the engagement portion.

Example 60—A drill assembly comprising a frame comprising an attachment element configured to hold the drill assembly to a surface and a linear actuator system. The linear actuator system comprises a slide, a rotary actuator comprising a pinion, and a rack coupled to the slide and operably engaged with the pinon such that the rotary actuator can linearly actuate the rack causing linear actuation of the slide. The drill assembly further comprises a bit drive mounted to the slide, and a bit assembly configured to be driven by the bit drive. The bit assembly comprises a tap operably engaged with the bit drive, wherein the tap comprises self-tapping threads and an inlet, and a drill bit configured to be driven by the tap, wherein the drill bit comprises teeth, and wherein the bit drive is configured to drill a hole in the surface with the drill bit and affix the tap to the surface by way of the self-tapping threads.

Example 61—A bit coupling for use with a drill assembly, wherein the bit coupling comprises a drill bit configured to drill a hole in a surface, and a tap comprising a first side comprising a head configured to be driven by a bit drive and a second side comprising an attachment interface, wherein the drill bit is coupled to the attachment interface, a first section extending from the attachment interface, wherein the first section comprises self-tapping threads and a first diameter, and a second section extending from the first section toward the first side, wherein the second section comprises a plurality of wedges and a second diameter, wherein the plurality of wedges expand the second side from the first diameter to the second diameter, and wherein the self-tapping threads are configured to drive the wedges into the hole tapped by the self-tapping threads. The tap further comprises a flange extending between the first side and the second side, wherein the flange is configured to abut the surface when the bit coupling is in a fully installed configuration.

Example 62—The bit coupling of Example 61, wherein the drill bit comprises a third diameter which is equal to the first diameter.

Example 63—The bit coupling of Example 61, wherein the drill bit comprises a third diameter which is less than the first diameter.

Example 64—The bit coupling of Example 61, wherein the drill bit comprises a third diameter which is greater than the first diameter.

Example 65—A rivet coupling comprising a cylindrical body comprising a first diameter, a first side comprising a first side end and an integral flange configured to abut a first surface of a wall to which the rivet coupling is to be installed, wherein the integral flange comprises a second diameter which is greater than the first diameter, a second side comprising a second side end, a first section extending from the second side end, wherein the first section comprises a first wall thickness and the first diameter, and a second section extending from the first section, wherein the second section comprises a second wall thickness which is less than the first wall thickness, and a rivet actuator configured to compress the first side and the second side toward each other when the integral flange is positioned against the surface to which the rivet coupling is to be installed, wherein the compression of the first side and the second side causes the second section to deform radially outward creating an internal flange from the second section, and wherein the internal flange is configured to abut a second surface of the wall thereby installed the rivet coupling to the wall.

Example 66—The rivet coupling of Example 65, wherein the second section comprises a thickness profile configured to encourage the outward deformation.

Example 67—The drill assembly of any one of Examples 1-11, further comprising a remote control actuator in signal communication with at least one of the linear actuator system and the bit drive.

Example 68—The drill assembly of any one of Examples 38-40, further comprising a remote control actuator configured to actuate the fluidic actuator system.

Example 69—The drill assembly of any one of Examples 41-44, further comprising a remote control actuator configured to actuate the rotary bit.

Example 70—An underwater drilling assembly comprising a frame comprising a slide member and an attachment element configured to hold the underwater drilling assembly to a surface of a ship skin. The underwater drilling assembly further comprises a drilling system comprising a sub-frame movably supported within the frame by way of the slide member, a linear actuator attached to the frame and configured to move the sub-frame relative to the frame upon an actuation of the linear actuator, and a bit drive mounted to the sub-frame, wherein an actuation of the linear actuator is configured to move the sub-frame relative to the frame to move the bit drive relative to the frame. The underwater drilling assembly further comprises a tap assembly configured to be driven by the bit drive, wherein the tap assembly comprises a tap element configured to be attached to and detached from the bit drive, wherein the tap element comprises self-tapping threads, a plug drivingly engaged with and removably positioned within the tap element, wherein the plug is configured to be driven by the tap element, and an annular cutter attached to and configured to be driven by the plug, wherein the bit drive is configured to drill a hole in the surface of the ship skin with the annular cutter and affix the tap element to the ship skin with the self-tapping threads.

Example 71—The underwater drilling assembly of Example 70, wherein the attachment element comprises a magnet.

Example 72—The underwater drilling assembly of Example 71, wherein the magnet comprises an electromagnet.

Example 73—The underwater drilling assembly of any one of Examples 70-72, further comprising a ball-and-socket joint configured to attach the attachment element to the frame.

Example 74—The underwater drilling assembly of any one of Examples 70-73, wherein the frame comprises a symmetrical structure, and wherein the bit drive, the attachment element, and the linear actuator are centered within the symmetrical structure.

Example 75—The underwater drilling assembly of Example 74, wherein the symmetrical structure comprises a pyramidal structure.

Example 76—The underwater drilling assembly of any one of Examples 70-75, wherein the frame comprises an upper bracket and a lower bracket, and wherein the upper bracket and the lower bracket are attached to each other by way of the slide member.

Example 77—The underwater drilling assembly of Example 76, wherein the frame further comprises brace plates attaching the upper bracket and the lower bracket.

Example 78—The underwater drilling assembly of any one of Examples 70-78, wherein the bit drive comprises a fluidic bit drive.

Example 79—The underwater drilling assembly of Example 78, wherein the fluidic bit drive comprises a hydraulic drill.

Example 80—The underwater drilling assembly of any one of Examples 70-79, wherein the linear actuator comprises a fluidic actuator.

Example 81—The underwater drilling assembly of claim 80, wherein the fluidic actuator comprises a hydraulic cylinder.

Example 82—The underwater drilling assembly of any one of Examples 70-81, wherein the sub-frame comprises an upper plate attached to a rod of the linear actuator and a lower plate fixed to the upper plate, wherein the bit drive is mounted to the lower plate.

Example 83—The underwater drilling assembly of Example 82, wherein the lower plate comprises a sleeve bearing configured to receive the slide member.

Example 84—A marine drilling system comprising a drilling assembly configured to install a tap assembly into a ship skin. The drilling assembly comprises a frame, a linear actuator attached to the frame, and a bit drive, wherein an actuation of the linear actuator is configured to move the bit drive relative to the frame to install the tap assembly into the ship skin by driving the tap assembly with the bit drive and the linear actuator. The marine drilling system further comprises a control system configured to operate the drilling assembly. The control system comprises a control circuit comprising a programmable logic controller, a control interface coupled to the control circuit, a hydraulic power pack configured to pump hydraulic fluid through the bit drive and the linear actuator of the drilling assembly, and a transport hub comprising a valve box coupled to the hydraulic power pack, the linear actuator, and the bit drive, wherein the valve box comprises a plurality of valves configured to transmit the hydraulic fluid between the drilling assembly and the hydraulic power pack, wherein the valve box further comprises a valve control module configured to operate the valves, and wherein the valve control module is in communication with the programmable logic controller such that the control circuit is configured to control the valve control module based on instructions received from the programmable logic controller.

Example 85—The marine drilling system of Example 84, wherein instructions received from the programmable logic controller are based on human inputs received by the control interface.

Example 86—The marine drilling system of any one of Examples 84 and 85, wherein instructions received from the programmable logic controller are based on sensor inputs received by the programmable logic controller.

Example 87—The marine drilling system of any one of Examples 84-86, further comprising a remotely-operated underwater vehicle configured to operate the drilling assembly.

Example 88—A drilling system configured to install a tap assembly into a ship skin, wherein the drilling system comprises a remotely-operated underwater vehicle and a drilling assembly configured to be operated by the remotely-operated underwater vehicle. The drilling assembly comprises, one, a frame comprising a slide member and an attachment element configured to hold the drilling assembly to a surface of the ship skin and, two, a drill actuation system comprising a sub-frame movably supported within the frame by way of the slide member, a linear actuator attached to the frame and configured to move the sub-frame relative to the frame upon an actuation of the linear actuator, and a rotary actuator mounted to the sub-frame, wherein the actuation of the linear actuator is configured to move the rotary actuator relative to the frame to install the tap assembly into the ship skin by driving the tap assembly with the rotary actuator and the linear actuator.

Example 89—The drilling system of Example 88, wherein the attachment element comprises a magnet.

Example 90—The drilling system of Example 90, wherein the magnet comprises an electromagnet.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. An underwater drilling assembly, comprising:
   a frame, comprising:
      a plurality of legs, wherein each leg comprises:
         a post comprising an end; and
         a suction cup at the end;
   a linear actuator;
   a drill assembly mounted to the frame and configured to drill a hole in a ship skin centrally with respect to the plurality of legs, wherein the drill assembly is coupled to the linear actuator, and wherein the drill assembly comprises:
      a bit drive, wherein the actuation of the linear actuator is configured to linearly actuate the bit drive relative to the frame; and
      a fastener configured to be driven by the bit drive, wherein the fastener comprises:
         a head configured to be driven by the bit drive;
         a shank extending from the head;
         self-tapping threads securable to the ship skin; and
         a cutting body to lead the self-tapping threads into the ship skin, wherein the bit drive is configured to simultaneously rotate the cutting body and the self-tapping threads to secure the fastener to the ship skin.

2. The underwater drilling assembly of claim 1, wherein the suction cup is pivotable relative to the frame.

3. The underwater drilling assembly of claim 1, wherein each leg further comprises two suction cup ports on opposite sides of the post.

4. The underwater drilling assembly of claim 1, wherein the frame further comprises a lower platform fixedly attached to each post.

5. The underwater drilling assembly of claim 1, wherein each leg further comprises a ball-and-socket joint.

6. The underwater drilling assembly of claim 1, wherein the bit drive and the linear actuator are centered within the frame.

7. The underwater drilling assembly of claim 1, wherein the bit drive comprises a fluidic bit drive.

8. The underwater drilling assembly of claim 1, wherein the linear actuator comprises a fluidic actuator.

9. An underwater drilling assembly, comprising:
   a drill assembly; and
   a tripod frame releasably securable to a ship skin, wherein the drill assembly is movably supported by the tripod frame, and wherein the tripod frame comprises:
      a plurality of attachment legs, wherein each attachment leg comprises:
         a support pillar; and
         a suction foot assembly to secure the underwater drilling assembly to the ship skin, wherein the suction foot assembly is pivotably connected to the tripod frame;
   a linear actuator, wherein the drill assembly is actuatable by the linear actuator, and wherein the drill assembly is configured to drill a hole in the ship skin centrally with respect to the plurality of attachment legs; and
   a threaded stud configured to be driven by the drill assembly to secure a gasket to the ship skin, wherein the threaded stud comprises:
      a head configured to be driven by the drill assembly;

self-tapping threads section securable to the ship skin; and a cutting body extending from the self-tapping threads section to cut into the ship skin.

10. The underwater drilling assembly of claim 9, wherein each leg further comprises at least two vacuum ports defined in the suction foot assembly on opposite sides of the support pillar.

11. The underwater drilling assembly of claim 9, wherein the drill assembly is configured to simultaneously rotate the cutting body and the self-tapping threads section to secure the threaded stud to the ship skin.

12. The underwater drilling assembly of claim 9, wherein the tripod frame further comprises a lower plate fixedly attached to each support pillar.

13. The underwater drilling assembly of claim 9, wherein each attachment leg further comprises a ball-and-socket joint.

14. The underwater drilling assembly of claim 9, wherein the drill assembly and the linear actuator are centered within the tripod frame.

15. The underwater drilling assembly of claim 9, wherein the drill assembly comprises a fluidic bit drive.

16. The underwater drilling assembly of claim 9, wherein the linear actuator comprises a fluidic actuator.

17. An underwater drilling assembly, comprising:
a drill assembly; and
a frame releasably securable to a ship skin, wherein the drill assembly is movably supported by the frame, and wherein the frame comprises:
 a plurality of attachment legs mounted to the frame, wherein each attachment leg comprises:
  a support pillar; and
  a suction foot positionable against a ship skin to form a suction cavity for selectively maintaining a pressure differential relative to outside the suction cavity, wherein the suction foot is pivotably connected to the frame;
 a linear actuator coupled to the drill assembly, wherein the drill assembly is configured to drill a hole in the ship skin centrally with respect to the plurality of attachment legs; and
 a plurality of fasteners configured to be supported by the underwater drilling assembly and driven into the ship skin by the drill assembly, wherein each fastener comprises:
  a head configured to be driven by the drill assembly;
  self-tapping threads section securable to the ship skin; and
  a cutting body extending from the self-tapping threads section to cut into the ship skin.

18. The underwater drilling assembly of claim 17, wherein each leg further comprises at least two apertures defined in the suction foot on opposite sides of the support pillar through which fluid can be extracted to decrease a pressure within the suction cavity.

19. The underwater drilling assembly of claim 17, wherein the frame further comprises a lower plate fixedly attached to each support pillar.

20. The underwater drilling assembly of claim 17, wherein each attachment leg further comprises a ball-and-socket joint.

* * * * *